United States Patent
Zhang et al.

(10) Patent No.: US 11,405,911 B2
(45) Date of Patent: *Aug. 2, 2022

(54) CONTROL SIGNALING FOR UPLINK MULTIPLE INPUT MULTIPLE OUTPUT, CHANNEL STATE INFORMATION REFERENCE SIGNAL CONFIGURATION AND SOUNDING REFERENCE SIGNAL CONFIGURATION

(71) Applicant: Apple Inc., Cupertino, CA (US)

(72) Inventors: Yushu Zhang, Beijing (CN); Alexei Davydov, Nizhny Novgorod NIZ (RU); Guotong Wang, Beijing (CN); Gang Xiong, Portland, OR (US); Hong He, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 17/105,057

(22) Filed: Nov. 25, 2020

(65) Prior Publication Data

US 2021/0105753 A1  Apr. 8, 2021

Related U.S. Application Data

(63) Continuation of application No. 16/252,294, filed on Jan. 18, 2019, now Pat. No. 10,863,494.

(Continued)

(30) Foreign Application Priority Data

Feb. 16, 2018  (WO) ................ PCT/CN2018/076922

(51) Int. Cl.
*H04W 72/04* (2009.01)
*H04L 5/00* (2006.01)

(52) U.S. Cl.
CPC .......... *H04W 72/042* (2013.01); *H04L 5/005* (2013.01); *H04L 5/0048* (2013.01);
(Continued)

(58) Field of Classification Search
CPC .. H04W 72/042; H04W 84/06; H04L 5/0094; H04L 5/005; H04L 5/0057; H04L 5/0048;
(Continued)

(56) References Cited

U.S. PATENT DOCUMENTS 9,379,827 B2  6/2016  Sun et al.
10,863,494 B2  12/2020  Zhang et al.
(Continued)

OTHER PUBLICATIONS

Agrawal, Rajeev, et al. "Dynamic point selection for LTE-advanced: Algorithms and performance." 2014 IEEE Wireless Communications and Networking Conference (WCNC). IEEE, 2014. (Year: 2014).*

(Continued)

*Primary Examiner* — Sharad Rampuria
(74) *Attorney, Agent, or Firm* — Sterne, Kessler, Goldstein & Fox P.L.L.C.

(57) ABSTRACT

Systems, apparatuses, methods, and computer-readable media are provided for time domain resource allocations in wireless communications systems. Disclosed embodiments include time-domain symbol determination and/or indication using a combination of higher layer and downlink control information signaling for physical downlink shared channel and physical uplink shared channel; time domain resource allocations for mini-slot operations; rules for postponing and dropping for multiple mini-slot transmission; and collision handling of sounding reference signals with semi-statically or semi-persistently configured uplink transmissions. Other embodiments may be described and/or claimed.

20 Claims, 15 Drawing Sheets

Related U.S. Application Data

(60) Provisional application No. 62/651,550, filed on Apr. 2, 2018, provisional application No. 62/620,176, filed on Jan. 22, 2018.

(52) U.S. Cl.
CPC .......... *H04L 5/0057* (2013.01); *H04L 5/0094* (2013.01); *H04L 5/0051* (2013.01)

(58) Field of Classification Search
CPC .............. H04L 5/0051; H04B 7/18528; H04B 7/18571; H04B 7/18576
See application file for complete search history.

(56) References Cited

U.S. PATENT DOCUMENTS

| | | |
|---|---|---|
| 2015/0055614 A1 | 2/2015 | Mazzarese et al. |
| 2015/0236801 A1* | 8/2015 | Sun .................... H04L 27/2613 370/328 |
| 2018/0331727 A1 | 11/2018 | Wilson et al. |
| 2019/0166615 A1 | 5/2019 | Nimbalker et al. |
| 2020/0036556 A1 | 1/2020 | Wei et al. |

OTHER PUBLICATIONS

3GPP, "Technical Specification Group Radio Access Network; NR; Physical layer procedures for data (Release 15)," 3GPP TS 38.214 V15.0.0 (Dec. 2017), 5G, 71 pages.

* cited by examiner

CONTROL SIGNALING FOR UPLINK MULTIPLE INPUT MULTIPLE OUTPUT, CHANNEL STATE INFORMATION REFERENCE SIGNAL CONFIGURATION AND SOUNDING REFERENCE SIGNAL CONFIGURATION

RELATED APPLICATIONS

The present application is a continuation of U.S. patent application Ser. No. 16/252,294, filed Jan. 18, 2019, which claims priority under 35 U.S.C. § 119 to U.S. Provisional App. No. 62/620,176 filed Jan. 22, 2018 and U.S. Provisional App. No. 62/651,550 filed Apr. 2, 2018, and claims priority under 35 U.S.C. § 120 to International App. No. PCT/CN2018/076922 filed Feb. 16, 2018. The contents of each of the aforementioned applications are hereby incorporated by reference in their entireties.

FIELD

Various embodiments of the present application generally relate to the field of wireless communications, and in particular, to channel state information reference signal configurations, sounding reference signal configurations, and control signaling for uplink multiple input multiple output.

BACKGROUND

In the fifth generation (5G) systems, two different transmission schemes are supported for uplink (UL) transmissions. One transmission scheme is codebook based transmission, and the other transmission schemes is non-codebook based transmission. For codebook based transmission, a user equipment (UE) can be configured with up to one sounding reference signal (SRS) resource set with up to two SRS resources. For non-codebook based transmission, the UE can be configured with up to one SRS resource set with up to four SRS resources. For each SRS resource, the resource mapping pattern including frequency offset, comb and number of symbols, antenna port(s), and time domain behavior (e.g., periodic, aperiodic, or semi-persistent scheduling (SPS) based transmission) can be configured by radio resource control (RRC) signaling. Therefore, different SRS resources can have different configurations.

Additionally, for uplink codebook based transmission, it is possible that the UE is not configured with any SRS resource. In this case, a Demodulation Reference Signal (DM-RS) can be used for link adaptation. The uplink precoder can be selected based on the DMRS. The number of antenna ports could be the maximum number of layers the UE can support, which can reflect the UE's capability of number of antenna ports. Multi-panel UEs may have multiple DMRS groups and the targeting receiving next generation NodeB (gNB) may be different.

Furthermore, the channel state information reference signal (CSI-RS) and SRS may be used for CSI estimation and beam management. The CSI-RS may also be used for time and frequency offset tracking. There are three types of CSI-RS including CSI-RS for CSI acquisition, CSI-RS for layer 1 reference signal receiving power (L1-RSRP) computation, and CSI-RS for tracking. Moreover, there are four types of SRS including SRS for codebook based transmission, SRS for non-codebook transmission, SRS for beam management, and SRS for antenna switching. However, the three types of CSI-RS share the same configuration and all the four types of SRS share the same configuration. This may lead to conflicts or redundant signaling for some configurations.

BRIEF DESCRIPTION OF THE FIGURES

FIG. 12 depicts an example UL MIMO procedure according to various embodiments; FIG. 13 shows an example configuration process according to various embodiments; and FIG. 14 depicts an example procedure according to various embodiments.

DETAILED DESCRIPTION

Embodiments herein provide mechanisms for control signaling of UL multiple input multiple output (MIMO). Such embodiments include SRS resource configuration; control signaling for uplink codebook based transmission when no SRS resource is configured; and control signaling for uplink non-codebook based transmission when no SRS resource is configured. Additionally, embodiments herein provide mechanisms for sounding reference signal (SRS) and channel state information reference signal (CSI-RS) configuration. Such embodiments include restriction of CSI-RS configuration, and restriction of SRS configuration. Other embodiments may be described and/or claimed.

Figure 1:
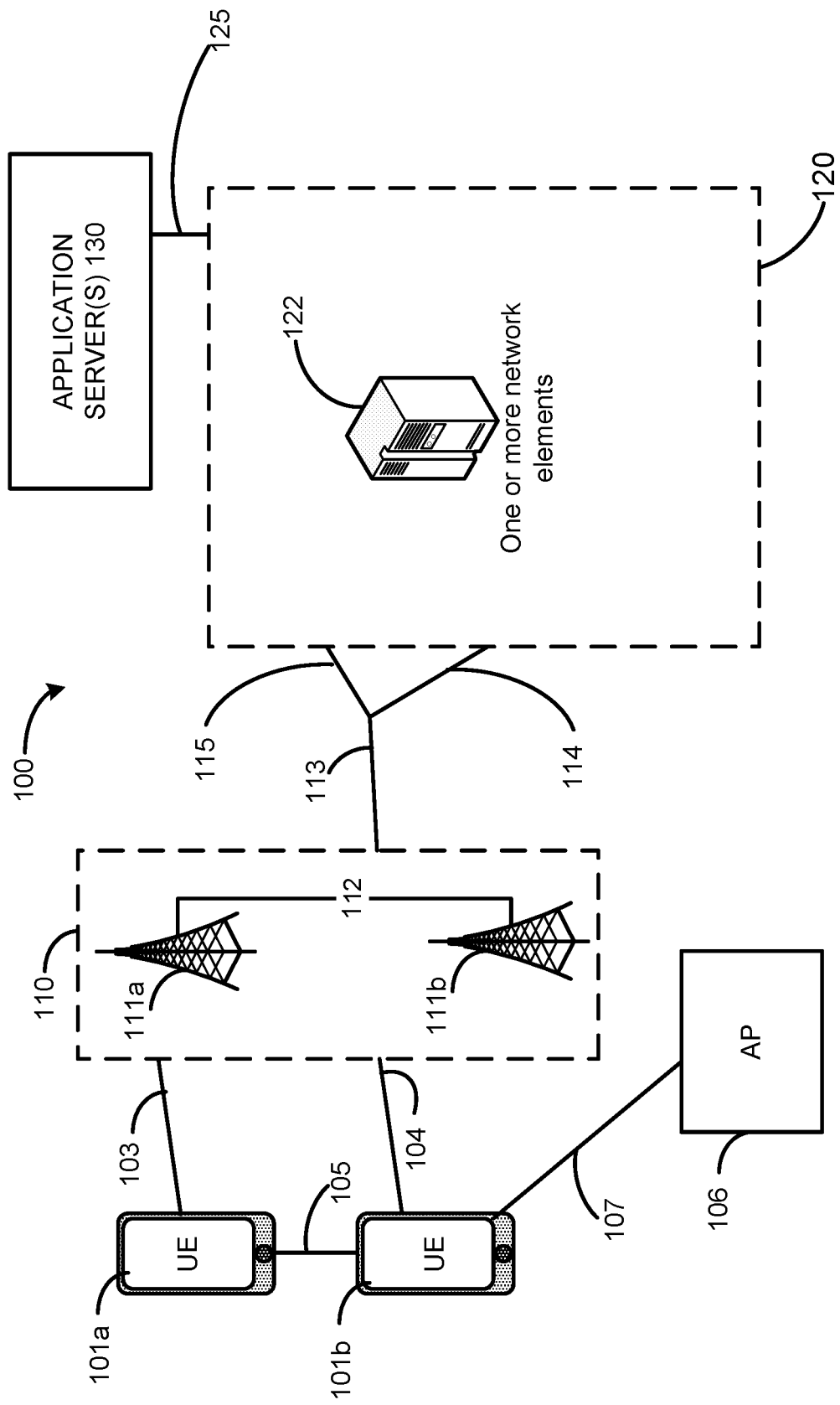
FIG. 1 depicts an architecture of a system of a network in accordance with some embodiments.

Referring now to FIG. 1, in which an example architecture of a system 100 of a network according to various embodiments, is illustrated. The following description is provided for an example system 100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 101a and UE 101b (collectively referred to as "UEs 101" or "UE 101"). In this example, UEs 101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like. As discussed in more detail infra, the UEs 101 incorporate the UL MIMO and CSI-RS and SRS configuration embodiments discussed herein. In these embodiments, the UEs 101 are capable of, inter alia, determining SRS resource configurations and/or CSI-RS configurations, and utilize control signaling for uplink codebook based transmissions and/or non-codebook based transmission based on whether SRS resource(s) is/are configured or not.

In some embodiments, any of the UEs 101 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 may be configured to connect, for example, communicatively couple, with an or RAN 110. In embodiments, the RAN 110 may be an NG RAN or a 5G RAN, an E-UTRAN, or a legacy RAN, such as a UTRAN or GERAN. As used herein, the term "NG RAN" or the like refers to a RAN 110 that operates in an NR or 5G system 100, and the term "E-UTRAN" or the like refers to a RAN 110 that operates in an LTE or 4G system 100. The UEs 101 utilize connections (or channels) 103 and 104, respectively, each of which comprises a physical communications interface or layer (discussed in further detail below).

In this example, the connections 103 and 104 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 101 may directly exchange communication data via a ProSe interface 105. The ProSe interface 105 may alternatively be referred to as a SL interface 105 and may comprise one or more logical channels, including but not limited to a PSCCH, a PSSCH, a PSDCH, and a PSBCH.

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a WiFi® router. In this example, the AP 106 is shown to be connected to the Internet without connecting to the core network of the wireless system (described in further detail below). In various embodiments, the UE 101b, RAN 110, and AP 106 may be configured to utilize LWA operation and/or LWIP operation. The LWA operation may involve the UE 101b in RRC_CONNECTED being configured by a RAN node 111a-b to utilize radio resources of LTE and WLAN. LWIP operation may involve the UE 101b using WLAN radio resources (e.g., connection 107) via IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like refers to a RAN node 111 that operates in an NR or 5G system 100 (for example, a gNB), and the term "E-UTRAN node" or the like refers to a RAN node 111 that operates in an LTE or 4G system 100 (e.g., an eNB). According to various embodiments, the RAN nodes 111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 111 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 111; a MAC/PHY split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 may represent individual gNB-DUs that are connected to a gNB-CU via individual F1 interfaces (not shown by FIG. 1). In these implementations, the gNB-DUs may include one or more remote radio heads or RFEMs (see, e.g., FIG. 7), and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), which are RAN nodes that provide E-UTRA user plane and control plane protocol terminations toward the UEs 101, and are connected to a 5GC (e.g., CN 620 of FIG. 6) via an NG interface (discussed infra).

In V2X scenarios one or more of the RAN nodes 111 may be or act as RSUs. The term "Road Side Unit" or "RSU" refers to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using OFDM communication signals with each other or with any of the RAN nodes 111 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

Downlink and uplink transmissions may be organized into frames with 10 ms durations, where each frame includes ten 1 ms subframes. A slot duration is 14 symbols with Normal CP and 12 symbols with Extended CP, and scales in time as a function of the used sub-carrier spacing so that there is always an integer number of slots in a subframe. In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The PDSCH carries user data and higher-layer signaling to the UEs 101. Typically, downlink scheduling (assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101. The PDCCH can be used to schedule DL transmissions on PDSCH and UL transmissions on PUSCH, where the DCI on PDCCH includes, inter alia, downlink assignments containing at least modulation and coding format, resource allocation, and HARQ information related to DL-SCH; and/or uplink scheduling grants containing at least modulation and coding format, resource allocation, and HARQ information related to UL-SCH. In addition to scheduling, the PDCCH can be used to for activation and deactivation of configured PUSCH transmission with configured grant; activation and deactivation of PDSCH semi-persistent transmission; notifying one or more UEs 101 of a slot format; notifying one or more UEs 101 of the PRB(s) and OFDM symbol(s) where a UE 101 may assume no transmission is intended for the UE; transmission of TPC commands for PUCCH and PUSCH; transmission of one or more TPC commands for SRS transmissions by one or more UEs; switching an active BWP for a UE 101; and initiating a random access procedure.

The PDCCH uses CCEs to convey the control information. Control channels are formed by aggregation of one or more CCEs, where different code rates for the control channels are realized by aggregating different numbers of CCEs. Before being mapped to resource elements, the PDCCH complex-valued symbols may first be organized into quadruplets, which may then be permuted using a sub-block interleaver for rate matching. Each PDCCH is transmitted using one or more of these CCEs, where each CCE may correspond to nine sets of four physical resource elements known as REGs. Four QPSK symbols may be mapped to each REG. The PDCCH can be transmitted using one or more CCEs, depending on the size of the DCI and the channel condition. For example, there can be four or more different PDCCH formats defined in LTE with different numbers of CCEs (e.g., aggregation level, L=1, 2, 4, or 8).

The UEs 101 monitor (or attempt to decode) respective sets of PDCCH candidates in one or more configured monitoring occasions according to the corresponding search space configurations. In NR implementations, the UEs 101 monitor (or attempt to decode) respective sets of PDCCH candidates in one or more configured monitoring occasions in one or more configured CORESETs according to the corresponding search space configurations. A CORESET includes a set of PRBs with a time duration of 1 to 3 OFDM symbols. The REGs and CCEs are defined within a CORESET with each CCE including a set of REGs. Interleaved and non-interleaved CCE-to-REG mapping are supported in a CORESET. Each REG carrying PDCCH carries its own DMRS.

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

PUSCH transmission(s) can be dynamically scheduled by an UL grant in a DCI, or the transmission can correspond to a configured grant type including Type 1 or Type 2. The configured grant Type 1 PUSCH transmission is semi-statically configured to operate upon the reception of higher layer parameter of configuredGrantConfig including rrc-ConfiguredUplinkGrant without the detection of an UL grant in a DCI. The configured grant Type 2 PUSCH transmission is semi-persistently scheduled by an UL grant in a valid activation DCI after the reception of higher layer parameter configurdGrantConfig not including rrc-ConfiguredUplinkGrant.

For the PUSCH transmission corresponding to a configured grant, the parameters applied for the transmission are provided by configuredGrantConfig expect for dataScramblingIdentityPUSCH, txConfig, codebookSubset, maxRank, scaling of UCI-OnPUSCH, which are provided by pusch-Config. If the UE 101 is provided with transformPrecoder in configuredGrantConfig, the UE 101 applies the higher layer parameter tp-pi2BPSK, if provided in pusch-Config for the PUSCH transmission corresponding to a configured grant.

For the PUSCH retransmission scheduled by a PDCCH with CRC scrambled by CS-RNTI with NDI=1, the parameters in pusch-Config are applied for the PUSCH transmission except for p0-NominalWithoutGrant, p0-PUSCH-Alpha, powerControlLoopToUse, pathlossReferenceIndex, mcs-Table, mcs-TableTransformPrecoder, and transformPrecoder.

The UE 101, upon detection of a PDCCH with a configured DCI (e.g., DCI format 0_0 or 0_1), transmits the corresponding PUSCH as indicated by that DCI. Upon detection of a DCI format 0_1 with an "UL-SCH indicator" set to "0" and with a non-zero (or NZP) "CSI request" where the associated "reportQuantity" in CSI-ReportConfig set to "none" for all CSI report(s) triggered by "CSI request" in this DCI format 0_1, the UE 101 ignores all fields in this DCI except the "CSI request" and the UE 101 does not transmit the corresponding PUSCH as indicated by this DCI format 0_1. For any two HARQ process IDs in a given scheduled cell, if the UE 101 is scheduled to start a first PUSCH transmission starting in symbol j by a PDCCH ending in symbol i, the UE is not expected to be scheduled to transmit a PUSCH starting earlier than the ending symbol of the first PUSCH by a PDCCH that does not end earlier than symbol i. The UE is not expected to be scheduled to transmit another PUSCH by DCI format 0_0 or 0_1 scrambled by C-RNTI or MCS-C-RNTI for a given HARQ process until after the end of the expected transmission of the last PUSCH for that HARQ process. For PUSCH scheduled by DCI format 0_0 on a cell, the UE 101 transmits PUSCH according to the spatial relation, if applicable, corresponding to the PUCCH resource with the lowest identifier (ID) within the active UL BWP of the cell.

Two transmission schemes are supported for PUSCH including a codebook based transmission scheme and non-codebook based transmission scheme. The UE 101 is configured with the codebook based transmission scheme when the higher layer (e.g., RRC) parameter txConfig in puschConfig is set to 'codebook', and the UE 101 is configured for the non-codebook based transmission scheme when the higher layer parameter txConfig is set to 'nonCodebook'. If the higher layer parameter txConfig is not configured, the UE 101 is not expected to be scheduled by DCI format 0_1. If PUSCH is scheduled by DCI format 0_0, the PUSCH transmission is based on a single antenna port, and the UE 101 does not expect PUSCH scheduled by DCI format 0_0 in a BWP without configured PUCCH resource with PUCCH-SpatialRelationInfo in frequency range 2 in RRC connected mode.

For codebook based transmission, the PUSCH can be scheduled by DCI format 0_0, DCI format 0_1, or semi-statically configured to operate. If the PUSCH is scheduled by DCI format 0_1, or semi-statically configured to operate, the UE 101 determines its PUSCH transmission precoder based on SRI, TPMI and the transmission rank, where the SRI, TPMI and the transmission rank are provided the SRS resource indicator field and the precoding information and number of layers field of the DCI, or given by the higher layer parameters srs-ResourceIndicator and precodingAndNumberOfLayers. The TPMI is used to indicate the precoder to be applied over the antenna ports and/or layers $\{0 \ldots v-1\}$ and that corresponds to the SRS resource selected by the SRI when multiple SRS resources are configured, or if a single SRS resource is configured TPMI is used to indicate the precoder to be applied over the antenna ports and/or layers $\{0 \ldots v-1\}$ and that corresponds to the SRS resource. The transmission precoder is selected from the uplink codebook that has a number of antenna ports equal to higher layer parameter nrofSRS-Ports in SRS-Config. According to various embodiments, when the UE 101 is configured with the higher layer parameter txConfig set to 'codebook', the UE 101 is configured with at least one SRS resource. The indicated SRI in slot n is associated with the most recent transmission of SRS resource identified by the SRI, where the SRS resource is prior to the PDCCH carrying the SRI. In some embodiments, the SRS resource is prior to the PDCCH carrying the SRI before slot n.

An individual SRS resource can be used for different purposes: codebook based transmission, non-codebook based transmission, beam management, and/or antenna switching. Different SRS resources can have different configuration of resource mapping pattern including frequency offset, comb and number of symbols, antenna port(s), and time domain behavior (periodic, aperiodic or semi-persistent (SPS) based transmission) by RRC signaling. However, since the number of SRS resources are limited for UL codebook based and UL non-codebook based transmission, to change some control signaling of SRS may rely on RRC signaling, which has a large latency. Further there can be only 1 SRS resource set for each transmissions scheme, then one possible way is that all the SRS resources can have the same time domain behavior, but this may result in only 1 time domain behavior is supported. If the SRS resources can have different time domain behavior, how to trigger the SRS resources could be one issue and some scheduling restriction may be necessary.

Figure 2:
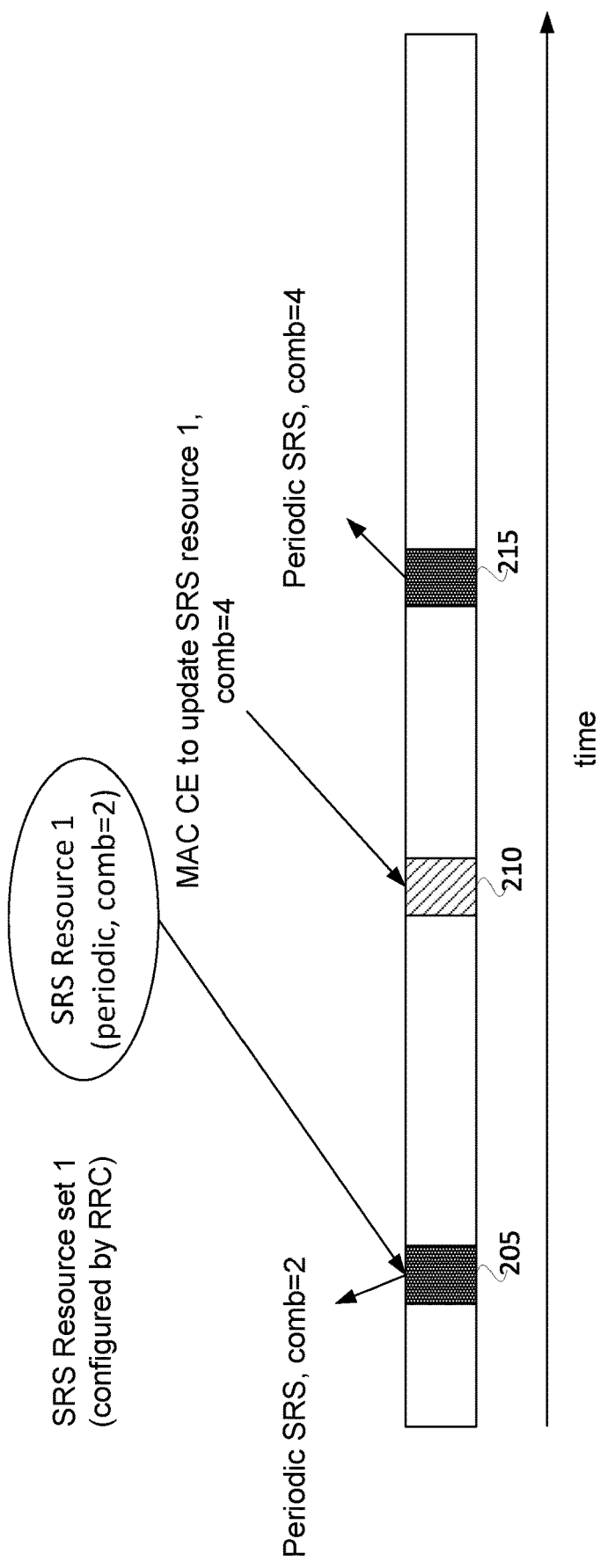
FIG. 2 illustrates an example of media access control (MAC) control element (CE) based sounding reference signal (SRS) reconfiguration according to various embodiments.

FIG. 2 illustrates an example of MAC control element (CE) based SRS reconfiguration according to various embodiments. In these embodiments, for SRS resources used for codebook or non-codebook based transmission or beam management, at least some of its configuration can be updated by MAC CE to reduce the reconfiguration latency. The MAC CE can include the SRS resource ID and at least one of the new configurations of the resource mapping pattern including frequency offset, comb and number of symbols, cyclic shifts, sequence ID, antenna port(s), and time domain behavior (periodic, aperiodic or semi-persistent (SPS) based transmission). For example, as shown by FIG. 2, the SRS Resource 1 is initially configured to be periodic and have a comb of 2 at point 205, and at point 210, the MAC CE updates the comb of SRS Resource 1 to be 4. Then at point 215, the periodic SRS is transmitted over SRS resource 1 with comb equal to 4. For one SRS resource, if the antenna port(s) are changed, different UE transmitting beams can be applied.

Figure 3A:
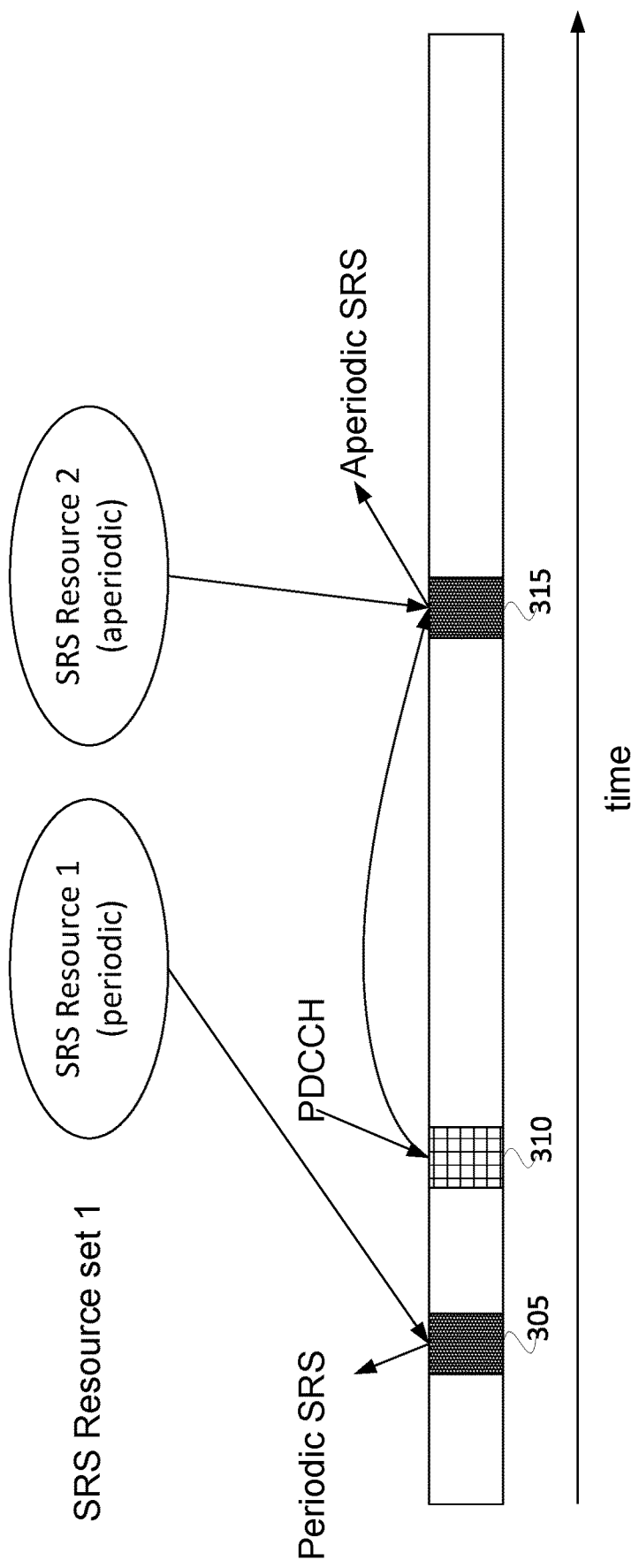
FIG. 3a illustrates an example of SRS time domain behavior on a per resource basis according to a first embodiment.
Figure 3B:
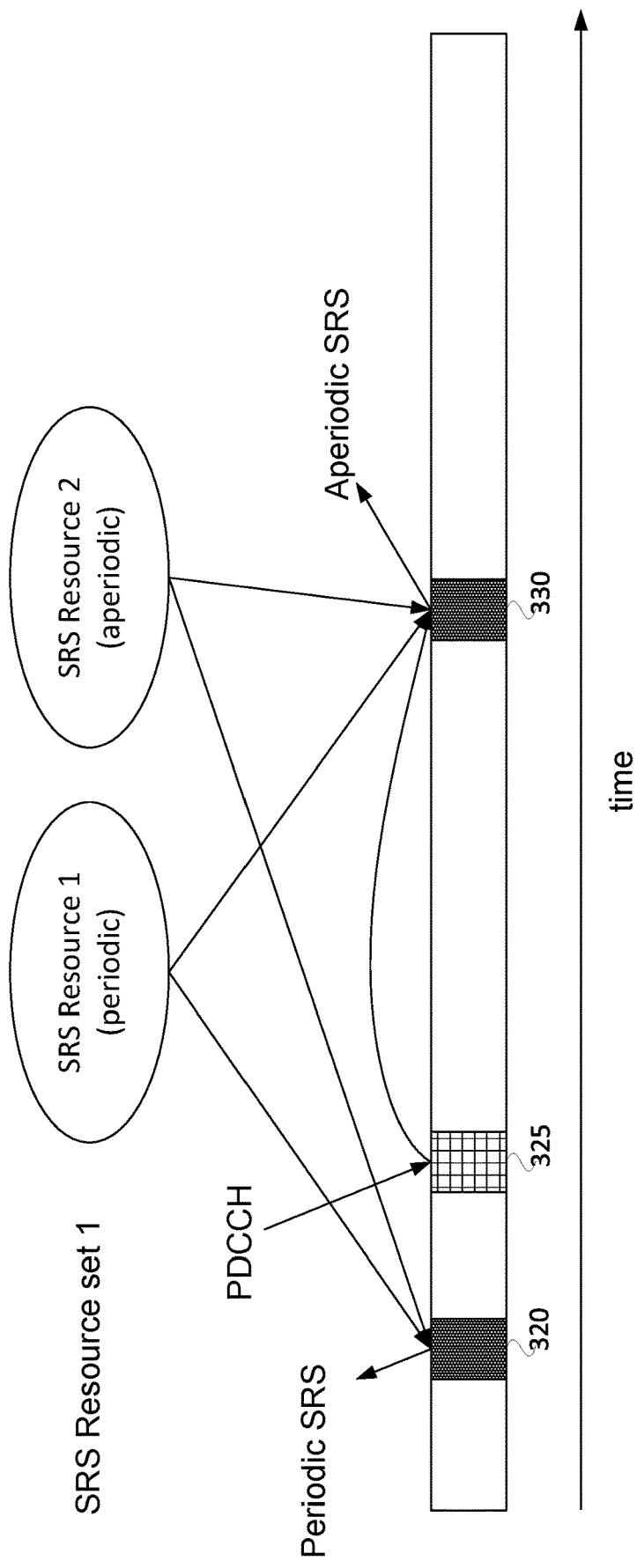
FIG. 3b illustrates an example of SRS time domain behavior on a per resource basis according to a second embodiment.

FIG. 3a illustrates an example of SRS time domain behavior on a per resource basis according to a first embodiment, and FIG. 3b illustrates an example of SRS time domain behavior on a per resource basis according to a second embodiment. In these embodiments, the aperiodic SRS can be triggered by the SRS request indicator/field in the DCI, and only the SRS resource with the configuration of aperiodic transmission in the triggered SRS resource set can be triggered. For example, as shown by FIG. 3a, SRS Resource 1 is configured to be periodic, which is transmitted at point 305. At point 310, a PDCCH is obtained, which includes a DCI that triggers transmission of an aperiodic SRS in SRS resource 2 at point 315. Alternatively, the SRS resources in the triggered SRS resource set can be triggered regardless of its time domain behavior configuration. For example, as shown by FIG. 3b, at point 320 a periodic SRS and/or an aperiodic SRS are transmitted over SRS resource 1 and SRS resource 2, respectively. At point 325, a PDCCH is obtained, which includes a DCI that triggers one or both of the periodic or aperiodic SRS transmissions at point 330. Further, for periodic and SPS SRS, its transmission can be based on the configuration of time domain behavior per SRS resource. Alternatively, it can be per SRS resource set basis. Then if one SRS resource in the resource set is configured with corresponding time domain behavior, e.g. periodic transmission, the whole SRS resource set can be transmitted periodically.

In some embodiments, it may be possible that one SRS resource is not transmitted while triggered by the RAN node 111 (e.g., a gNB). For codebook based transmission, the number of antenna ports should be based on the maximum number of layers or the number of antenna ports for the indicated SRS resource. Alternatively, for codebook based or non-codebook based transmission, the SRS resource which has not been transmitted should not be indicated by the SRS resource indicator (SRI) in uplink grant. In other words, if there is only 1 SRS resource configured by RRC, there may be no SRI indicated in the DCI.

In other embodiments, the SRS resources used for different resource set can be triggered by one DCI. Then there can be two different types of SRS resource set: type 1 SRS resource set is based on the function of the SRS resource and type 2 SRS resource is based on the aperiodic transmission behavior. The SRS resource configured with the periodic or SPS transmission should not be configured with a type 2 SRS resource set index. Then in the DCI, the aperiodic SRS transmission is based on the type 2 SRS resource set index.

In other embodiments, for non-codebook based transmission, the bandwidth of SRS transmission and its configured CSI-RS should be configured to be within a margin, since the UE should derive the uplink precoder based on the CSI-RS, and apply it to the SRS. In an example, the bandwidth of SRS should be within the bandwidth of CSI-RS. In another example, the bandwidth of SRS can be configured with X RB offset compared to that of CSI-RS, where X is up to X_max, where X_max can be pre-defined or determined by the system bandwidth.

Figure 4:
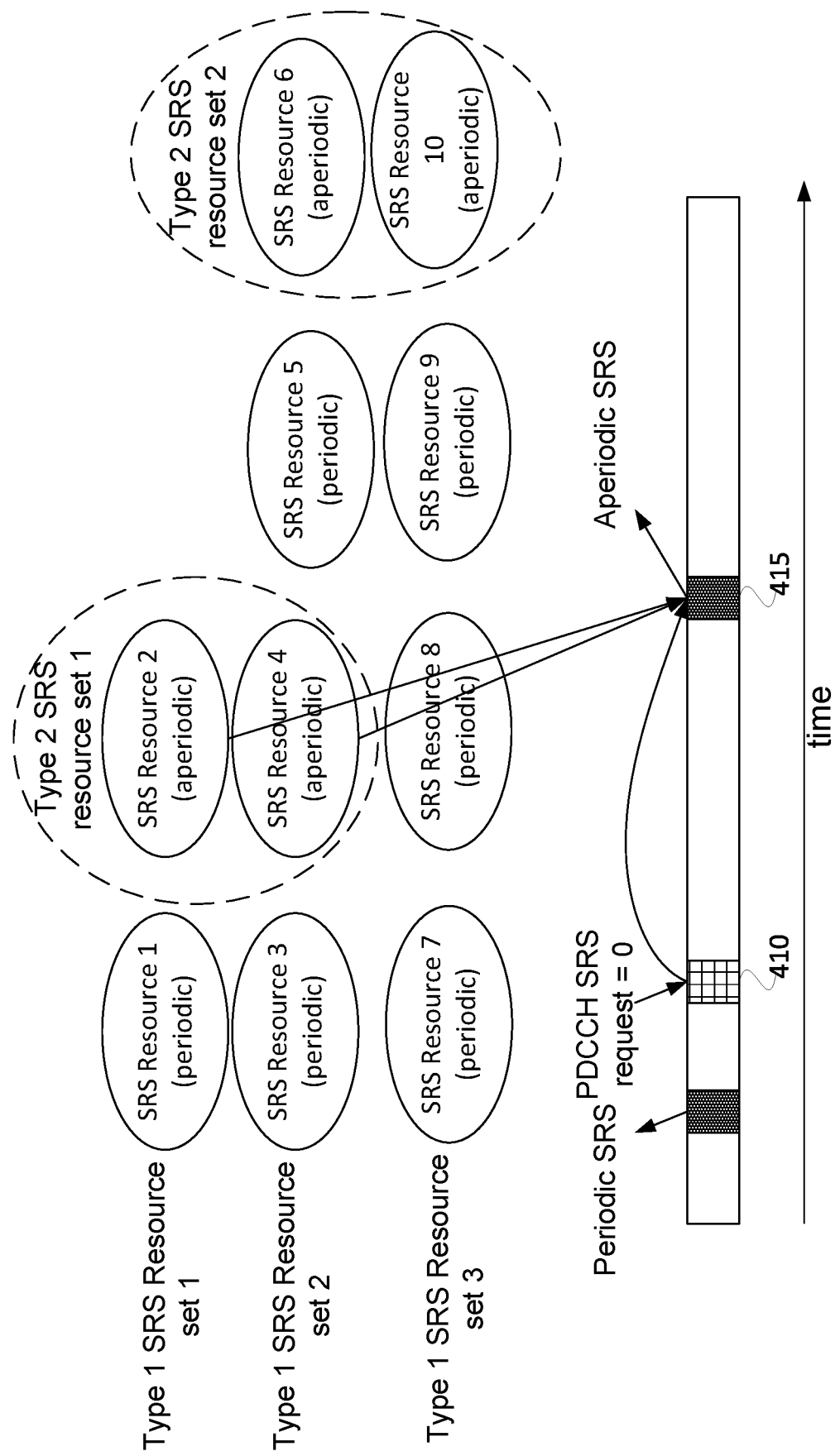
FIG. 4 illustrates an example SRS triggering mechanism for two types of SRS resource sets according to various embodiments.

FIG. 4 illustrates an example SRS triggering mechanism for two types of SRS resource sets according to various embodiments. In these embodiments, for codebook based transmission scheme and/or non-codebook based transmission scheme, at least one SRS resource for a current transmission scheme should be configured. If no SRS resource is configured, the UE 101 should use a fallback mode, which is triggered by fallback DCI, which in some embodiments may be a DCI format 0_0. For example, as shown by FIG. 4, at point 410, a PDCCH is obtained that includes a DCI with no SRS request field, which triggers a fallback aperiodic SRS transmission at point 415. In the fallback mode, the uplink beam indication can be based on the RRC or RRC and MAC CE, or the uplink beam for PUSCH should be the same as one PUCCH resource, which can be predefined, for example, the PUCCH resource with lowest resource ID, or configured by RRC signaling.

In other embodiments, if the UE 101 is configured with codebook based transmission scheme and no SRS for this transmissions scheme is configured, the number of antenna ports to determine the precoder can be determined by the number of or index(es) of scheduled DMRS group index and its maximum number of layers or maximum number of layers per DMRS groups. In one example, the number of antenna ports can be $\Sigma_{j \in S} N_j$ where S is the set of scheduled DMRS group index and $N_j$ is the maximum number of layers for current DMRS group.

In one example, the UE 101 may have 2 panels with 2 antenna ports per panel, and if the transmission is based on one panel, one DMRS group may be indicated and then the precoder should be based on 2 antenna ports codebook; if both panels are scheduled, the precoder should be based on 4 antenna ports codebook.

In other embodiments, if the UE 101 is configured with non-codebook based transmission scheme and no SRS for this transmissions scheme is configured, the rank of the precoder can be determined by the number of scheduled DMRS antenna ports and the precoder can be selected by the UE 101, which can be based on UE implementation or associated with one previous DMRS precoder, which can be configured by the RAN node 111 (e.g., gNB) or defined based on a rule, for example, the latest DMRS transmission before slot n-k, where n is current slot and k can be configured by higher layer signaling or fixed, for example at 4.

In other embodiments, if no SRS is configured for the UE, the 1-port transmission can be used. The RAN node 111 (e.g., gNB) can indicate the TPMI based on the rank1 and non-coherent transmission precoders to select the antenna port of PUSCH. Alternatively, the UE 101 could fallback to transmit diversity mode, where the RAN node 111 (e.g., gNB) can define the number of Precoder Resource block Group (PRG) or the PRG size, and/or codebook sub-set restriction, and the UE 101 can randomly select the precoder for each PRG. Further, if there is no beam correspondence and no SRS is configured, the UE 101 can follow the same transmission scheme as initial access messages, e.g. message 1 or message 3.

In embodiments, in a SRS resource set, the following signaling may be configured: SRS-AssocCSI-RS and SRS-SetUse. The SRS-AssocCSI-RS is used to identify the CSI-RS resource used for downlink channel estimation for non-codebook based uplink transmission. Then the uplink precoder can be derived based on the estimated channel. Thus, this parameter implies that the SRS resources in a resource set for non-codebook based transmission should share the same Tx beam. The SRS-SetUse is used to identify the type of the SRS resource set: codebook based transmission, non-codebook based transmission, beam management or antenna switching.

In embodiments, in each SRS resource, the following signaling may be configured SRS-SpatialRelationInfo. The SRS-SpatialRelationInfo may be used to indicate the Tx beam of the SRS resource, which can be, for example, a Synchronization Signal Block (SSB) or CSI-RS Resource Index (CRI) or SRS Resource Index (SRI). Then there may be some conflict regarding the parameters above. In some embodiments, when SRS-AssocCSI-RS is configured, the UE 101 is expected to be configured with the same value of SRS-SpatialRelationInfo and the reference signal indicated by SRS-SpatialRelationInfo should be spatially associated with the CSI-RS indicated by SRS-AssocCSI-RS. In other embodiments, the SRS power control parameters may be configured per resource set, so that the SRS-SpatialRelationInfo should be configured to be the same for SRS resource in a resource set for some types of SRS, for example, codebook based transmission, non-codebook based transmission, beam management or antenna switching. In such other embodiments, the downlink reference signal for power control should be spatially associated with the reference signal indicated by SRS-SpatialRelationInfo.

Further, for a SRS resource set for beam management, the SRS-SpatialRelationInfo may be configured to be the reference Tx beam; the UE 101 may then select the Tx beam for the SRS resources around this Tx beam. In some embodiments, for a SRS resource set used for non-codebook based transmission, which is configured to be semi-persistent, the spatial relation configured in the MAC CE to activate all/some of the SRS resources in the set should be configured to be the same. In other embodiments, for uplink codebook based transmission, if the SRS resource(s) are configured to be semi-persistent, the UE 101 expects such SRS resource(s) should be activated and use the same spatial domain filter to transmit the PUSCH as the activated SRS resource for codebook based transmission. Alternatively, if such SRS resource(s) are not activated, the UE 101 applies the same spatial domain filter to transmit the PUSCH as the parameter SRS-SpatialRelationInfo configured for the indicated SRS. In another option, the PUSCH beam should be the same as the beam used for a particular PUCCH resource or a particular SRS resource for beam management.

Referring back to FIG. 1, for codebook based transmissions, the UE 101 determines its codebook subsets based on TPMI and upon the reception of higher layer parameter codebookSubset in pusch-Config which may be configured with 'fullyAndPartialAndNonCoherent', 'partialAndNonCoherent', or 'nonCoherent' depending on the UE capability. The maximum transmission rank may be configured by the higher parameter maxRank in pusch-Config. When the UE 101 reports a UE capability of 'partialAndNonCoherent' transmission, the UE 101 does not expect to be configured by codebookSubset with 'fullyAndPartialAndNonCoherent'. When the UE 101 reports a UE capability of 'nonCoherent' transmission, the UE 101 does not expect to be configured by codebookSubset with 'fullyAndPartialAndNonCoherent' or with 'partialAndNonCoherent'. The UE 101 does not expect to be configured with the higher layer parameter codebookSubset set to 'partialAndNonCoherent' when higher layer parameter nrofSRS-Ports in an SRS-ResourceSet with usage set to 'codebook' indicates that two SRS antenna ports are configured.

For codebook based transmissions, the UE 101 may be configured with a single SRS-ResourceSet with usage set to 'codebook' and only one SRS resource can be indicated based on the SRI from within the SRS resource set. The maximum number of configured SRS resources for codebook based transmission is 2. If aperiodic SRS is configured for the UE 101, the SRS request field in the DCI triggers the transmission of aperiodic SRS resources. The UE 101 transmits PUSCH using the same antenna port(s) as the SRS port(s) in the SRS resource indicated by the DCI format 0_1 or by configuredGrantConfig. When multiple SRS resources are configured by SRS-ResourceSet with usage set to 'codebook', the UE 101 is to expect that higher layer parameters nrofSRS-Ports in SRS-Resource in SRS-ResourceSet shall be configured with the same value for all these SRS resources.

The SRS request field in DCI format 0_1 and 1_1 is 2 bits as defined by table 1 for UEs 101 not configured with SUL in the cell; 3 bits for UEs 101 configured SUL in the cell where the first bit is the non-SUL/SUL indicator and the second and third bits are defined by table 1. This bit field may also indicate the associated CSI-RS as discussed elsewhere herein. Additionally, DCI format 2_3 may also have a 2 bit SRS request field as defined by table 1.

TABLE 1

| | | SRS request | |
|---|---|---|---|
| Value of SRS request field | Triggered aperiodic SRS resource set(s) for DCI format 0_1, 1_0, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' | |
| 00 | No aperiodic SRS resource set triggered | No aperiodic SRS resource set triggered | |
| 01 | SRS resource set(s) configured with higher layer parameter aperiodicSRS-ResourceTrigger set to 1 | SRS resource set(s) configured with higher layer parameter SRS-SetUse set to 'antenna switching' and resourceType in SRS-ResourceSet set to 'aperiodic' for a 1$^{st}$ set of serving cells configured by higher layers | |

TABLE 1-continued

SRS request

| Value of SRS request field | Triggered aperiodic SRS resource set(s) for DCI format 0_1, 1_0, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| 10 | SRS resource set(s) configured with higher layer parameter aperiodicSRS-ResourceTrigger set to 2 | SRS resource set(s) configured with higher layer parameter SRS-SetUse set to 'antenna switching' and resourceType in SRS-ResourceSet set to 'aperiodic' for a $2^{nd}$ set of serving cells configured by higher layers |
| 11 | SRS resource set(s) configured with higher layer parameter aperiodicSRS-ResourceTrigger set to 3 | SRS resource set(s) configured with higher layer parameter SRS-SetUse set to 'antenna switching' and resourceType in SRS-ResourceSet set to 'aperiodic' for a $3^{rd}$ set of serving cells configured by higher layers |

For non-codebook based transmission, PUSCH can be scheduled by DCI format 0_0, DCI format 0_1, or semi-statically configured to operate. The UE 101 can determine its PUSCH precoder and transmission rank based on the SRI when multiple SRS resources are configured, where the SRI is given by the SRS resource indicator in DCI, or the SRI is given by srs-ResourceIndicator. The UE 101 uses one or multiple SRS resources for SRS transmission, where, in a SRS resource set, the maximum number of SRS resources which can be configured to the UE for simultaneous transmission in the same symbol and the maximum number of SRS resources are UE capabilities. Only one SRS port for each SRS resource is configured. Only one SRS resource set can be configured with higher layer parameter usage in SRS-ResourceSet set to 'nonCodebook'. The maximum number of SRS resources that can be configured for non-codebook based uplink transmission is 4. The indicated SRI in slot n is associated with the most recent transmission of SRS resource(s) identified by the SRI, where the SRS transmission is prior to the PDCCH carrying the SRI. In some embodiments, the SRS transmission is prior to the PDCCH carrying the SRI before slot n.

For non-codebook based transmission, the UE 101 can calculate the precoder used for the transmission of SRS based on measurement of an associated NZP CSI-RS resource. The UE 101 can be configured with only one NZP CSI-RS resource for the SRS resource set with higher layer parameter usage in SRS-ResourceSet set to 'nonCodebook' if configured.

If aperiodic SRS resource set is configured, the associated NZP-CSI-RS is indicated via SRS request field in DCI format 0_1 and 1_1, where AperiodicSRS-ResourceTrigger indicates the association between aperiodic SRS triggering state and SRS resource sets, triggered SRS resource(s) srs-ResourceSetId, csi-RS indicating the associated NZP-CSI-RS-ResourceId are higher layer configured in SRS-ResourceSet. The UE 101 is not expected to update the SRS precoding information if the gap from the last symbol of the reception of the aperiodic NZP-CSI-RS resource and the first symbol of the aperiodic SRS transmission is less than 42 OFDM symbols.

If the UE 101 is configured with aperiodic SRS associated with aperiodic NZP CSI-RS resource, the presence of the associated CSI-RS is indicated by the SRS request field if the value of the SRS request field is not '00' and if the scheduling DCI is not used for cross carrier or cross bandwidth part scheduling. The CSI-RS is located in the same slot as the SRS request field. If the UE configured with aperiodic SRS associated with aperiodic NZP CSI-RS resource, any of the TCI states configured in the scheduled CC shall not be configured with 'QCL-TypeD'.

If periodic or semi-persistent SRS resource set is configured, the NZP-CSI-RS-ResourceConfigID for measurement is indicated via higher layer parameter associatedCSI-RS in SRS-ResourceSet. The UE 101 performs one-to-one mapping from the indicated SRI(s) to the indicated DM-RS ports(s) and their corresponding PUSCH layers {0 . . . v−1} given by DCI format 0_1 or by configuredGrantConfig in increasing order. The UE 101 transmits PUSCH using the same antenna ports as the SRS port(s) in the SRS resource(s) indicated by SRI(s) given by DCI format 0_1 or by configuredGrantConfig, where the SRS port in (i+1)-th SRS resource in the SRS resource set is indexed as $p_i$=1000+i.

For non-codebook based transmission, the UE 101 does not expect to be configured with both spatialRelationInfo for SRS resource and associatedCSI-RS in SRS-ResourceSet for SRS resource set. For non-codebook based transmission, the UE 101 can be scheduled with DCI format 0_1 when at least one SRS resource is configured in SRS-ResourceSet with usage set to 'nonCodebook'.

The UE 101 can be configured with one or more Sounding Reference Signal (SRS) resource sets as configured by the higher layer parameter SRS-ResourceSet. For each SRS resource set, a UE may be configured with K≥1 SRS resources (e.g., by higher layer parameter SRS-Resource), where the maximum value of K is indicated by, for example, SRS_capability. The SRS resource set applicability is configured by the higher layer parameter usage in SRS-ResourceSet. When the higher layer parameter usage is set to 'BeamManagement', only one SRS resource in each of multiple SRS sets can be transmitted at a given time instant, the SRS resources in different SRS resource sets with the same time domain behavior in the same BWP can be transmitted simultaneously.

For aperiodic SRS at least one state of the DCI field is used to select at least one out of the configured SRS resource set(s). The following SRS parameters are semi-statically configurable by higher layer parameter SRS-Resource:

srs-ResourceId determines SRS resource configuration identify.

Number of SRS ports as defined by the higher layer parameter nrofSRS-Ports.

Time domain behaviour of SRS resource configuration as indicated by the higher layer parameter resource Type, which can be periodic, semi-persistent, aperiodic SRS transmission.

Slot level periodicity and slot level offset as defined by the higher layer parameters periodicityAndOffset-p or periodiciAndOffset-sp for an SRS resource of type periodic or semi-persistent. The UE shall not expect to be configured with SRS resources in the same SRS resource set SRS-ResourceSet with different slot level periodicities. For an SRS-ResourceSet configured with higher layer parameter resource Type set to 'aperiodic', a slot level offset is defined by the higher layer parameter slotOffset.

Number of OFDM symbols in the SRS resource, starting OFDM symbol of the SRS resource within a slot including repetition factor R as defined by the higher layer parameter resourceMapping.

SRS bandwidth $B_{SRS}$ and $C_{SRS}$, as defined by the higher layer parameter freqHopping.

Frequency hopping bandwidth, $b_{hop}$, as defined by the higher layer parameter freqHopping.

Defining frequency domain position and configurable shift as defined by the higher layer parameters freqDomainPosition and freqDomainShift, respectively.

Cyclic shift, as defined by the higher layer parameter cyclicShift-n2 or cyclicShift-n4 for transmission comb value 2 and 4, respectively.

Transmission comb value as defined by the higher layer parameter transmissionComb.

Transmission comb offset as defined by the higher layer parameter combOffset-n2 or combOffset-n4 for transmission comb value 2 or 4, respectively.

SRS sequence ID as defined by the higher layer parameter sequenceId.

The configuration of the spatial relation between a reference RS and the target SRS, where the higher layer parameter spatialRelationInfo, if configured, contains the ID of the reference RS. The reference RS can be an SS/PBCH block, CSI-RS configured on serving cell indicated by higher layer parameter servingCellId if present, same serving cell as the target SRS otherwise, or an SRS configured on uplink BWP indicated by the higher layer parameter uplinkBWP, and serving cell indicated by the higher layer parameter servingCellId if present, same serving cell as the target SRS otherwise.

The UE 101 may be configured by the higher layer parameter resourceMapping in SRS-Resource with an SRS resource occupying $N_s \in \{1, 2, 4\}$ adjacent symbols within the last 6 symbols of the slot, where all antenna ports of the SRS resources are mapped to each symbol of the resource. When PUSCH and SRS are transmitted in the same slot, the UE 101 can only be configured to transmit SRS after the transmission of the PUSCH and the corresponding DM-RS. When the UE 101 is configured with one or more SRS resource configuration(s), and when the higher layer parameter resource Type in SRS-Resource is set to 'periodic', and if the UE 101 is configured with the higher layer parameter spatialRelationInfo containing the ID of a reference 'ssb-Index', the UE 101 transmits the target SRS resource with the same spatial domain transmission filter used for the reception of the reference SS/PBCH block. If the higher layer parameter spatialRelationInfo contains the ID of a reference 'csi-RS-Index', the UE 101 transmits the target SRS resource with the same spatial domain transmission filter used for the reception of the reference periodic CSI-RS or of the reference semi-persistent CSI-RS. If the higher layer parameter spatialRelationInfo containing the ID of a reference 'srs', the UE 101 transmits the target SRS resource with the same spatial domain transmission filter used for the transmission of the reference periodic SRS.

When the UE 101 is configured with one or more SRS resource configuration(s), and when the higher layer parameter resource Type in SRS-Resource is set to 'semi-persistent', and when the UE 101 receives an activation command (e.g., a DCI) for an SRS resource, and when the HARQ-ACK corresponding to the PDSCH carrying the selection command is transmitted in slot n, the corresponding actions and the UE assumptions on SRS transmission corresponding to the configured SRS resource set are applied starting from slot $n+3N_{slot}^{subframe,\mu}+1$. The activation command also contains spatial relation assumptions provided by a list of references to reference signal IDs, one per element of the activated SRS resource set. Each ID in the list refers to a reference SS/PBCH block, NZP CSI-RS resource configured on serving cell indicated by Resource Serving Cell ID field in the activation command if present, same serving cell as the SRS resource set otherwise, or SRS resource configured on serving cell and uplink bandwidth part indicated by Resource Serving Cell ID field and Resource BWP ID field in the activation command if present, same serving cell and bandwidth part as the SRS resource set otherwise.

If an SRS resource in the activated resource set is configured with the higher layer parameter spatialRelationInfo, the UE 101 assumes that the ID of the reference signal in the activation command overrides the one configured in spatialRelationInfo.

When the UE 101 receives a deactivation command for an activated SRS resource set, and when the HARQ-ACK corresponding to the PDSCH carrying the selection command is transmitted in slot n, the corresponding actions and UE assumption(s) on cessation of SRS transmission corresponding to the deactivated SRS resource set are applied starting from slot $n+3N_{slot}^{subframe,\mu}+1$.

If the UE 101 is configured with the higher layer parameter spatialRelationInfo containing the ID of a reference 'ssb-Index', the UE 101 transmits the target SRS resource with the same spatial domain transmission filter used for the reception of the reference SS/PBCH block. If the higher layer parameter spatialRelationInfo contains the ID of a reference 'csi-RS-Index', the UE 101 transmits the target SRS resource with the same spatial domain transmission filter used for the reception of the reference periodic CSI-RS or of the reference semi-persistent CSI-RS. If the higher layer parameter spatialRelationInfo contains the ID of a reference 'srs', the UE 101 transmits the target SRS resource with the same spatial domain transmission filter used for the transmission of the reference periodic SRS or of the reference semi-persistent SRS. If the UE 101 has an active semi-persistent SRS resource configuration and has not received a deactivation command, the semi-persistent SRS configuration is considered to be active in the UL BWP which is active, otherwise it is considered suspended.

When the UE 101 is configured with one or more SRS resource configuration(s), and when the higher layer parameter resource Type in SRS-Resource is set to 'aperiodic', the UE 101 receives a configuration of SRS resource sets, and/or the UE 101 receives a downlink DCI, a group common DCI, or an uplink DCI based command where a codepoint of the DCI may trigger one or more SRS resource set(s). For SRS in a resource set with usage set to 'codebook' or 'antennaSwitching', the minimal time interval between the last symbol of the PDCCH triggering the aperiodic SRS transmission and the first symbol of SRS resource is N2, for which the minimal time interval in units of OFDM symbols is counted based on the minimum subcarrier spacing between the PDCCH and the aperiodic SRS. Otherwise, the minimal time interval between the last symbol of the PDCCH triggering the aperiodic SRS transmission and the first symbol of SRS resource is $N_2+14$.

If the UE 101 receives the DCI triggering aperiodic SRS in slot n, the UE 101 transmits aperiodic SRS in each of the triggered SRS resource set(s) in slot $$\left\lfloor n \cdot \frac{2^{\mu_{SRS}}}{2^{\mu_{PDCCH}}} \right\rfloor + k,$$

where k is configured via higher layer parameter slotoffset for each triggered SRS resources set and is based on the subcarrier spacing of the triggered SRS transmission, $\mu_{SRS}$ and $\mu_{PDCCH}$ are the subcarrier spacing configurations for triggered SRS and PDCCH carrying the triggering command respectively.

If the UE 101 is configured with the higher layer parameter spatialRelationInfo containing the ID of a reference 'ssb-Index', the UE 101 transmits the target SRS resource with the same spatial domain transmission filter used for the reception of the reference SS/PBCH block. If the higher layer parameter spatialRelationInfo contains the ID of a reference 'csi-RS-Index', the UE 101 transmits the target SRS resource with the same spatial domain transmission filter used for the reception of the reference periodic CSI-RS or of the reference semi-persistent CSI-RS, or of the latest reference aperiodic CSI-RS. If the higher layer parameter spatialRelationInfo contains the ID of a reference 'srs', the UE 101 transmits the target SRS resource with the same spatial domain transmission filter used for the transmission of the reference periodic SRS or of the reference semi-persistent SRS or of the reference aperiodic SRS.

The UE 101 is not expected to be configured with different time domain behavior for SRS resources in the same SRS resource set. The UE is also not expected to be configured with different time domain behavior between SRS resource and associated SRS resources set. The 2-bit SRS request field in DCI format 0_1, 1_1 indicates the triggered SRS resource set, and the 2-bit SRS request field in DCI format 2_3 indicates the triggered SRS resource set. If the UE 101 is configured with higher layer parameter srs-TPC-PDCCH-Group set to 'typeB', or indicates the SRS transmission on a set of serving cells configured by higher layers if the UE is configured with higher layer parameter srs-TPC-PDCCH-Group set to 'typeA'.

For PUCCH and SRS on the same carrier, the UE 101 does not transmit SRS when semi-persistent and periodic SRS are configured in the same symbol(s) with PUCCH carrying only CSI report(s), or only L1-RSRP report(s). The UE 101 does not transmit an SRS when semi-persistent or periodic SRS is configured or aperiodic SRS is triggered to be transmitted in the same symbol(s) with PUCCH carrying HARQ-ACK and/or SR. In the case that SRS is not transmitted due to overlap with PUCCH, only the SRS symbol(s) that overlap with PUCCH symbol(s) are dropped. The PUCCH is not transmitted when aperiodic SRS is triggered to be transmitted to overlap in the same symbol with PUCCH carrying semi-persistent/periodic CSI report(s) or semi-persistent/periodic L1-RSRP report(s) only.

In case of intra-band carrier aggregation or in inter-band CA band-band combination where simultaneous SRS and PUCCH/PUSCH transmissions are not allowed, the UE 101 is not expected to be configured with SRS from a carrier and PUSCH/UL DM-RS/UL PT-RS/PUCCH formats from a different carrier in the same symbol. In case of intra-band carrier aggregation or in inter-band CA band-band combination where simultaneous SRS and PRACH transmissions are not allowed, the UE 101 does not transmit simultaneously SRS resource(s) from a carrier and PRACH from a different carrier.

In case a SRS resource with SRS-resource Type set as 'aperiodic' is triggered on the OFDM symbol configured with periodic/semi-persistent SRS transmission, the UE 101 transmits the aperiodic SRS resource and not transmit the periodic/semi-persistent SRS resource(s) overlapping within the symbol(s). In case a SRS resource with SRS-resource Type set as 'semi-persistent' is triggered on the OFDM symbol configured with periodic SRS transmission, the UE 101 transmits the semi-persistent SRS resource and not transmit the periodic SRS resource(s) overlapping within the symbol(s). When the UE 101 is configured with the higher layer parameter usage in SRS-ResourceSet set to 'antennaSwitching,' and a guard period of Y symbols is configured, the UE 101 uses the same priority rules as defined above during the guard period as if SRS was configured.

The CSI-RS may be used for time/frequency tracking, CSI computation, and/or L1-RSRP computation and mobility. There are two types of CSI-RS including a zero power (ZP) CSI-RS and a non-ZP CSI-RS (NZP CSI-RS). An NZP CSI-RS can be configured by the NZP-CSI-RS-Resource IE in a suitable RRC message or by the CSI-RS Resource Mobility field in the CSI-RS-ResourceConfigMobility IE in a suitable RRC message. The UE 101 generates the reference-signal sequence r(m) for the NZP CSI-RS according to equation 1.

$$r(m) = \frac{1}{\sqrt{2}}(1 - 2 \cdot c(2m)) + j\frac{1}{\sqrt{2}}(1 - 2 \cdot c(2m + 1)) \quad \text{[equation 1]}$$

In equation 1, c(i) is a pseudo-random sequence and a pseudo-random sequence generator may be initialized according to equation 2.

$$c_{init} = (2^{10}(N_{symb}^{slot} n_{s,f}^{\mu} + l + 1)(2n_{ID} + 1) + n_{ID}) \bmod 2^{31} \quad \text{[equation 2]}$$

In equation 2, at the start of each OFDM symbol where $n_{s,f}^{\mu}$ is the slot number within a radio frame, l is the OFDM symbol number within a slot, and $n_{ID}$ equals the higher-layer parameter scramblingID or sequenceGenerationConfig. For each CSI-RS, the UE 101 maps the sequence r(m) to resource elements $(k, l)_{p, \mu}$.

When a zero-power CSI-RS is configured by the ZP-CSI-RS-Resource IE, the UE 101 assumes that the resource elements for that ZP CSI-RS are not used for PDSCH transmission. The UE 101 performs the same measurement/reception on channels/signals except PDSCH regardless of whether they collide with ZP CSI-RS or not. For a CSI-RS resource associated with a NZP-CSI-RS-ResourceSet with the higher layer parameter repetition set to 'on', the UE 101 does not expect to be configured with CSI-RS over the symbols during which the UE 101 is also configured to monitor the CORESET, while for other NZP-CSI-RS-ResourceSet configurations, if the UE 101 is configured with a CSI-RS resource and a search space set associated with a CORESET in the same OFDM symbol(s), the UE 101 may assume that the CSI-RS and a PDCCH DM-RS transmitted in all the search space sets associated with CORESET are quasi co-located with 'QCL-TypeD', if 'QCL-TypeD' is applicable. This also applies to the case when CSI-RS and the CORESET are in different intra-band component carriers, if 'QCL-TypeD' is applicable. Furthermore, the UE s101 does not expect to be configured with the CSI-RS in PRBs that overlap those of the CORESET in the OFDM symbols occupied by the search space set(s).

The UE 101 is not expected to receive CSI-RS and a SystemInformationBlockType1 message in the overlapping PRBs in the OFDM symbols where SystemInformationBlockType1 is transmitted. If the UE 101 is configured with DRX, the most recent CSI measurement occasion occurs in DRX active time for CSI to be reported. The time and frequency resources that can be used by the UE 101 to report CSI are controlled by the RAN node 111 (e.g., a gNB). A CSI may include a Channel Quality Indicator (CQI), precoding matrix indicator (PMI), CSI-RS resource indicator (CRI), SS/PBCH Block Resource indicator (SSBRI), layer indicator (LI), rank indicator (RI), and/or L1-RSRP. For CQI, PMI, CRI, SSBRI, LI, RI, L1-RSRP, the UE 101 may be configured by higher layers with N≥1 CSI-ReportConfig Reporting Settings, M≥1 CSI-ResourceConfig Resource Settings, and one or two list(s) of trigger states (given by the higher layer parameters CSI-AperiodicTriggerStateList and CSI-SemiPersistentOnPUSCH-TriggerStateList). Each trigger state in CSI-AperiodicTriggerStateList contains a list of associated CSI-ReportConfigs indicating the Resource Set IDs for channel and optionally for interference. Each trigger state in CSI-SemiPersistentOnPUSCH-TriggerStateList contains one associated CSI-ReportConfig.

The UE 101 can be configured with one or more NZP CSI-RS resource set configuration(s) as indicated by the higher layer parameters CSI-ResourceConfig, and NZP-CSI-RS-ResourceSet. Each NZP CSI-RS resource set consists of K≥1 NZP CSI-RS resource(s). The following parameters for which the UE 101 assumes non-zero transmission power for CSI-RS resource are configured via the higher layer parameter NZP-CSI-RS-Resource, CSI-ResourceConfig and NZP-CSI-RS-ResourceSet for each CSI-RS resource configuration:

nzp-CSI-RS-ResourceId determines CSI-RS resource configuration identity.

periodicityAndOffset defines the CSI-RS periodicity and slot offset for periodic/semi-persistent CSI-RS. All the CSI-RS resources within one set are configured with the same periodicity, while the slot offset can be same or different for different CSI-RS resources.

resourceMapping defines the number of ports, CDM-type, and OFDM symbol and subcarrier occupancy of the CSI-RS resource within a slot.

nrofPorts in resourceMapping defines the number of CSI-RS ports.

density in resourceMapping defines CSI-RS frequency density of each CSI-RS port per PRB, and CSI-RS PRB offset in case of the density value of ½. For density ½, the odd/even PRB allocation indicated in density is with respect to the common resource block grid.

cdm-Type in resourceMapping defines CDM values and pattern.

powerControlOffset: which is the assumed ratio of PDSCH EPRE to NZP CSI-RS EPRE when UE derives CSI feedback and takes values in the range of [−8, 15] dB with 1 dB step size.

powerControlOffsetSS: which is the assumed ratio of NZP CSI-RS EPRE to SS/PBCH block EPRE.

scramblingID defines scrambling ID of CSI-RS with length of 10 bits.

bwp-Id in CSI-ResourceConfig defines which bandwidth part the configured CSI-RS is located in.

repetition in NZP-CSI-RS-ResourceSet is associated with a CSI-RS resource set and defines whether UE can assume the CSI-RS resources within the NZP CSI-RS Resource Set are transmitted with the same downlink spatial domain transmission filter or not. and can be configured only when the higher layer parameter reportQuantity associated with all the reporting settings linked with the CSI-RS resource set is set to 'cri-RSRP' or 'none'.

qcl-InfoPeriodicCSI-RS contains a reference to a TCI-State indicating QCL source RS(s) and QCL type(s). If the TCI-State is configured with a reference to an RS with 'QCL-TypeD' association, that RS may be an SS/PBCH block located in the same or different CC/DL BWP or a CSI-RS resource configured as periodic located in the same or different CC/DL BWP.

trs-Info in NZP-CSI-RS-ResourceSet is associated with a CSI-RS resource set and for which the UE can assume that the antenna port with the same port index of the configured NZP CSI-RS resources in the NZP-CSI-RS-ResourceSet is the same and can be configured when reporting setting is not configured or when the higher layer parameter reportQuantity associated with all the reporting settings linked with the CSI-RS resource set is set to 'none'.

All CSI-RS resources within one set are configured with same density and same nrofPorts, except for the NZP CSI-RS resources used for interference measurement. The bandwidth and initial common resource block (CRB) index of a CSI-RS resource within a BWP, are determined based on the higher layer parameters nrofRBs and startingRB, respectively, within the CSI-FrequencyOccupation IE configured by the higher layer parameter freqBand within the CSI-RS-ResourceMapping IE. Both nrofRBs and startingRB are configured as integer multiples of 4 RBs, and the reference point for startingRB is CRB 0 on the common resource block grid. If startingRB<$N_{BWP}^{start}$, the UE shall assume that the initial CRB index of the CSI-RS resource is $N_{initial\ RB}=N_{BWP}^{start}$, otherwise $N_{initial\ RB}$=startingRB. If nrofRBs>$N_{BWP}^{size}+N_{BWP}^{start}-N_{initial\ RB}$, the UE shall assume that the bandwidth of the CSI-RS resource is $N_{CSI-RS}^{BW}=N_{BWP}^{size}+N_{BWP}^{start}-N_{initial\ RB}$, otherwise $N_{CSI-RS}^{BW}$=nrofRBs. In all cases, the UE shall expect that $N_{CSI-RS}^{BW} \geq \min(24, N_{BWP}^{size})$.

As mentioned previously, there may be N CSI-RS resources in one CSI-RS resource set (where N is a number), and the UE 101 may be configured with M CSI-RS resource set. One CSI-RS resource set may include the following configurations: TRS-Info={ON/OFF} and Repetition={ON/OFF}. According to various embodiments, if TRS-Info is "ON", the antenna ports of the CSI-RS resources in a resource set can be assumed to be the same; otherwise, they cannot be assumed to be the same. In some embodiments, the TRS-info cannot be configured to "OFF." In various embodiments, if Repetition is "ON", the CSI-RS resources in a resource set can be assumed to be spatially quasi co-located (QCLed) and/or all share the same transmitting (Tx) beams; otherwise, those CSI-RS resources cannot be assumed to be QCLed. In other words, only one of the TRS-Info parameter or the Repetition parameter can be configured by the NZP-CSI-RS-ResourceSet, and the case to configure Repetition=OFF and TRS-Info for a CSI-RS resource set should not be allowed. It should be noted that when the Tx beams are the same or shared, such Tx beams also use a same spatial domain transmission filter.

For each CSI-RS resource, there can be the following configurations to configure its Tx beam: QCL-Info-PeriodicCSI-RS and QCL-Info-aPeriodicReportingTrigger. It should be noted that the QCL-Info-aPeriodicReportingTrigger may also be referred to simply as qcl-Info or the like. The QCL-Info-PeriodicCSI-RS can be used to indicate the Tx beam for periodic CSI-RS resources, and QCL-Info-aPeriodicReportingTrigger can be used to indicate the Tx beam for aperiodic CSI-RS resources. Then there may be some confliction for the control signaling above.

In various embodiments, the UE is not be expected to be configured with both TRS-Info and Repetition in a CSI-RS resource set. Alternatively, the UE 101 is not be expected to be configured with TRS-Info="ON" and Repetition="OFF." Otherwise, the UE 101 may not identify whether the beams can be assumed to be the same for all of the CSI-RS resources. In other embodiments, when TRS-INFO="ON" or Repetition="ON" in a CSI-RS resource set, the UE 101 is not expected to be configured with a different value of QCL-Info-PeriodicCSI-RS or different QCL-Info-aPeriodicReportingTrigger for the CSI-RS resources in the resource set. Alternatively, when TRS-INFO="ON" or Repetition="ON", the UE 101 is not expected to be configured with QCL-Info-PeriodicCSI-RS or QCL-Info-aPeriodicReportingTrigger.

In other embodiments, the number of antenna ports for the CSI-RS which is associated with one SRS resource set for non-codebook based transmission may be no less than the maximum transmitted layers for non-codebook based transmission. Alternatively, the maximum number of transmitted layers for a non-codebook based transmission may be the min{$N_{ap}$, $N_{layer}$, $N_{Resource}$} where $N_{ap}$ indicates the number of antenna ports for associated CSI-RS, $N_{layer}$ indicates the maximum reported transmitted layers and $N_{Resource}$ indicates number of configured SRS resources for non-codebook based transmission. Further, for the CSI-RS associated with one SRS resource set, if it is triggered in an aperiodic manner, its reportQuantity may be configured to "No-report", which indicates that the UE 101 need not report any CSI but may just use it for uplink measurement purposes. Alternatively, resource allocation may be based on 0 RB allocation so that the UE may skip CSI reporting altogether.

For CSI-RS for tracking, when the UE 101 in RRC connected mode is expected to receive the higher layer UE specific configuration of a NZP-CSI-RS-ResourceSet configured with higher layer parameter trs-Info. For a NZP-CSI-RS-ResourceSet configured with the higher layer parameter trs-Info, the UE 101 assumes the antenna port with the same port index of the configured NZP CSI-RS resources in the NZP-CSI-RS-ResourceSet is the same. For frequency range 1, the UE may be configured with one or more NZP CSI-RS set(s), where a NZP-CSI-RS-ResourceSet consists of four periodic NZP CSI-RS resources in two consecutive slots with two periodic NZP CSI-RS resources in each slot. For frequency range 2 the UE 101 may be configured with one or more NZP CSI-RS set(s), where a NZP-CSI-RS-ResourceSet consists of two periodic CSI-RS resources in one slot or with a NZP-CSI-RS-ResourceSet of four periodic NZP CSI-RS resources in two consecutive slots with two periodic NZP CSI-RS resources in each slot.

When the UE 101 is configured with NZP-CSI-RS-ResourceSet(s) configured with higher layer parameter trs-Info may have the CSI-RS resources configured as:
Periodic, with the CSI-RS resources in the NZP-CSI-RS-ResourceSet configured with same periodicity, bandwidth and subcarrier location; and/or
Periodic CSI-RS resource in one set and aperiodic CSI-RS resources in a second set, with the aperiodic CSI-RS and periodic CSI-RS resource having the same bandwidth (with same RB location) and the aperiodic CSI-RS being 'QCL-Type-A' and 'QCL-TypeD', where applicable, with the periodic CSI-RS resources. For frequency range 2, the UE 101 does not expect that the scheduling offset between the last symbol of the PDCCH carrying the triggering DCI and the first symbol of the aperiodic CSI-RS resources is smaller than the UE reported ThresholdSched-Offset. The UE 101 expects that the periodic CSI-RS resource set and aperiodic CSI-RS resource set are configured with the same number of CSI-RS resources and with the same number of CSI-RS resources in a slot. For the aperiodic CSI-RS resource set if triggered, and if the associated periodic CSI-RS resource set is configured with four periodic CSI-RS resources with two consecutive slots with two periodic CSI-RS resources in each slot, the higher layer parameter aperiodic TriggeringOffset indicates the triggering offset for the first slot for the first two CSI-RS resources in the set.

The UE 101 does not expect to be configured with a CSI-ReportConfig that is linked to a CSI-ResourceConfig containing an NZP-CSI-RS-ResourceSet configured with trs-Info and with the CSI-ReportConfig configured with the higher layer parameter timeRestrictionForChannelMeasurements set to 'configured'. The UE 101 does not expect to be configured with a CSI-ReportConfig with the higher layer parameter reportQuantity set to other than 'none' for aperiodic NZP CSI-RS resource set configured with trs-Info. The UE 101 does not expect to be configured with a CSI-ReportConfig for periodic NZP CSI-RS resource set configured with trs-Info. The UE 101 does not expect to be configured with a NZP-CSI-RS-ResourceSet configured both with trs-Info and repetition.

Each CSI-RS resource is configured by the higher layer parameter NZP-CSI-RS-Resource with the following restrictions:
the time-domain locations of the two CSI-RS resources in a slot, or of the four CSI-RS resources in two consecutive slots (which are the same across two consecutive slots), as defined by higher layer parameter CSI-RS-resourceMapping, is given by one of
l∈{4,8}, l∈{5,9}, or l∈{6,10} for frequency range 1 and frequency range 2,
l∈{0,4}, l∈{1,5}, l∈{2,6}, l∈{3,7}, l∈{7,11}, l∈{8,12} or l∈{9,13} for frequency range 2.
a single port CSI-RS resource with density ρ=3 and higher layer parameter density configured by CSI-RS-ResourceMapping.
the bandwidth of the CSI-RS resource, as given by the higher layer parameter freqBand configured by CSI-RS-ResourceMapping, is the minimum of 52 and $N_{RB}^{BWP,i}$ resource blocks, or is equal to $N_{RB}^{BWP,i}$ resource blocks.
the UE 101 is not expected to be configured with the periodicity of $2^\mu \times 10$ slots if the bandwidth of CSI-RS resource is larger than 52 resource blocks.
the periodicity and slot offset for periodic NZP CSI-RS resources, as given by the higher layer parameter periodicityAndOffset configured by NZP-CSI-RS-Resource, is one of $2^\mu X_p$ slots where $X_p$=10, 20, 40, or 80.
same powerControlOffset and powerControlOffsetSS given by NZP-CSI-RS-Resource value across all resources.

For CSI-RS for L1-RSRP computation, if the UE 101 is configured with a NZP-CSI-RS-ResourceSet configured with the higher layer parameter repetition set to 'on', the UE 101 may assume that the CSI-RS resources, within the NZP-CSI-RS-ResourceSet are transmitted with the same downlink spatial domain transmission filter, where the CSI- RS resources in the NZP-CSI-RS-ResourceSet are transmitted in different OFDM symbols. If repetition is set to 'off', the UE shall not assume that the CSI-RS resources within the NZP-CSI-RS-ResourceSet are transmitted with the same downlink spatial domain transmission filter.

If the UE is configured with a CSI-ReportConfig with reportQuantity set to "cri-RSRP", or "none" and if the CSI-ResourceConfig for channel measurement (higher layer parameter resourcesForChannelMeasurement) contains a NZP-CSI-RS-ResourceSet that is configured with the higher layer parameter repetition and without the higher layer parameter trs-Info, the UE can only be configured with the same number (1 or 2) of ports with the higher layer parameter nrofPorts for all CSI-RS resources within the set. If the UE is configured with the CSI-RS resource in the same OFDM symbol(s) as an SS/PBCH block, the UE may assume that the CSI-RS and the SS/PBCH block are quasi co-located with 'QCL-TypeD' if 'QCL-TypeD' is applicable. Furthermore, the UE shall not expect to be configured with the CSI-RS in PRBs that overlap with those of the SS/PBCH block, and the UE shall expect that the same subcarrier spacing is used for both the CSI-RS and the SS/PBCH block.

For CSI-RS for Mobility, if the UE 101 is configured with the higher layer parameter CSI-RS-Resource-Mobility and the higher layer parameter associatedSSB is not configured, the UE 101 performs measurements based on CSI-RS-Resource-Mobility and the UE 101 may base the timing of the CSI-RS resource on the timing of the serving cell. If the UE 101 is configured with the higher layer parameters CSI-RS-Resource-Mobility and associatedSSB, the UE may base the timing of the CSI-RS resource on the timing of the cell given by the cellId of the CSI-RS resource configuration. Additionally, for a given CSI-RS resource, if the associated SS/PBCH block is configured but not detected by the UE, the UE is not required to monitor the corresponding CSI-RS resource. The higher layer parameter isQuasiColocated indicates whether the associated SS/PBCH block given by the associatedSSB and the CSI-RS resource(s) are quasi co-located with respect to, for example, 'QCL-TypeD'. If the UE 101 is configured with the higher layer parameter CSI-RS-Resource-Mobility and with periodicity greater than 10 ms in paired spectrum, the UE may assume the absolute value of the time difference between radio frame i between any two cells, listed in the configuration with the higher layer parameter CSI-RS-CellMobility and with same refFreqCSI-RS, is less than 153600 $T_s$. If the UE 101 is configured with DRX, the UE is not required to perform measurement of CSI-RS resources other than during the active time for measurements based on CSI-RS-Resource-Mobility. If the UE 101 is configured with DRX and DRX cycle in use is larger than 80 ms, the UE may not expect CSI-RS resources are available other than during the active time for measurements based on CSI-RS-Resource-Mobility. Otherwise, the UE may assume CSI-RS are available for measurements based on CSI-RS-Resource-Mobility.

When the UE 101 is configured with the higher layer parameters CSI-RS-Resource-Mobility, the UE 101 may expect to be configured with no more than 96 CSI-RS resources when all CSI-RS resources per frequency layer have been configured with associatedSSB, or with no more than 64 CSI-RS resources per frequency layer when all CSI-RS resources have been configured without associatedSSB or when only some of the CSI-RS resources have been configured with associatedSSB. For frequency range 1, the associatedSSB is optionally present for each CSI-RS resource. For frequency range 2 the associatedSSB is either present for all configured CSI-RS resources or not present for any configured CSI-RS resources-per frequency layer. For any CSI-RS resource configuration, the UE shall assume that the value for parameter cdm-Type is 'No CDM', and there is only one antenna port.

For CSI-RS resource sets associated with resource settings configured with the higher layer parameter resource Type set to 'aperiodic', 'periodic', or 'semi-persistent', trigger states for reporting setting(s) (configured with the higher layer parameter reportConfigType set to 'aperiodic') and/or resource setting for channel and/or interference measurement on one or more component carriers are configured using the higher layer parameter CSI-Aperiodic TriggerStateList. For aperiodic CSI report triggering, a single set of CSI triggering states are higher layer configured, wherein the CSI triggering states can be associated with any candidate DL BWP. The UE 101 is not expected to receive more than one DCI with non-zero CSI request per slot. The UE 101 is not expected to be configured with different TCI-StateId's for the same aperiodic CSI-RS resource ID configured in multiple aperiodic CSI-RS resource sets with the same triggering offset in the same aperiodic trigger state. The UE 101 is not expected to receive more than one aperiodic CSI report request for transmission in a given slot. The UE 101 is not expected to be triggered with a CSI report for a non-active DL BWP.

A trigger state is initiated using the CSI request field in DCI. When all the bits of CSI request field in DCI are set to zero, no CSI is requested. When the number of configured CSI triggering states in CSI-AperiodicTriggerStateList is greater than $2^{N_{TS}}-1$, where $N_{TS}$ is the number of bits in the DCI CSI request field, the UE 101 receives a selection command used to map up to $2^{N_{TS}}-1$ trigger states to the codepoints of the CSI request field in DCI. $N_{TS}$ is configured by the higher layer parameter reportTriggerSize where $N_{TS} \in \{0,1,2,3,4,5,6\}$. When the HARQ/ACK corresponding to the PDSCH carrying the selection command is transmitted in the slot n, the corresponding action and UE assumption(s) on the mapping of the selected CSI trigger state(s) to the codepoint(s) of DCI CSI request field shall be applied starting from slot $n+3N_{slot}^{subframe,\mu}+1$. When the number of CSI triggering states in CSI-AperiodicTriggerStateList is less than or equal to $2^{N_{TS}}-1$, the CSI request field in DCI directly indicates the triggering state. For each aperiodic CSI-RS resource in a CSI-RS resource set associated with each CSI triggering state, the UE 101 identifies the QCL configuration of QCL RS resource(s) and QCL type(s) through higher layer signaling of qcl-info, which contains a list of references to TCI-State's for the aperiodic CSI-RS resources associated with the CSI triggering state. If a State referred to in the list is configured with a reference to an RS associated with 'QCL-TypeD', that RS may be an SS/PBCH block located in the same or different CC/DL BWP or a CSI-RS resource configured as periodic or semi-persistent located in the same or different CC/DL BWP.

If the scheduling offset between the last symbol of the PDCCH carrying the triggering DCI and the first symbol of the aperiodic CSI-RS resources in a NZP-CSI-RS-ResourceSet configured without higher layer parameter trs-Info and without the higher layer parameter repetition is smaller than the UE reported threshold beamSwitchTiming when the reported value is one of the values of {14, 28, 48}. If there is any other DL signal with an indicated TCI state in the same symbols as the CSI-RS, the UE 101 applies the QCL assumption of the other DL signal also when receiving the aperiodic CSI-RS. The other DL signal refers to PDSCH scheduled with offset larger than or equal to the threshold timeDurationForQCL aperiodic CSI-RS scheduled with offset larger than or equal to the UE reported threshold beamSwitchTiming when the reported values is one of the values {14,28,48}, periodic CSI-RS, semi-persistent CSI-RS. If the scheduling offset between the last symbol of the PDCCH carrying the triggering DCI and the first symbol of the aperiodic CSI-RS resources is equal to or greater than the UE reported threshold beamSwitchTiming when the reported value is one of the values of {14,28,48}, the UE 101 is expected to apply the QCL assumptions in the indicated TCI states for the aperiodic CSI-RS resources in the CSI triggering state indicated by the CSI trigger field in DCI.

A non-zero codepoint of the CSI request field in the DCI is mapped to a CSI triggering state according to the order of the associated positions of the up to $2^{N_{TS}}-1$ trigger states in CSI-Aperiodic TriggerStateList with codepoint '1' mapped to the triggering state in the first position. When the UE 101 is configured with the higher layer parameter CSI-AperiodicTriggerStateList, and if a Resource Setting linked to a CSI-ReportConfig has multiple aperiodic resource sets, only one of the aperiodic CSI-RS resource sets from the Resource Setting is associated with the trigger state, and the UE 101 is higher layer configured per trigger state per Resource Setting to select the one CSI-IM/NZP CSI-RS resource set from the Resource Setting.

When aperiodic CSI-RS is used with aperiodic reporting, the CSI-RS offset is configured per resource set by the higher layer parameter aperiodicTriggeringOffset. The CSI-RS triggering offset has the range of 0 to 4 slots. If all the associated trigger states do not have the higher layer parameter qcl-Type set to 'QCL-TypeD' in the corresponding TCI states, the CSI-RS triggering offset is fixed to zero. The aperiodic triggering offset of the CSI-IM follows offset of the associated NZP CSI-RS for channel measurement.

The UE 101 does not expect that aperiodic CSI-RS is transmitted before the OFDM symbol(s) carrying its triggering DCI. If interference measurement is performed on aperiodic NZP CSI-RS, the UE 101 is not expected to be configured with a different aperiodic triggering offset of the NZP CSI-RS for interference measurement from the associated NZP CSI-RS for channel measurement. If the UE 101 is configured with a single carrier for uplink, the UE 101 is not expected to transmit more than one aperiodic CSI report triggered by different DCIs on overlapping OFDM symbols.

For semi-persistent reporting on PUSCH, a set of trigger states are higher layer configured by CSI-SemiPersistentOnPUSCH-TriggerStateList, where the CSI request field in DCI scrambled with SP-CSI-RNTI activates one of the trigger states. For semi-persistent reporting on PUCCH, the PUCCH resource used for transmitting the CSI report are configured by reportConfigType. A UE is not expected to receive a DCI scrambled with SP-CSI-RNTI activating one semi-persistent CSI report with the same CSI-ReportConfigId as in a semi-persistent CSI report which is activated by a previously received DCI scrambled with SP-CSI-RNTI.

Semi-persistent reporting on PUCCH is activated by an activation command (e.g., DCI), which selects one of the semi-persistent Reporting Settings for use by the UE 101 on the PUCCH. When the HARQ-ACK corresponding to the PDSCH carrying the activation command is transmitted in slot n, the indicated semi-persistent Reporting Setting should be applied starting from slot $n+3N_{slot}^{subframe,\mu}+1$.

When the UE 101 is configured with CSI resource setting(s) where the higher layer parameter resourceType set to 'semiPersistent', and when the UE 101 receives an activation command (e.g., DCI) for CSI-RS resource set(s) for channel measurement and CSI-IM/NZP CSI-RS resource set(s) for interference measurement associated with configured CSI resource setting(s), and when the HARQ-ACK corresponding to the PDSCH carrying the selection command is transmitted in slot n, the corresponding actions and the UE assumptions (including QCL assumptions provided by a list of reference to TCI-State's, one per activated resource) on CSI-RS/CSI-IM transmission corresponding to the configured CSI-RS/CSI-IM resource configuration(s) shall be applied starting from slot $n+3N_{slot}^{subframe,\mu}+1$. If a TCI-State referred to in the list is configured with a reference to an RS associated with 'QCL-TypeD', that RS can be an SS/PBCH block, periodic or semi-persistent CSI-RS located in same or different CC/DL BWP.

When the UE 101 is configured with CSI resource setting(s) where the higher layer parameter resourceType set to 'semiPersistent', and when the UE 101 receives a deactivation command (e.g., DCI) for activated CSI-RS/CSI-IM resource set(s) associated with configured CSI resource setting(s), and when the HARQ-ACK corresponding to the PDSCH carrying the selection command is transmitted in slot n, the corresponding actions and UE assumption(s) on cessation of CSI-RS/CSI-IM transmission corresponding to the deactivated CSI-RS/CSI-IM resource set(s) shall apply starting from slot $n+3N_{slot}^{subframe,\mu}+1$.

A codepoint of the CSI request field in the DCI is mapped to a SP-CSI triggering state according to the order of the positions of the configured trigger states in CSI-SemiPersistentOnPUSCH-TriggerStateList, with codepoint '0' mapped to the triggering state in the first position. A UE validates, for semi-persistent CSI activation or release, a DL semi-persistent assignment PDCCH on a DCI only if the following conditions are met: the CRC parity bits of the DCI format are scrambled with a SP-CSI-RNTI provided by higher layer parameter sp-csi-RNTI; and special fields for the DCI format are set.

If validation is achieved, the UE 101 considers the information in the DCI format as a valid activation or valid release of semi-persistent CSI transmission on PUSCH, and the UE 101 activates or deactivates a CSI Reporting Setting indicated by CSI request field in the DCI. If validation is not achieved, the UE considers the DCI format as having been detected with a non-matching CRC.

If the UE 101 has an active semi-persistent CSI-RS/CSI-IM resource configuration, or an active semi-persistent ZP CSI-RS resource set configuration, and has not received a deactivation command, the activated semi-persistent CSI-RS/CSI-IM resource set or the activated semi-persistent ZP CSI-RS resource set configurations are considered to be active when the corresponding DL BWP is active, otherwise they are considered suspended. If the UE 101 is configured with carrier deactivation, the following configurations in the carrier in activated state would also be deactivated and need re-activation configuration(s): semi-persistent CSI-RS/CSI-IM resource, semi-persistent CSI reporting on PUCCH, semi-persistent SRS, semi-persistent ZP CSI-RS resource set Referring back to FIG. 1, the RAN nodes 111 may be configured to communicate with one another via interface 112. In embodiments where the system 100 is an LTE system (e.g., when CN 120 is an EPC 520 as in FIG. 5), the interface 112 may be an X2 interface 112. The X2 interface may be defined between two or more RAN nodes 111 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 101 from an SeNB for user data; information of PDCP PDUs that were not delivered to a UE 101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a 5G or NR system (e.g., when CN 120 is an 5GC 620 as in FIG. 6), the interface 112 may be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support may include context transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network—in this embodiment, core network (CN) 120. The CN 120 may comprise a plurality of network elements 122, which are configured to offer various data and telecommunications services to customers/subscribers (e.g., users of UEs 101) who are connected to the CN 120 via the RAN 110. The components of the CN 120 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

The CN 120 includes one or more servers 122, which may implement various core network elements or application functions (AFs) such as those discussed herein. The CN 120 is shown to be communicatively coupled to application servers 130 via an IP communications interface 125. The application server(s) 130 comprise one or more physical and/or virtualized systems for providing functionality (or services) to one or more clients (e.g., UEs 101) over a network (e.g., network 150). The server(s) 130 may include various computer devices with rack computing architecture component(s), tower computing architecture component(s), blade computing architecture component(s), and/or the like. The server(s) 130 may represent a cluster of servers, a server farm, a cloud computing service, or other grouping or pool of servers, which may be located in one or more datacenters. The server(s) 130 may also be connected to, or otherwise associated with one or more data storage devices (not shown). Moreover, the server(s) 130 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 130 offer applications or services that use IP/network resources. As examples, the server(s) 130 may provide traffic management services, cloud analytics, content streaming services, immersive gaming experiences, social networking and/or microblogging services, and/or other like services. In addition, the various services provided by the server(s) 130 may include initiating and controlling software and/or firmware updates for applications or individual components implemented by the UEs 101. The server(s) 130 can also be configured to support one or more communication services (e.g., Voice-over-Internet Protocol (VoIP) sessions, PTT sessions, group communication sessions, social networking services, etc.) for the UEs 101 via the CN 120.

In embodiments, the CN 120 may be a 5GC (referred to as "5GC 120" or the like), and the RAN 110 may be connected with the CN 120 via an NG interface 113. In embodiments, the NG interface 113 may be split into two parts, an NG user plane (NG-U) interface 114, which carries traffic data between the RAN nodes 111 and a UPF, and the S1 control plane (NG-C) interface 115, which is a signaling interface between the RAN nodes 111 and AMFs. Embodiments where the CN 120 is a 5GC 120 are discussed in more detail with regard to FIG. 6.

In embodiments, the CN 120 may be a 5G CN (referred to as "5GC 120" or the like), while in other embodiments, the CN 120 may be an EPC). Where CN 120 is an EPC (referred to as "EPC 120" or the like), the RAN 110 may be connected with the CN 120 via an S1 interface 113. In embodiments, the S1 interface 113 may be split into two parts, an S1 user plane (S1-U) interface 114, which carries traffic data between the RAN nodes 111 and the S-GW, and the S1-MME interface 115, which is a signaling interface between the RAN nodes 111 and MMES. An example architecture wherein the CN 120 is an EPC 120 is shown by FIG. 5.

Figure 5:
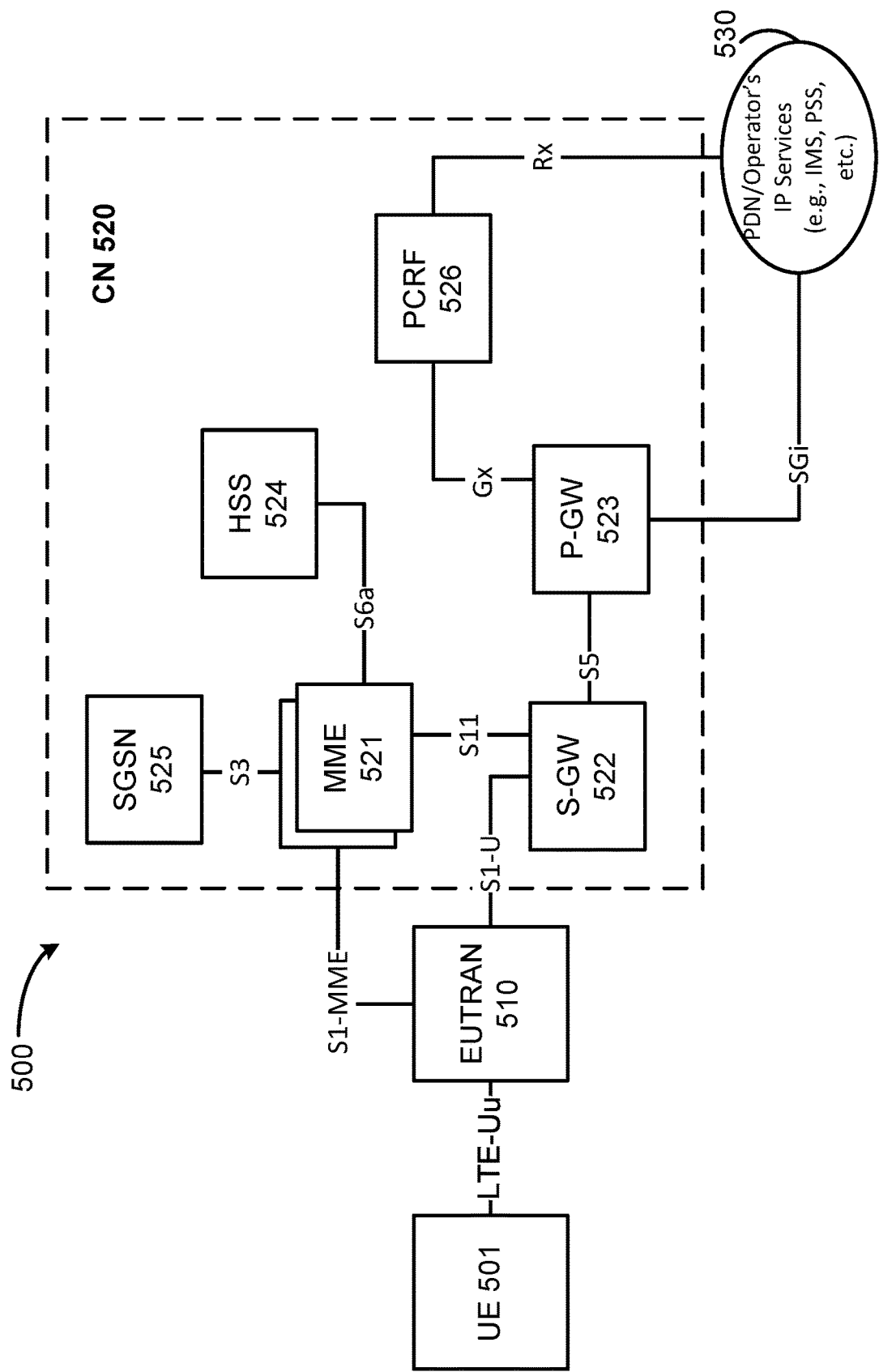
FIG. 5 depicts an architecture of a system including a first core network in accordance with some embodiments.

FIG. 5 illustrates an example architecture of a system 200 including a first CN 520, in accordance with various embodiments. In this example, system 200 may implement the LTE standard wherein the CN 520 is an EPC 520 that corresponds with CN 120 of FIG. 1. Additionally, the UE 501 may be the same or similar as the UEs 101 of FIG. 1, and the E-UTRAN 510 may be a RAN that is the same or similar to the RAN 110 of FIG. 1, and which may include RAN nodes 111 discussed previously. The CN 520 may comprise MMEs 521, an S-GW 522, a P-GW 523, a HSS 524, and a SGSN 525.

The MMEs 521 may be similar in function to the control plane of legacy SGSN, and may implement MM functions to keep track of the current location of a UE 501. The MMEs 521 may perform various MM procedures to manage mobility aspects in access such as gateway selection and tracking area list management. MM (also referred to as "EPS MM" or "EMM" in E-UTRAN systems) refers to all applicable procedures, methods, data storage, etc. that are used to maintain knowledge about a present location of the UE 501, provide user identity confidentiality, and/or perform other like services to users/subscribers. Each UE 501 and the MME 521 may include an MM or EMM sublayer, and an MM context may be established in the UE 501 and the MME 521 when an attach procedure is successfully completed. The MM context may be a data structure or database object that stores MM-related information of the UE 501. The MMEs 521 may be coupled with the HSS 524 via an S6a reference point, coupled with the SGSN 525 via an S3 reference point, and coupled with the S-GW 522 via an S11 reference point.

The SGSN 525 may be a node that serves the UE 501 by tracking the location of an individual UE 501 and performing security functions. In addition, the SGSN 525 may perform Inter-EPC node signaling for mobility between 2G/3G and E-UTRAN 3GPP access networks; PDN and S-GW selection as specified by the MMEs 521; handling of UE 501 time zone functions as specified by the MMEs 521; and MME selection for handovers to E-UTRAN 3GPP access network. The S3 reference point between the MMEs 521 and the SGSN 525 may enable user and bearer information exchange for inter-3GPP access network mobility in idle and/or active states.

The HSS 524 may comprise a database for network users, including subscription-related information to support the network entities' handling of communication sessions. The EPC 520 may comprise one or several HSSs 524, depending on the number of mobile subscribers, on the capacity of the equipment, on the organization of the network, etc. For example, the HSS 524 can provide support for routing/ roaming, authentication, authorization, naming/addressing resolution, location dependencies, etc. An S6a reference point between the HSS 524 and the MMEs 521 may enable transfer of subscription and authentication data for authenticating/authorizing user access to the EPC 520 between HSS 524 and the MMEs 521.

The S-GW 522 may terminate the S1 interface 113 ("S1-U" in FIG. 5) toward the RAN 510, and routes data packets between the RAN 510 and the EPC 520. In addition, the S-GW 522 may be a local mobility anchor point for inter-RAN node handovers and also may provide an anchor for inter-3GPP mobility. Other responsibilities may include lawful intercept, charging, and some policy enforcement. The S11 reference point between the S-GW 522 and the MMEs 521 may provide a control plane between the MMEs 521 and the S-GW 522. The S-GW 522 may be coupled with the P-GW 523 via an S5 reference point.

The P-GW 523 may terminate an SGi interface toward a PDN 530. The P-GW 523 may route data packets between the EPC 520 and external networks such as a network including the application server 130 (alternatively referred to as an "AF") via an IP interface 125 (see e.g., FIG. 1). In embodiments, the P-GW 523 may be communicatively coupled to an application server (application server 130 of FIG. 1 or PDN 530 in FIG. 5) via an IP communications interface 125 (see, e.g., FIG. 1). The S5 reference point between the P-GW 523 and the S-GW 522 may provide user plane tunneling and tunnel management between the P-GW 523 and the S-GW 522. The S5 reference point may also be used for S-GW 522 relocation due to UE 501 mobility and if the S-GW 522 needs to connect to a non-collocated P-GW 523 for the required PDN connectivity. The P-GW 523 may further include a node for policy enforcement and charging data collection (e.g., PCEF (not shown)). Additionally, the SGi reference point between the P-GW 523 and the packet data network (PDN) 530 may be an operator external public, a private PDN, or an intra operator packet data network, for example, for provision of IMS services. The P-GW 523 may be coupled with a PCRF 526 via a Gx reference point.

PCRF 526 is the policy and charging control element of the EPC 520. In a non-roaming scenario, there may be a single PCRF 526 in the Home Public Land Mobile Network (HPLMN) associated with a UE 501's Internet Protocol Connectivity Access Network (IP-CAN) session. In a roaming scenario with local breakout of traffic, there may be two PCRFs associated with a UE 501's IP-CAN session, a Home PCRF (H-PCRF) within an HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate QoS and charging parameters. The PCRF 526 may provision this rule into a PCEF (not shown) with the appropriate TFT and QCI, which commences the QoS and charging as specified by the application server 530. The Gx reference point between the PCRF 526 and the P-GW 523 may allow for the transfer of QoS policy and charging rules from the PCRF 526 to PCEF in the P-GW 523. An Rx reference point may reside between the PDN 530 (or "AF 530") and the PCRF 526.

Figure 6:
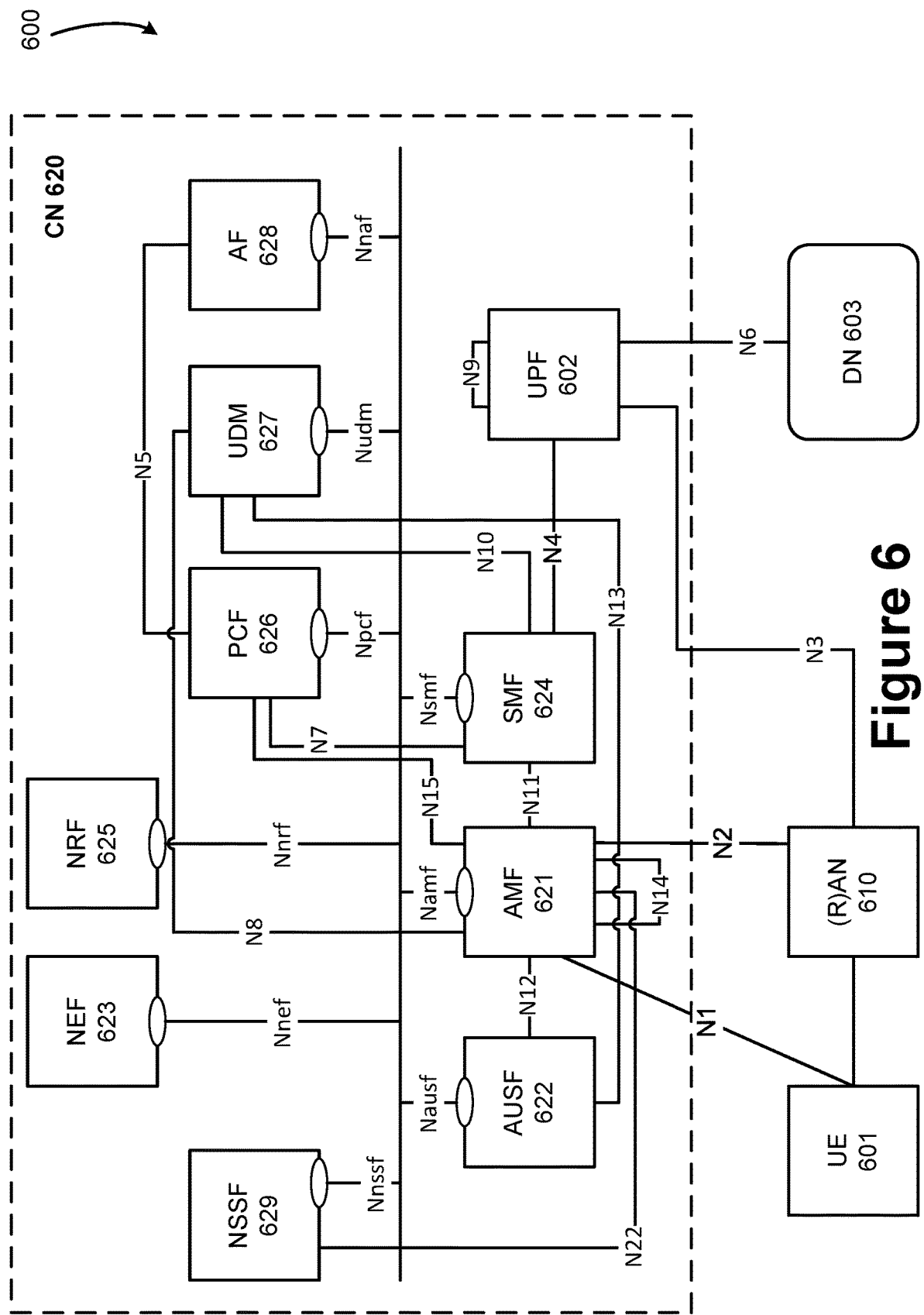
FIG. 6 depicts an architecture of a system including a second core network in accordance with some embodiments.

FIG. 6 illustrates an architecture of a system 600 including a second CN 620 in accordance with various embodiments. The system 600 is shown to include a UE 601, which may be the same or similar to the UEs 101 and UE 501 discussed previously; a (R)AN 610, which may be the same or similar to the RAN 110 and RAN 510 discussed previously, and which may include RAN nodes 111 discussed previously; and a DN 603, which may be, for example, operator services, Internet access or 3rd party services; and a 5GC 620. The 5GC 620 may include an AUSF 622; an AMF 621; a SMF 624; a NEF 623; a PCF 626; a NRF 625; a UDM 627; an AF 628; a UPF 602; and a NSSF 629.

The UPF 602 may act as an anchor point for intra-RAT and inter-RAT mobility, an external PDU session point of interconnect to DN 603, and a branching point to support multi-homed PDU session. The UPF 602 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 602 may include an uplink classifier to support routing traffic flows to a data network. The DN 603 may represent various network operator services, Internet access, or third party services. DN 603 may include, or be similar to, application server 130 discussed previously. The UPF 602 may interact with the SMF 624 via an N4 reference point between the SMF 624 and the UPF 602.

The AUSF 622 may store data for authentication of UE 601 and handle authentication-related functionality. The AUSF 622 may facilitate a common authentication framework for various access types. The AUSF 622 may communicate with the AMF 621 via an N12 reference point between the AMF 621 and the AUSF 622; and may communicate with the UDM 627 via an N13 reference point between the UDM 627 and the AUSF 622. Additionally, the AUSF 622 may exhibit an Nausf service-based interface.

The AMF 621 may be responsible for registration management (e.g., for registering UE 601, etc.), connection management, reachability management, mobility management, and lawful interception of AMF-related events, and access authentication and authorization. The AMF 621 may be a termination point for the an N11 reference point between the AMF 621 and the SMF 624. The AMF 621 may provide transport for SM messages between the UE 601 and the SMF 624, and act as a transparent proxy for routing SM messages. AMF 621 may also provide transport for SMS messages between UE 601 and an SMSF (not shown by FIG. 6). AMF 621 may act as SEAF, which may include interaction with the AUSF 622 and the UE 601, receipt of an intermediate key that was established as a result of the UE 601 authentication process. Where USIM based authentication is used, the AMF 621 may retrieve the security material from the AUSF 622. AMF 621 may also include a SCM function, which receives a key from the SEA that it uses to derive access-network specific keys. Furthermore, AMF 621 may be a termination point of a RAN CP interface, which may include or be an N2 reference point between the (R)AN 610 and the AMF 621; and the AMF 621 may be a termination point of NAS (N1) signalling, and perform NAS ciphering and integrity protection.

AMF 621 may also support NAS signalling with a UE 601 over an N3 IWF interface. The N3IWF may be used to provide access to untrusted entities. N3IWF may be a termination point for the N2 interface between the (R)AN 610 and the AMF 621 for the control plane, and may be a termination point for the N3 reference point between the (R)AN 610 and the UPF 602 for the user plane. As such, the AMF 621 may handle N2 signalling from the SMF 624 and the AMF 621 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 601 and AMF 621 via an N1 reference point between the UE 601 and the AMF 621, and relay uplink and downlink user-plane packets between the UE 601 and UPF 602. The N3IWF also provides mechanisms for IPsec tunnel establishment with the UE 601. The AMF 621 may exhibit an Namf service-based interface, and may be a termination point for an N14 reference point between two AMFs 621 and an N17 reference point between the AMF 621 and a 5G-EIR (not shown by FIG. 6).

The UE 601 may need to register with the AMF 621 in order to receive network services. RM is used to register or deregister the UE 601 with the network (e.g., AMF 621), and establish a UE context in the network (e.g., AMF 621). The UE 601 may operate in an RM-REGISTERED state or an RM-DEREGISTERED state. In the RM-DEREGISTERED state, the UE 601 is not registered with the network, and the UE context in AMF 621 holds no valid location or routing information for the UE 601 so the UE 601 is not reachable by the AMF 621. In the RM-REGISTERED state, the UE 601 is registered with the network, and the UE context in AMF 621 may hold a valid location or routing information for the UE 601 so the UE 601 is reachable by the AMF 621. In the RM-REGISTERED state, the UE 601 may perform mobility Registration Update procedures, perform periodic Registration Update procedures triggered by expiration of the periodic update timer (e.g., to notify the network that the UE 601 is still active), and perform a Registration Update procedure to update UE capability information or to re-negotiate protocol parameters with the network, among others.

The AMF 621 may store one or more RM contexts for the UE 601, where each RM context is associated with a specific access to the network. The RM context may be a data structure, database object, etc. that indicates or stores, inter alia, a registration state per access type and the periodic update timer. The AMF 621 may also store a 5GC MM context that may be the same or similar to the (E)MM context discussed previously. In various embodiments, the AMF 621 may store a CE mode B Restriction parameter of the UE 601 in an associated MM context or RM context. The AMF 621 may also derive the value, when needed, from the UE's usage setting parameter already stored in the UE context (and/or MM/RM context).

CM may be used to establish and release a signaling connection between the UE 601 and the AMF 621 over the N1 interface. The signaling connection is used to enable NAS signaling exchange between the UE 601 and the CN 620, and comprises both the signaling connection between the UE and the AN (e.g., RRC connection or UE-N3IWF connection for non-3GPP access) and the N2 connection for the UE 601 between the AN (e.g., RAN 610) and the AMF 621. The UE 601 may operate in one of two CM states, CM-IDLE mode or CM-CONNECTED mode. When the UE 601 is operating in the CM-IDLE state/mode, the UE 601 may have no NAS signaling connection established with the AMF 621 over the N1 interface, and there may be (R)AN 610 signaling connection (e.g., N2 and/or N3 connections) for the UE 601. When the UE 601 is operating in the CM-CONNECTED state/mode, the UE 601 may have an established NAS signaling connection with the AMF 621 over the N1 interface, and there may be a (R)AN 610 signaling connection (e.g., N2 and/or N3 connections) for the UE 601. Establishment of an N2 connection between the (R)AN 610 and the AMF 621 may cause the UE 601 to transition from CM-IDLE mode to CM-CONNECTED mode, and the UE 601 may transition from the CM-CONNECTED mode to the CM-IDLE mode when N2 signaling between the (R)AN 610 and the AMF 621 is released.

The SMF 624 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM refers to management of a PDU session, and a PDU session or "session" refers to a PDU connectivity service that provides or enables the exchange of PDUs between a UE 601 and a data network (DN) 603 identified by a Data Network Name (DNN). PDU sessions may be established upon UE 601 request, modified upon UE 601 and 5GC 620 request, and released upon UE 601 and 5GC 620 request using NAS SM signaling exchanged over the N1 reference point between the UE 601 and the SMF 624. Upon request from an application server, the 5GC 620 may trigger a specific application in the UE 601. In response to receipt of the trigger message, the UE 601 may pass the trigger message (or relevant parts/information of the trigger message) to one or more identified applications in the UE 601. The identified application(s) in the UE 601 may establish a PDU session to a specific DNN. The SMF 624 may check whether the UE 601 requests are compliant with user subscription information associated with the UE 601. In this regard, the SMF 624 may retrieve and/or request to receive update notifications on SMF 624 level subscription data from the UDM 627.

The SMF 624 may include the following roaming functionality: handling local enforcement to apply QoS SLAB (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 624 may be included in the system 600, which may be between another SMF 624 in a visited network and the SMF 624 in the home network in roaming scenarios. Additionally, the SMF 624 may exhibit the Nsmf service-based interface.

The NEF 623 may provide means for securely exposing the services and capabilities provided by 3GPP network functions for third party, internal exposure/re-exposure, Application Functions (e.g., AF 628), edge computing or fog computing systems, etc. In such embodiments, the NEF 623 may authenticate, authorize, and/or throttle the AFs. NEF 623 may also translate information exchanged with the AF 628 and information exchanged with internal network functions. For example, the NEF 623 may translate between an AF-Service-Identifier and an internal 5GC information. NEF 623 may also receive information from other network functions (NFs) based on exposed capabilities of other network functions. This information may be stored at the NEF 623 as structured data, or at a data storage NF using standardized interfaces. The stored information can then be re-exposed by the NEF 623 to other NFs and AFs, and/or used for other purposes such as analytics. Additionally, the NEF 623 may exhibit an Nnef service-based interface.

The NRF 625 may support service discovery functions, receive NF discovery requests from NF instances, and provide the information of the discovered NF instances to the NF instances. NRF 625 also maintains information of available NF instances and their supported services. As used herein, the terms "instantiate," "instantiation," and the like refers to the creation of an instance, and an "instance" refers to a concrete occurrence of an object, which may occur, for example, during execution of program code. Additionally, the NRF 625 may exhibit the Nnrf service-based interface.

The PCF 626 may provide policy rules to control plane function(s) to enforce them, and may also support unified policy framework to govern network behaviour. The PCF 626 may also implement an FE to access subscription information relevant for policy decisions in a UDR of the UDM 627. The PCF 626 may communicate with the AMF 621 via an N15 reference point between the PCF 626 and the AMF 621, which may include a PCF 626 in a visited network and the AMF 621 in case of roaming scenarios. The PCF 626 may communicate with the AF 628 via an N5 reference point between the PCF 626 and the AF 628; and with the SMF 624 via an N7 reference point between the PCF 626 and the SMF 624. The system 600 and/or CN 620 may also include an N24 reference point between the PCF 626 (in the home network) and a PCF 626 in a visited network. Additionally, the PCF 626 may exhibit an Npcf service-based interface.

The UDM 627 may handle subscription-related information to support the network entities' handling of communication sessions, and may store subscription data of UE 601. For example, subscription data may be communicated between the UDM 627 and the AMF 621 via an N8 reference point between the UDM 627 and the AMF. The UDM 627 may include two parts, an application FE and a UDR (the FE and UDR are not shown by FIG. 6). The UDR may store subscription data and policy data for the UDM 627 and the PCF 626, and/or structured data for exposure and application data (including PFDs for application detection, application request information for multiple UEs 601) for the NEF 623. The Nudr service-based interface may be exhibited by the UDR 521 to allow the UDM 627, PCF 626, and NEF 623 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 624 via an N10 reference point between the UDM 627 and the SMF 624. UDM 627 may also support SMS management, wherein an SMS-FE implements the similar application logic as discussed previously. Additionally, the UDM 627 may exhibit the Nudm service-based interface.

The AF 628 may provide application influence on traffic routing, provide access to the NCE, and interact with the policy framework for policy control. The NCE may be a mechanism that allows the 5GC 620 and AF 628 to provide information to each other via NEF 623, which may be used for edge computing implementations. In such implementations, the network operator and third party services may be hosted close to the UE 601 access point of attachment to achieve an efficient service delivery through the reduced end-to-end latency and load on the transport network. For edge computing implementations, the 5GC may select a UPF 602 close to the UE 601 and execute traffic steering from the UPF 602 to DN 603 via the N6 interface. This may be based on the UE subscription data, UE location, and information provided by the AF 628. In this way, the AF 628 may influence UPF (re)selection and traffic routing. Based on operator deployment, when AF 628 is considered to be a trusted entity, the network operator may permit AF 628 to interact directly with relevant NFs. Additionally, the AF 628 may exhibit an Naf service-based interface.

The NSSF 629 may select a set of network slice instances serving the UE 601. The NSSF 629 may also determine allowed NSSAI and the mapping to the subscribed S-NS-SAIs, if needed. The NSSF 629 may also determine the AMF set to be used to serve the UE 601, or a list of candidate AMF(s) 621 based on a suitable configuration and possibly by querying the NRF 625. The selection of a set of network slice instances for the UE 601 may be triggered by the AMF 621 with which the UE 601 is registered by interacting with the NSSF 629, which may lead to a change of AMF 621. The NSSF 629 may interact with the AMF 621 via an N22 reference point between AMF 621 and NSSF 629; and may communicate with another NSSF 629 in a visited network via an N31 reference point (not shown by FIG. 6). Additionally, the NSSF 629 may exhibit an Nnssf service-based interface.

As discussed previously, the CN 620 may include an SMSF, which may be responsible for SMS subscription checking and verification, and relaying SM messages to/from the UE 601 to/from other entities, such as an SMS-GMSC/IWMSC/SMS-router. The SMS may also interact with AMF 621 and UDM 627 for a notification procedure that the UE 601 is available for SMS transfer (e.g., set a UE not reachable flag, and notifying UDM 627 when UE 601 is available for SMS).

The CN 120 may also include other elements that are not shown by FIG. 6, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 6). Individual NFs may share a UDSF for storing their respective unstructured data or individual NFs may each have their own UDSF located at or near the individual NFs. Additionally, the UDSF may exhibit an Nudsf service-based interface (not shown by FIG. 6). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 6 for clarity. In one example, the CN 620 may include an Nx interface, which is an inter-CN interface between the MME (e.g., MME 521) and the AMF 621 in order to enable interworking between CN 620 and CN 520. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 7:
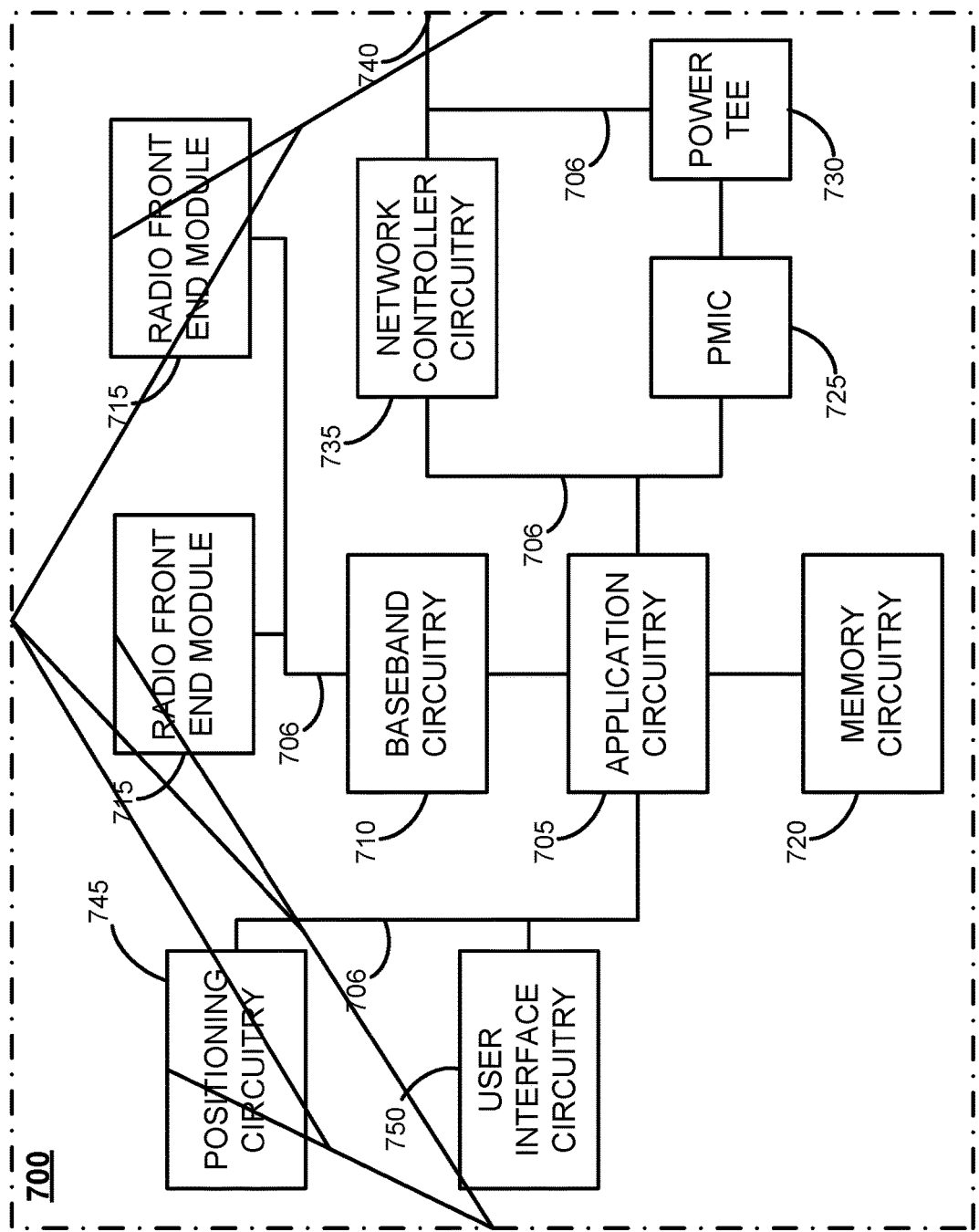
FIG. 7 depicts an example of infrastructure equipment in accordance with various embodiments.

FIG. 7 illustrates an example of infrastructure equipment 700 in accordance with various embodiments. The infrastructure equipment 700 (or "system 700") may be implemented as a base station, radio head, RAN node such as the RAN nodes 111 and/or AP 106 shown and described previously, application server(s) 130, and/or any other element/device discussed herein. In other examples, the system 700 could be implemented in or by a UE.

The system 700 includes application circuitry 705, baseband circuitry 710, one or more radio front end modules (RFEMs) 715, memory circuitry 720, power management integrated circuitry (PMIC) 725, power tee circuitry 730, network controller circuitry 735, network interface connector 740, satellite positioning circuitry 745, and user interface 750. In some embodiments, the device 700 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 705 includes circuitry such as, but not limited to one or more processors (or processor cores), cache memory, and one or more of low drop-out voltage regulators (LDOs), interrupt controllers, serial interfaces such as SPI, $I^2C$ or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 705 may be coupled with or may include memory/storage elements and may be configured to execute instructions stored in the memory/storage to enable various applications or operating systems to run on the system 700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 705 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 705 may comprise, or may be, a special-purpose processor/controller to operate according to the various embodiments herein. As examples, the processor(s) of application circuitry 705 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 700 may not utilize application circuitry 705, and instead may include a special-purpose processor/controller to process IP data received from an EPC or 5GC, for example.

In some implementations, the application circuitry 705 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 705 may comprise logic blocks or logic fabric, and other interconnected resources that may be programmed to perform various functions, such as the procedures, methods, functions, etc. of the various embodiments discussed herein. In such embodiments, the circuitry of application circuitry 705 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 710 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 710 are discussed infra with regard to FIG. 10.

User interface circuitry 750 may include one or more user interfaces designed to enable user interaction with the system 700 or peripheral component interfaces designed to enable peripheral component interaction with the system 700. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 715 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1011 of FIG. 10 infra), and the RFEM may be connected to multiple antennas. In alternative implementations, both mmWave and sub-mmWave radio functions may be implemented in the same physical RFEM 715, which incorporates both mmWave antennas and sub-mmWave.

The memory circuitry 720 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 720 may be implemented as one or more of solder down packaged integrated circuits, socketed memory modules and plug-in memory cards.

The PMIC 725 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 730 may provide for electrical power drawn from a network cable to provide both power supply and data connectivity to the infrastructure equipment 700 using a single cable.

The network controller circuitry 735 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 700 via network interface connector 740 using a physical connection, which may be electrical (commonly referred to as a "copper interconnect"), optical, or wireless. The network controller circuitry 735 may include one or more dedicated processors and/or FPGAs to communicate using one or more of the aforementioned protocols. In some implementations, the network controller circuitry 735 may include multiple controllers to provide connectivity to other networks using the same or different protocols.

The positioning circuitry 745 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 745 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 745 may include a Micro-Technology for Positioning, Navigation, and Timing (Micro-PNT) IC that uses a master timing clock to perform position tracking/estimation without GNSS assistance. The positioning circuitry 745 may also be part of, or interact with, the baseband circuitry 710 and/or RFEMs 715 to communicate with the nodes and components of the positioning network. The positioning circuitry 745 may also provide position data and/or time data to the application circuitry 705, which may use the data to synchronize operations with various infrastructure (e.g., RAN nodes 111, etc.), or the like.

The components shown by FIG. 7 communicate with one another using interface circuitry, which may include interconnect (IX) 706. The IX 706 may include any number of bus and/or IX technologies such as industry standard architecture (ISA), extended ISA (EISA), inter-integrated circuit (I²C), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath interconnect (QPI), Ultra Path Interconnect (UPI), Intel® Omni-Path Architecture (OPA) IX, RapidIO™ system IXs, Cache Coherent Interconnect for Accelerators (CCIA), Gen-Z Consortium IXs, Open Coherent Accelerator Processor Interface (OpenCAPI) IX, a Hyper-Transport interconnect, and/or any number of other IX technologies. The IX technology may be a proprietary bus, for example, used in an SoC based system.

Figure 8:
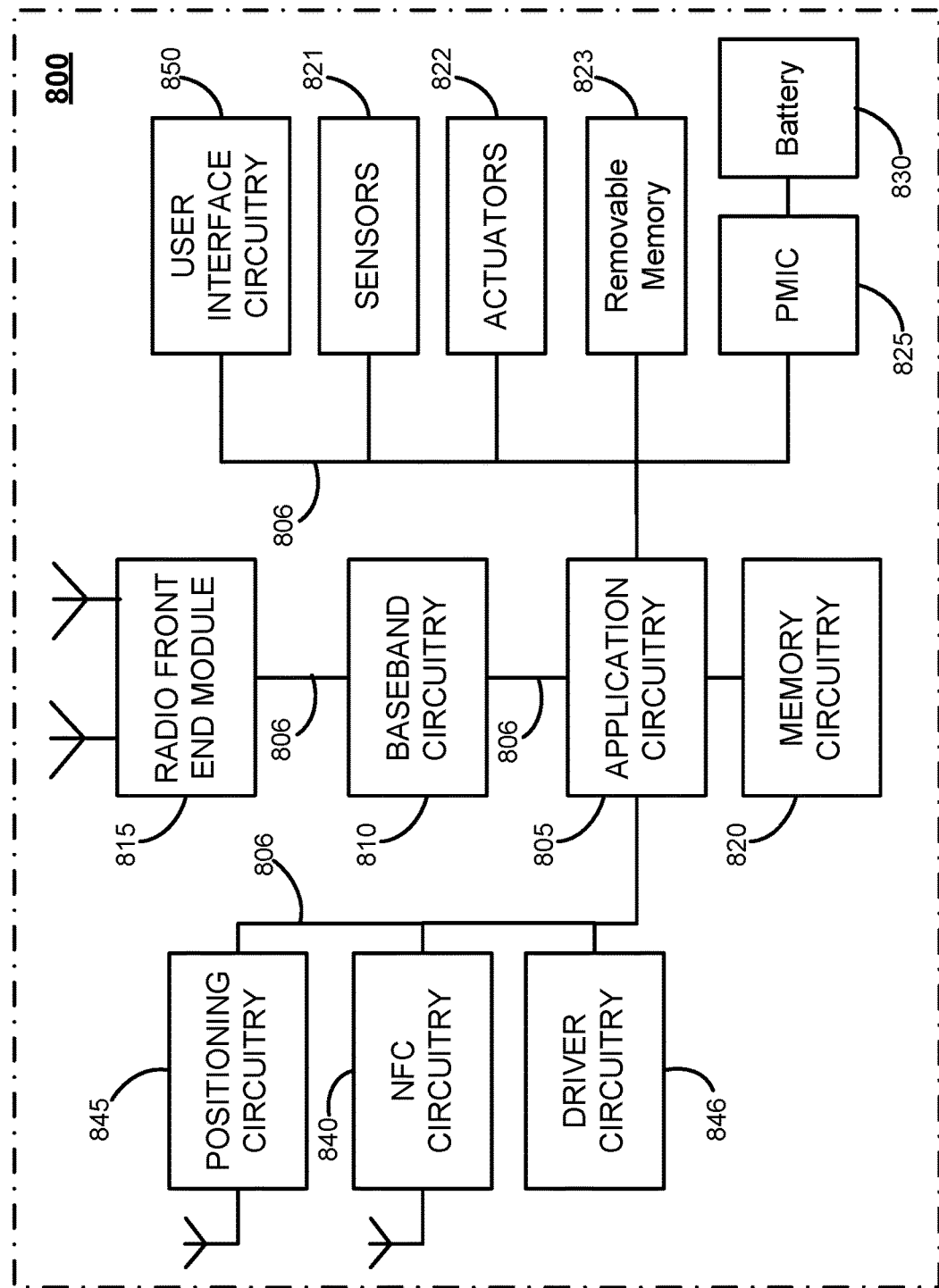
FIG. 8 depicts example components of a computer platform in accordance with various embodiments.

FIG. 8 illustrates an example of a platform 800 (or "device 800") in accordance with various embodiments. In embodiments, the computer platform 800 may be suitable for use as UEs 101, 501, 601, application servers 130, and/or any other element/device discussed herein. The platform 800 may include any combinations of the components shown in the example. The components of platform 800 may be implemented as integrated circuits (ICs), portions thereof, discrete electronic devices, or other modules, logic, hardware, software, firmware, or a combination thereof adapted in the computer platform 800, or as components otherwise incorporated within a chassis of a larger system. The block diagram of FIG. 8 is intended to show a high level view of components of the computer platform 800. However, some of the components shown may be omitted, additional components may be present, and different arrangement of the components shown may occur in other implementations.

Application circuitry 805 includes circuitry such as, but not limited to one or more processors (or processor cores), cache memory, and one or more of LDOs, interrupt controllers, serial interfaces such as SPI, I$^2$C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 805 may be coupled with or may include memory/storage elements and may be configured to execute instructions stored in the memory/storage to enable various applications or operating systems to run on the system 800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 805 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. The processors (or cores) of the application circuitry 805 may be coupled with or may include memory/storage and may be configured to execute instructions stored in the memory/storage to enable various applications or operating systems to run on the system 800. In these embodiments, the processors (or cores) of the application circuitry 805 are configured to operate application software to provide a specific service to a user of the system 800. In some embodiments, the application circuitry 805 may comprise, or may be, a special-purpose processor/controller to operate according to the various embodiments herein.

As examples, the processor(s) of application circuitry 805 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 805 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 805 may be a part of a system on a chip (SoC) in which the application circuitry 805 and other components are formed into a single integrated circuit, or a single package, such as the Edison™ or Galileo™ SoC boards from Intel® Corporation. Other examples of the processor circuitry of application circuitry 705 are mentioned elsewhere in the present disclosure.

Additionally or alternatively, application circuitry 805 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 805 may comprise logic blocks or logic fabric, and other interconnected resources that may be programmed to perform various functions, such as the procedures, methods, functions, etc. of the various embodiments discussed herein. In such embodiments, the circuitry of application circuitry 805 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 810 may be implemented, for example, as a solder-down substrate including one or more integrated circuits, a single packaged integrated circuit soldered to a main circuit board or a multi-chip module containing two or more integrated circuits. The baseband circuitry 810 may include circuitry such as, but not limited to, one or more single-core or multi-core processors (e.g., one or more baseband processors) or control logic to process baseband signals received from a receive signal path of the RFEMs 815, and to generate baseband signals to be provided to the RFEMs 815 via a transmit signal path. In various embodiments, the baseband circuitry 810 may implement a real-time OS (RTOS) to manage resources of the baseband circuitry 810, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. The various hardware electronic elements of baseband circuitry 810 are discussed infra with regard to FIG. 10.

The RFEMs 815 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1011 of FIG. 10 infra), and the RFEM may be connected to multiple antennas. In alternative implementations, both mmWave and sub-mmWave radio functions may be implemented in the same physical RFEM 815, which incorporates both mmWave antennas and sub-mmWave.

The memory circuitry 820 may include any number and type of memory devices used to provide for a given amount of system memory. As examples, the memory circuitry 820 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 820 may be developed in accordance with a Joint Electron Devices Engineering Council (JEDEC) low power double data rate (LPDDR)-based design, such as LPDDR2, LPDDR3, LPDDR4, or the like. Memory circuitry 820 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 820 may be on-die memory or registers associated with the application circuitry 805. To provide for persistent storage of information such as data, applications, operating systems and so forth, memory circuitry 820 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 800 may incorporate the three-dimensional (3D) cross-point (XPOINT) memories from Intel® and Micron®.

Removable memory circuitry 823 may include devices, circuitry, enclosures/housings, ports or receptacles, etc. used to couple portable data storage devices with the platform 800. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

In some implementations, the memory circuitry 820 and/or the removable memory 823 provide persistent storage of information such as data, applications, operating systems (OS), and so forth. The persistent storage circuitry is configured to store computational logic (or "modules") in the form of software, firmware, or hardware commands to implement the techniques described herein. The computational logic may be employed to store working copies and/or permanent copies of computer programs (or data to create the computer programs) for the operation of various components of platform 800 (e.g., drivers, etc.), an operating system of platform 800, one or more applications, and/or for carrying out the embodiments discussed herein. The computational logic may be stored or loaded into memory circuitry 820 as instructions (or data to create the instructions) for execution by the application circuitry 805 to provide the functions described herein. The various elements may be implemented by assembler instructions supported by processor circuitry or high-level languages that may be compiled into such instructions (or data to create the instructions). The permanent copy of the programming instructions may be placed into persistent storage devices of persistent storage circuitry in the factory or in the field through, for example, a distribution medium (not shown), through a communication interface (e.g., from a distribution server (not shown)), or OTA.

Figure 12:
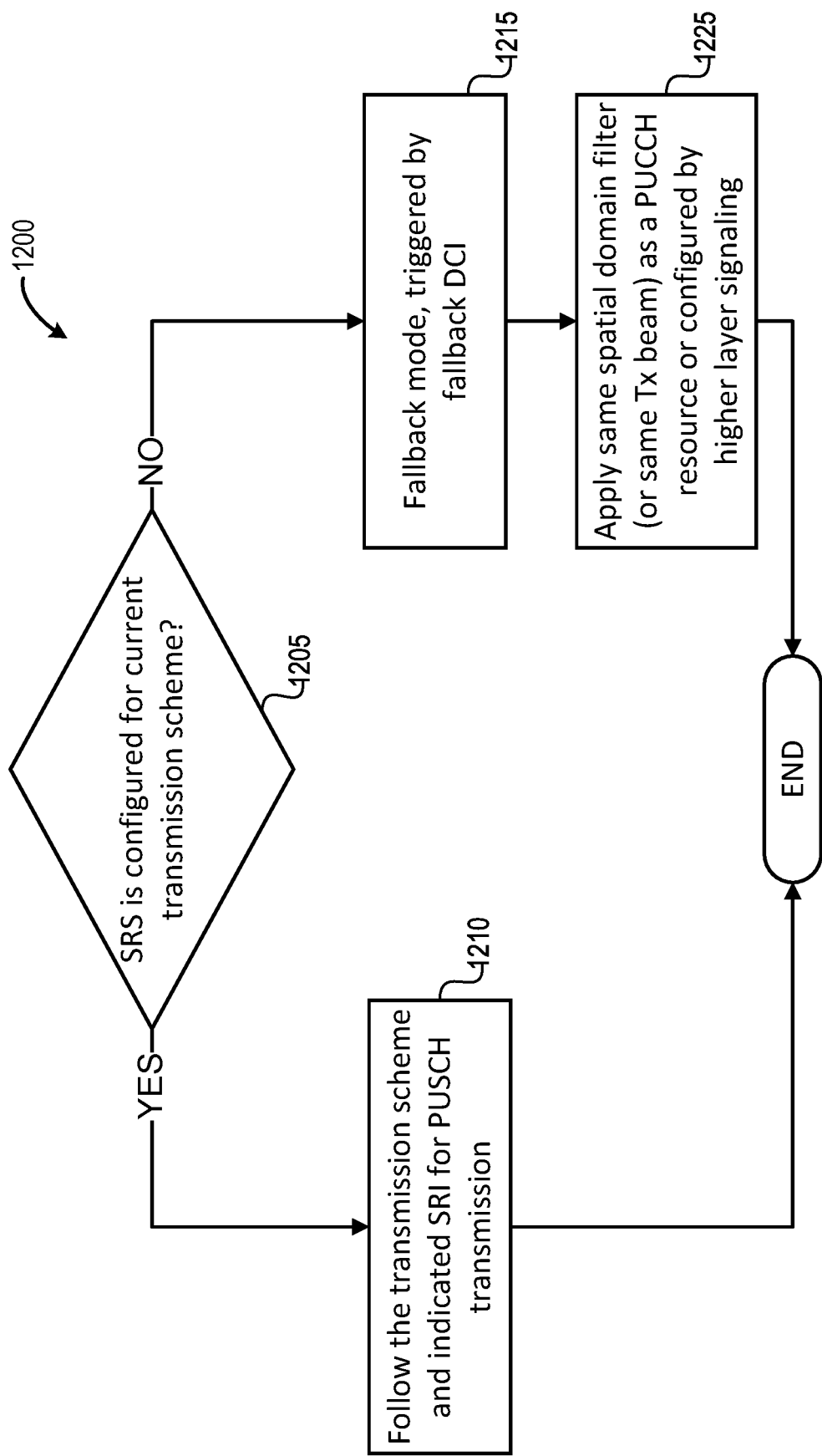
FIGS. 12-14 depict example processes for practicing the various embodiments discussed herein. In particular.
Figure 13:
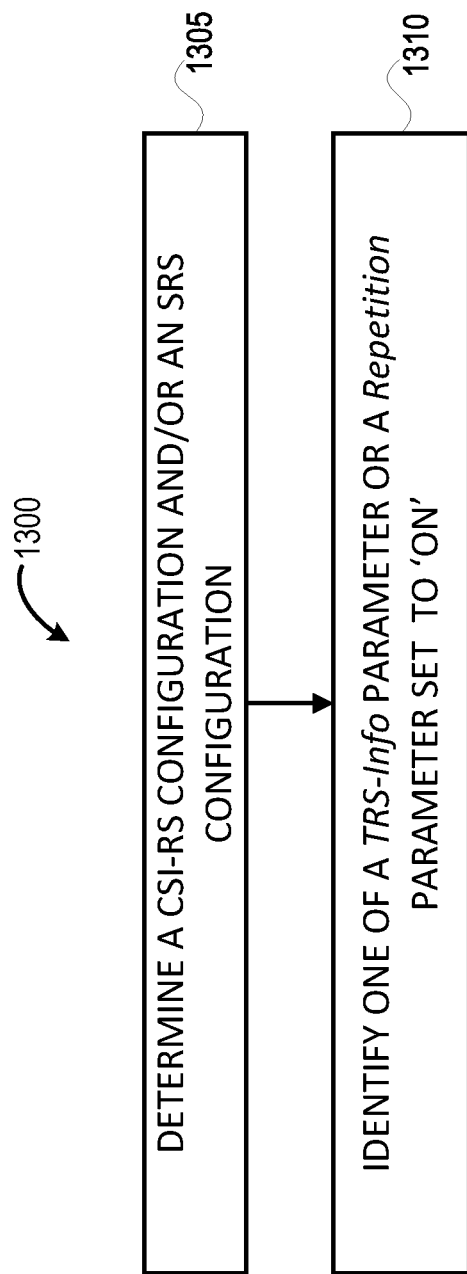
Figure 14:
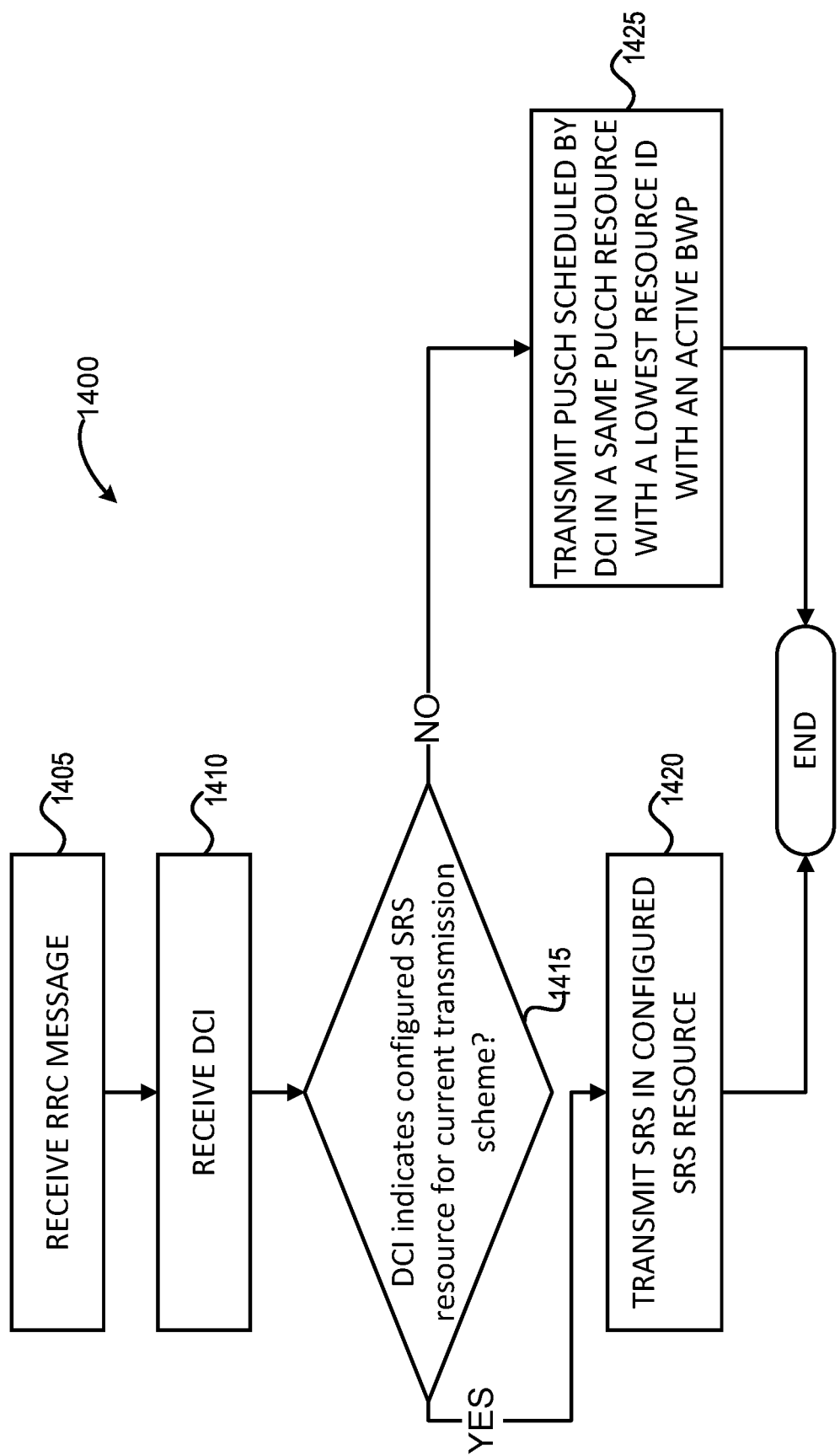

In an example, the instructions provided via the memory circuitry 820 and/or the persistent storage circuitry are embodied as one or more non-transitory computer readable storage media including program code, a computer program product (or data to create the computer program) with the computer program or data, to direct the application circuitry 805 of platform 800 to perform electronic operations in the platform 800, and/or to perform a specific sequence or flow of actions, for example, as described with respect to the flowchart(s) and block diagram(s) of operations and functionality depicted infra (see e.g., FIGS. 12-14). The application circuitry 805 accesses the one or more non-transitory computer readable storage media over the IX 806.

Although the instructions and/or computational logic have been described as code blocks included in the memory circuitry 820 and/or code blocks in the persistent storage circuitry, it should be understood that any of the code blocks may be replaced with hardwired circuits, for example, built into an FPGA, ASIC, or some other suitable circuitry. For example, where application circuitry 805 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The platform 800 may also include interface circuitry (not shown) that is used to connect external devices with the platform 800. The external devices connected to the platform 800 via the interface circuitry include sensor circuitry 821 and actuators 822, as well as removable memory devices coupled to removable memory circuitry 823.

The sensor circuitry 821 include devices, modules, or subsystems whose purpose is to detect events or changes in its environment and send the information (sensor data) about the detected events to some other a device, module, subsystem, etc. Examples of such sensors include, inter alia, inertia measurement units (IMUS) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

Actuators 822 include devices, modules, or subsystems whose purpose is to enable platform 800 to change its state, position, and/or orientation, or move or control a mechanism or (sub)system. The actuators 822 comprise electrical and/or mechanical devices for moving or controlling a mechanism or system, and converts energy (e.g., electric current or moving air and/or liquid) into some kind of motion. The actuators 822 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 822 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The platform 1000 may be configured to operate one or more actuators 822 based on one or more captured events and/or instructions or control signals received from a service provider and/or various client systems.

In some implementations, the interface circuitry may connect the platform 800 with positioning circuitry 845. The positioning circuitry 845 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 845 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 845 may include a Micro-PNT IC that uses a master timing clock to perform position tracking/estimation without GNSS assistance. The positioning circuitry 845 may also be part of, or interact with, the baseband circuitry 810 and/or RFEMs 815 to communicate with the nodes and components of the positioning network. The positioning circuitry 845 may also provide position data and/or time data to the application circuitry 805, which may use the data to synchronize operations with various infrastructure (e.g., radio base stations), for turn-by-turn navigation applications, or the like In some implementations, the interface circuitry may connect the platform 800 with Near-Field Communication (NFC) circuitry 840. NFC circuitry 840 is configured to provide contactless, short-range communications based on radio frequency identification (RFID) standards, wherein magnetic field induction is used to enable communication between NFC circuitry 840 and NFC-enabled devices external to the platform 800 (e.g., an "NFC touchpoint"). NFC circuitry 840 comprises an NFC controller coupled with an antenna element and a processor coupled with the NFC controller. The NFC controller may be a chip/IC providing NFC functionalities to the NFC circuitry 840 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 840, or initiate data transfer between the NFC circuitry 840 and another active NFC device (e.g., a smartphone or an NFC-enabled POS terminal) that is proximate to the platform 800.

The driver circuitry 846 may include software and hardware elements that operate to control particular devices that are embedded in the platform 800, attached to the platform 800, or otherwise communicatively coupled with the platform 800. The driver circuitry 846 may include individual drivers allowing other components of the platform 800 to interact with or control various input/output (I/O) devices that may be present within, or connected to, the platform 800. For example, driver circuitry 846 may include a display driver to control and allow access to a display device, a touchscreen driver to control and allow access to a touchscreen interface of the platform 800, sensor drivers to obtain sensor readings of sensor circuitry 821 and control and allow access to sensor circuitry 821, actuator drivers to obtain actuator positions of the actuators 822 and/or control and allow access to the actuators 822, a camera driver to control and allow access to an embedded image capture device, audio drivers to control and allow access to one or more audio devices.

The power management integrated circuitry (PMIC) 825 (also referred to as "power management circuitry 825") may manage power provided to various components of the platform 800. In particular, with respect to the baseband circuitry 810, the PMIC 825 may control power-source selection, voltage scaling, battery charging, or DC-to-DC conversion. The PMIC 825 may often be included when the platform 800 is capable of being powered by a battery 830, for example, when the device is included in a UE 101, 501, 601.

In some embodiments, the PMIC 825 may control, or otherwise be part of, various power saving mechanisms of the platform 800. For example, if the platform 800 is in an RRC_Connected state, where it is still connected to the RAN node as it expects to receive traffic shortly, then it may enter a state known as DRX after a period of inactivity. During this state, the platform 800 may power down for brief intervals of time and thus save power. If there is no data traffic activity for an extended period of time, then the platform 800 may transition off to an RRC_Idle state, where it disconnects from the network and does not perform operations such as channel quality feedback, handover, etc. The platform 800 goes into a very low power state and it performs paging where again it periodically wakes up to listen to the network and then powers down again. The platform 800 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 830 may power the platform 800, although in some examples the platform 800 may be mounted deployed in a fixed location, and may have a power supply coupled to an electrical grid. The battery 830 may be a lithium ion battery, a metal-air battery, such as a zinc-air battery, an aluminum-air battery, a lithium-air battery, and the like. In some implementations, such as in V2X applications, the battery 830 may be a typical lead-acid automotive battery.

In some implementations, the battery 830 may be a "smart battery," which includes or is coupled with a Battery Management System (BMS) or battery monitoring integrated circuitry. The BMS may be included in the platform 800 to track the state of charge (SoCh) of the battery 830. The BMS may be used to monitor other parameters of the battery 830 to provide failure predictions, such as the state of health (SoH) and the state of function (SoF) of the battery 830. The BMS may communicate the information of the battery 830 to the application circuitry 805 or other components of the platform 800. The BMS may also include an analog-to-digital (ADC) convertor that allows the application circuitry 805 to directly monitor the voltage of the battery 830 or the current flow from the battery 830. The battery parameters may be used to determine actions that the platform 800 may perform, such as transmission frequency, network operation, sensing frequency, and the like.

A power block, or other power supply coupled to an electrical grid may be coupled with the BMS to charge the battery 830. In some examples, the power block XS30 may be replaced with a wireless power receiver to obtain the power wirelessly, for example, through a loop antenna in the computer platform 800. In these examples, a wireless battery charging circuit may be included in the BMS. The specific charging circuits chosen may depend on the size of the battery 830, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 850 includes various input/output (I/O) devices present within, or connected to, the platform 800, and includes one or more user interfaces designed to enable user interaction with the platform 800 and/or peripheral component interfaces designed to enable peripheral component interaction with the platform 800. The user interface circuitry 850 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 800. The output device circuitry may also include speakers or other audio emitting devices, printer(s), and/or the like. In some embodiments, the sensor circuitry 821 may be used as the input device circuitry (e.g., an image capture device, motion capture device, or the like) and one or more actuators 822 may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

The components shown by FIG. 8 communicate with one another using interface circuitry, which may include interconnect (IX) 806. The IX 806 may include any number of bus and/or IX technologies such as ISA, EISA, I²C, SPI, point-to-point interfaces, PMBus, PCI) PCIe, Intel® UPI, IAL, CAPI, Intel® QPI, UPI, Intel® OPA IX, RapidIO™ system IXs, CCIA, Gen-Z Consortium IXs, OpenCAPI IX, a HyperTransport interconnect, Time-Trigger Protocol (TTP) system, a FlexRay system, and/or any number of other IX technologies. The IX technology may be a proprietary bus, for example, used in an SoC based system.

Figure 9:
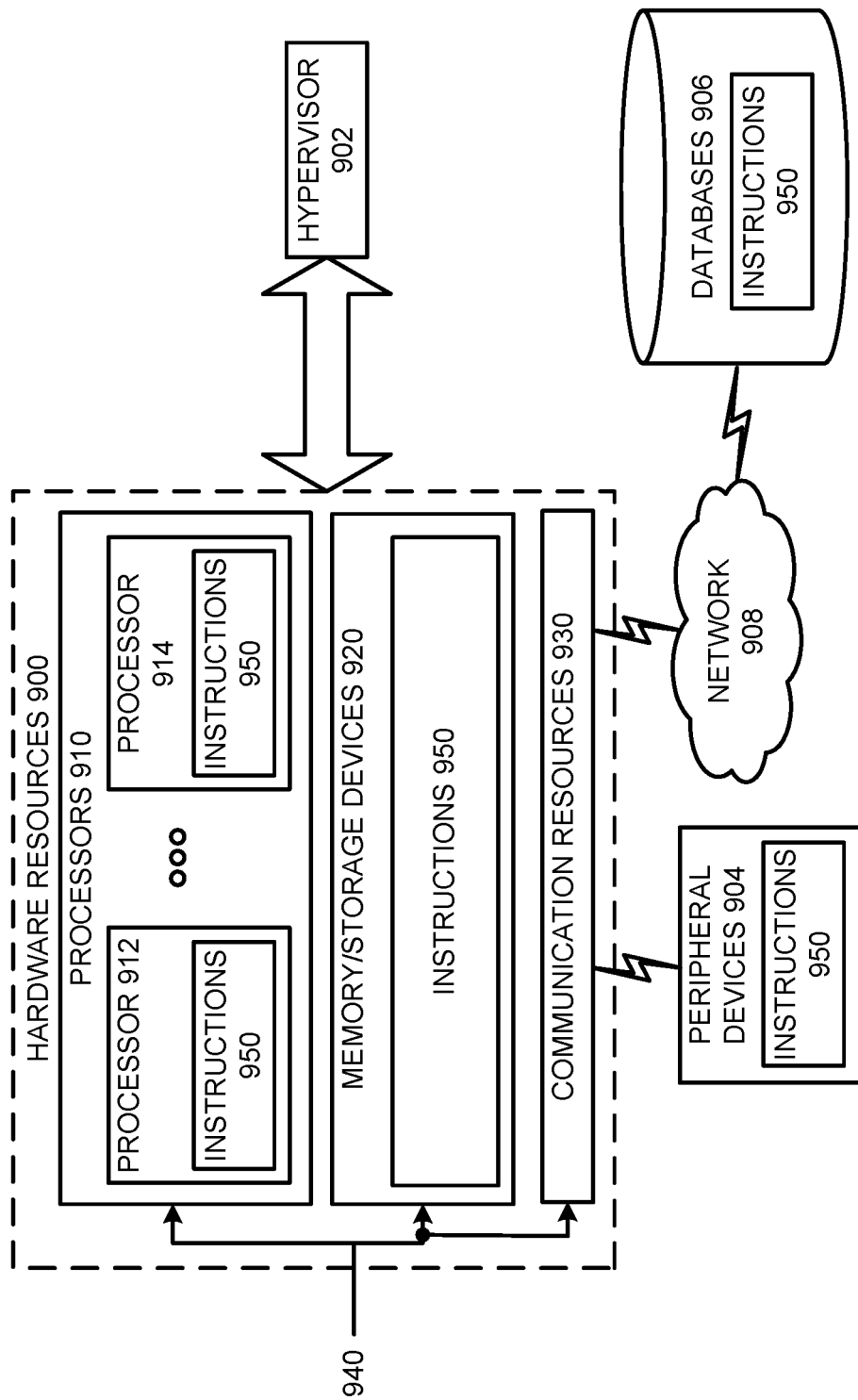
FIG. 9 depicts a block diagram illustrating components, according to some example embodiments, able to read instructions from a machine-readable or computer-readable medium (e.g., a non-transitory machine-readable storage medium) and perform any one or more of the methodologies discussed herein.

FIG. 9 illustrates components, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which may be communicatively coupled via a bus 940. For embodiments where node virtualization (e.g., NFV) is utilized, a hypervisor 902 may be executed to provide an execution environment for one or more network slices/sub-slices to utilize the hardware resources 900.

The processors 910 may include, for example, a processor 912 and a processor 914. The processor(s) 910 may be, for example, a CPU, a reduced instruction set computing (RISC) processor, a CISC processor, a GPU, a DSP such as a baseband processor, an ASIC, an FPGA, a RFIC, another processor (including those discussed herein), or any suitable combination thereof. The memory/storage devices 920 may include main memory, disk storage, or any suitable combination thereof. The memory/storage devices 920 may include, but are not limited to, any type of volatile or nonvolatile memory such as DRAM, SRAM, EPROM, EEPROM, Flash memory, solid-state storage, etc.

The communication resources 930 may include interconnection or network interface components or other suitable devices to communicate with one or more peripheral devices 904 or one or more databases 906 via a network 908. For example, the communication resources 930 may include wired communication components (e.g., for coupling via USB), cellular communication components, NFC components, Bluetooth® (or Bluetooth® Low Energy) components, Wi-Fi® components, and other communication components, such as those discussed herein.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

Figure 10:
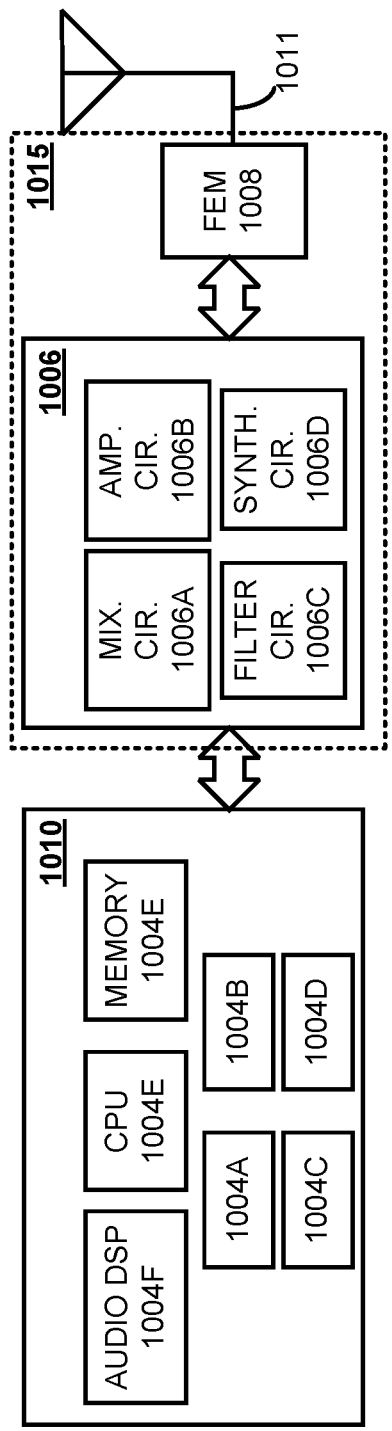
FIG. 10 depicts example components of baseband circuitry and radio frequency circuitry in accordance with various embodiments.

FIG. 10 illustrates example components of baseband circuitry 1010 and radio front end modules (RFEM) 1015 in accordance with various embodiments. The baseband circuitry 1010 corresponds to the baseband circuitry 710 and 810 of FIGS. 7 and 8, respectively. The RFEM 1015 corresponds to the RFEM 715 and 815 of FIGS. 7 and 8, respectively. As shown, the RFEMs 1015 may include Radio Frequency (RF) circuitry 1006, front-end module (FEM) circuitry 1008, antenna array 1011 coupled together at least as shown.

The baseband circuitry 1010 includes circuitry and/or control logic configured to carry out various radio/network protocol and radio control functions that enable communication with one or more radio networks via the RF circuitry 1006. The radio control functions may include, but are not limited to, signal modulation/demodulation, encoding/decoding, radio frequency shifting, etc. In some embodiments, modulation/demodulation circuitry of the baseband circuitry 1010 may include Fast-Fourier Transform (FFT), precoding, or constellation mapping/demapping functionality. In some embodiments, encoding/decoding circuitry of the baseband circuitry 1010 may include convolution, tail-biting convolution, turbo, Viterbi, LDPC, and/or polar code encoder/decoder functionality. Embodiments of modulation/demodulation and encoder/decoder functionality are not limited to these examples and may include other suitable functionality in other embodiments. The baseband circuitry 1010 is configured to process baseband signals received from a receive signal path of the RF circuitry 1006 and to generate baseband signals for a transmit signal path of the RF circuitry 1006. The baseband circuitry 1010 is configured to interface with application circuitry 705/805 (see FIGS. 7 and 8) for generation and processing of the baseband signals and for controlling operations of the RF circuitry 1006. The baseband circuitry 1010 may handle various radio control functions.

The aforementioned circuitry and/or control logic of the baseband circuitry 1010 may include one or more single or multi-core processors. For example, the one or more processors may include a 3G baseband processor 1004A, a 4G/LTE baseband processor 1004B, a 5G/NR baseband processor 1004C, or some other baseband processor(s) 1004D for other existing generations, generations in development or to be developed in the future (e.g., 6G, etc.). In other embodiments, some or all of the functionality of baseband processors 1004A-D may be included in modules stored in the memory 1004G and executed via a CPU 1004E. In other embodiments, some or all of the functionality of baseband processors 1004A-D may be provided as hardware accelerators (e.g., FPGAs, ASICs, etc.) loaded with the appropriate bit streams or logic blocks stored in respective memory cells. In various embodiments, the memory 1004G may store program code of a real-time OS (RTOS), which when executed by the CPU 1004E (or other baseband processor), is to cause the CPU 1004E (or other baseband processor) to manage resources of the baseband circuitry 1010, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 1010 includes one or more audio DSPs 1004F. The audio DSP(s) 1004F include elements for compression/decompression and echo cancellation and may include other suitable processing elements in other embodiments.

In some embodiments, each of the processors 1004A-1004E include respective memory interfaces to send/receive data to/from the memory 1004G. The baseband circuitry 1010 may further include one or more interfaces to communicatively couple to other circuitries/devices, such as an interface to send/receive data to/from memory external to the baseband circuitry 1010; an application circuitry interface to send/receive data to/from the application circuitry 705/805 of FIGS. 7 and 8); an RF circuitry interface to send/receive data to/from RF circuitry 1006 of FIG. 10; a wireless hardware connectivity interface to send/receive data to/from one or more wireless hardware elements (e.g., NFC components, Bluetooth®/Bluetooth® Low Energy components, Wi-Fi® components, and/or the like); and a power management interface to send/receive power or control signals to/from the PMIC 825.

In alternate embodiments (which may be combined with the above described embodiments), baseband circuitry 1010 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1010 may include protocol processing circuitry with one or more instances of control circuitry (not shown) to provide control functions for the digital baseband circuitry and/or radio frequency circuitry (e.g., the radio front end modules 1015).

Although not shown by FIG. 10, in some embodiments, the baseband circuitry 1010 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 1010 and/or RF circuitry 1006 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 1010 and/or RF circuitry 1006 are part of a Wi-Fi communication system. In the second example, the protocol processing circuitry would operate Wi-Fi MAC and logical link control (LLC) functions. The protocol processing circuitry may include one or more memory structures (e.g., 1004G) to store program code and data for operating the protocol functions, as well as one or more processing cores to execute the program code and perform various operations using the data. The baseband circuitry 1010 may also support radio communications for more than one wireless protocol.

The various hardware elements of the baseband circuitry 1010 discussed herein may be implemented, for example, as a solder-down substrate including one or more integrated circuits (ICs), a single packaged IC soldered to a main circuit board or a multi-chip module containing two or more ICs. In one example, the components of the baseband circuitry 1010 may be suitably combined in a single chip or chipset, or disposed on a same circuit board. In another example, some or all of the constituent components of the baseband circuitry 1010 and RF circuitry 1006 may be implemented together such as, for example, a system on a chip (SoC) or System-in-Package (SiP). In another example, some or all of the constituent components of the baseband circuitry 1010 may be implemented as a separate SoC that is communicatively coupled with and RF circuitry 1006 (or multiple instances of RF circuitry 1006). In yet another example, some or all of the constituent components of the baseband circuitry 1010 and the application circuitry 705/805 may be implemented together as individual SoCs mounted to a same circuit board (e.g., a "multi-chip package").

In some embodiments, the baseband circuitry 1010 may provide for communication compatible with one or more radio technologies. For example, in some embodiments, the baseband circuitry 1010 may support communication with an E-UTRAN or other WMAN, a WLAN, a WPAN. Embodiments in which the baseband circuitry 1010 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path, which may include circuitry to down-convert RF signals received from the FEM circuitry 1008 and provide baseband signals to the baseband circuitry 1010. RF circuitry 1006 may also include a transmit signal path, which may include circuitry to up-convert baseband signals provided by the baseband circuitry 1010 and provide RF output signals to the FEM circuitry 1008 for transmission.

In some embodiments, the receive signal path of the RF circuitry 1006 may include mixer circuitry 1006a, amplifier circuitry 1006b and filter circuitry 1006c. In some embodiments, the transmit signal path of the RF circuitry 1006 may include filter circuitry 1006c and mixer circuitry 1006a. RF circuitry 1006 may also include synthesizer circuitry 1006d for synthesizing a frequency for use by the mixer circuitry 1006a of the receive signal path and the transmit signal path. In some embodiments, the mixer circuitry 1006a of the receive signal path may be configured to down-convert RF signals received from the FEM circuitry 1008 based on the synthesized frequency provided by synthesizer circuitry 1006d. The amplifier circuitry 1006b may be configured to amplify the down-converted signals and the filter circuitry 1006c may be a low-pass filter (LPF) or band-pass filter (BPF) configured to remove unwanted signals from the down-converted signals to generate output baseband signals. Output baseband signals may be provided to the baseband circuitry 1010 for further processing. In some embodiments, the output baseband signals may be zero-frequency baseband signals, although this is not a requirement. In some embodiments, mixer circuitry 1006a of the receive signal path may comprise passive mixers, although the scope of the embodiments is not limited in this respect.

In some embodiments, the mixer circuitry 1006a of the transmit signal path may be configured to up-convert input baseband signals based on the synthesized frequency provided by the synthesizer circuitry 1006d to generate RF output signals for the FEM circuitry 1008. The baseband signals may be provided by the baseband circuitry 1010 and may be filtered by filter circuitry 1006c.

In some embodiments, the mixer circuitry 1006a of the receive signal path and the mixer circuitry 1006a of the transmit signal path may include two or more mixers and may be arranged for quadrature downconversion and upconversion, respectively. In some embodiments, the mixer circuitry 1006a of the receive signal path and the mixer circuitry 1006a of the transmit signal path may include two or more mixers and may be arranged for image rejection (e.g., Hartley image rejection). In some embodiments, the mixer circuitry 1006a of the receive signal path and the mixer circuitry 1006a of the transmit signal path may be arranged for direct downconversion and direct upconversion, respectively. In some embodiments, the mixer circuitry 1006a of the receive signal path and the mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1010 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006d may be a fractional-N synthesizer or a fractional N/N+1 synthesizer, although the scope of the embodiments is not limited in this respect as other types of frequency synthesizers may be suitable. For example, synthesizer circuitry 1006d may be a delta-sigma synthesizer, a frequency multiplier, or a synthesizer comprising a phase-locked loop with a frequency divider.

The synthesizer circuitry 1006d may be configured to synthesize an output frequency for use by the mixer circuitry 1006a of the RF circuitry 1006 based on a frequency input and a divider control input. In some embodiments, the synthesizer circuitry 1006d may be a fractional N/N+1 synthesizer.

In some embodiments, frequency input may be provided by a voltage controlled oscillator (VCO), although that is not a requirement. Divider control input may be provided by either the baseband circuitry 1010 or the application circuitry 705/805 depending on the desired output frequency. In some embodiments, a divider control input (e.g., N) may be determined from a look-up table based on a channel indicated by the application circuitry 705/805.

Synthesizer circuitry 1006d of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

FEM circuitry 1008 may include a receive signal path, which may include circuitry configured to operate on RF signals received from antenna array 1011, amplify the received signals and provide the amplified versions of the received signals to the RF circuitry 1006 for further processing. FEM circuitry 1008 may also include a transmit signal path, which may include circuitry configured to amplify signals for transmission provided by the RF circuitry 1006 for transmission by one or more of antenna elements of antenna array 1011. In various embodiments, the amplification through the transmit or receive signal paths may be done solely in the RF circuitry 1006, solely in the FEM circuitry 1008, or in both the RF circuitry 1006 and the FEM circuitry 1008.

In some embodiments, the FEM circuitry 1008 may include a TX/RX switch to switch between transmit mode and receive mode operation. The FEM circuitry 1008 may include a receive signal path and a transmit signal path. The receive signal path of the FEM circuitry 1008 may include an LNA to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission by one or more antenna elements of the antenna array 1011.

The antenna array 1011 comprises one or more antenna elements, each of which is configured convert electrical signals into radio waves to travel through the air and to convert received radio waves into electrical signals. For example, digital baseband signals provided by the baseband circuitry 1010 is converted into analog RF signals (e.g., modulated waveform) that will be amplified and transmitted via the antenna elements of the antenna array 1011 including one or more antenna elements (not shown). The antenna elements may be omnidirectional, direction, or a combination thereof. The antenna elements may be formed in a multitude of arranges as are known and/or discussed herein. The antenna array 1011 may comprise microstrip antennas or printed antennas that are fabricated on the surface of one or more printed circuit boards. The antenna array 1011 may be formed in as a patch of metal foil (e.g., a patch antenna) in a variety of shapes, and may be coupled with the RF circuitry 1006 and/or FEM circuitry 1008 using metal transmission lines or the like.

Processors of the application circuitry 705/805 and processors of the baseband circuitry 1010 may be used to execute elements of one or more instances of a protocol stack. For example, processors of the baseband circuitry 1010, alone or in combination, may be used execute Layer 3, Layer 2, or Layer 1 functionality, while processors of the application circuitry 705/805 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail infra.

Figure 11:
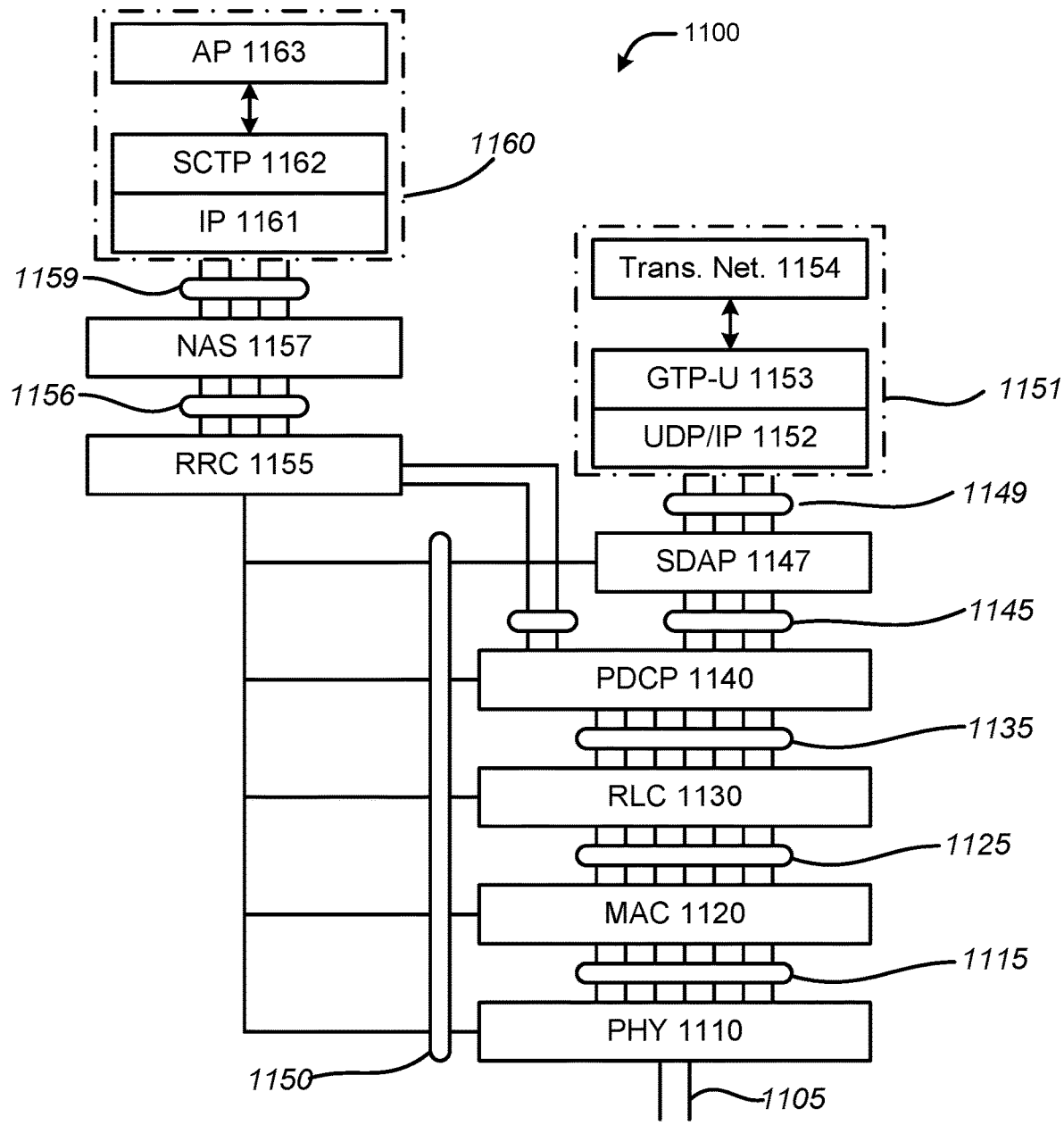
FIG. 11 is an illustration of various protocol functions that may be used for various protocol stacks in accordance with various embodiments.

FIG. 11 illustrates various protocol functions that may be implemented in a wireless communication device according to various embodiments. In particular, FIG. 11 includes an arrangement 1100 showing interconnections between various protocol layers/entities. The following description of FIG. 11 is provided for various protocol layers/entities that operate in conjunction with the 5G/NR system standards and LTE system standards, but some or all of the aspects of FIG. 11 may be applicable to other wireless communication network systems as well.

The protocol layers of arrangement 1100 may include one or more of PHY 1110, MAC 1120, RLC 1130, PDCP 1140, SDAP 1147, RRC 1155, and NAS layer 1157, in addition to other higher layer functions not illustrated. The protocol layers may include one or more service access points (e.g., items 1159, 1156, 1150, 1149, 1145, 1135, 1125, and 1115 in FIG. 11) that may provide communication between two or more protocol layers.

The PHY 1110 may transmit and receive physical layer signals 1105 that may be received from or transmitted to one or more other communication devices. The physical layer signals 1105 may comprise one or more physical channels, such as those discussed herein. The PHY 1110 may further perform link adaptation or adaptive modulation and coding (AMC), power control, cell search (e.g., for initial synchronization and handover purposes), and other measurements used by higher layers, such as the RRC 1155. The PHY 1110 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 1110 may process requests from and provide indications to an instance of MAC 1120 via one or more PHY-SAP 1115. According to some embodiments, requests and indications communicated via PHY-SAP 1115 may comprise one or more transport channels.

Instance(s) of MAC 1120 may process requests from, and provide indications to, an instance of RLC 1130 via one or more MAC-SAPs 1125. These requests and indications communicated via the MAC-SAP 1125 may comprise one or more logical channels. The MAC 1120 may perform mapping between the logical channels and transport channels, multiplexing of MAC SDUs from one or more logical channels onto TBs to be delivered to PHY 1110 via the transport channels, de-multiplexing MAC SDUs to one or more logical channels from TBs delivered from the PHY 1110 via transport channels, multiplexing MAC SDUs onto TBs, scheduling information reporting, error correction through HARQ, and logical channel prioritization.

Instance(s) of RLC 1130 may process requests from and provide indications to an instance of PDCP 1140 via one or more radio link control service access points (RLC-SAP) 1135. These requests and indications communicated via RLC-SAP 1135 may comprise one or more RLC channels. The RLC 1130 may operate in a plurality of modes of operation, including: Transparent Mode™, Unacknowledged Mode (UM), and Acknowledged Mode (AM). The RLC 1130 may execute transfer of upper layer protocol data units (PDUs), error correction through automatic repeat request (ARQ) for AM data transfers, and concatenation, segmentation and reassembly of RLC SDUs for UM and AM data transfers. The RLC 1130 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 1140 may process requests from and provide indications to instance(s) of RRC 1155 and/or instance(s) of SDAP 1147 via one or more packet data convergence protocol service access points (PDCP-SAP) 1145. These requests and indications communicated via PDCP-SAP 1145 may comprise one or more radio bearers. The PDCP 1140 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 1147 may process requests from and provide indications to one or more higher layer protocol entities via one or more SDAP-SAP 1149. These requests and indications communicated via SDAP-SAP 1149 may comprise one or more QoS flows. The SDAP 1147 may map QoS flows to DRBs, and vice versa, and may also mark QFIs in DL and UL packets. A single SDAP entity 1147 may be configured for an individual PDU session. In the UL direction, the NG-RAN 110 may control the mapping of QoS Flows to DRB(s) in two different ways, reflective mapping or explicit mapping. For reflective mapping, the SDAP 1147 of a UE 101 may monitor the QFIs of the DL packets for each DRB, and may apply the same mapping for packets flowing in the UL direction. For a DRB, the SDAP 1147 of the UE 101 may map the UL packets belonging to the QoS flows(s) corresponding to the QoS flow ID(s) and PDU session observed in the DL packets for that DRB. To enable reflective mapping, the NG-RAN 610 may mark DL packets over the Uu interface with a QoS flow ID. The explicit mapping may involve the RRC 1155 configuring the SDAP 1147 with an explicit QoS flow to DRB mapping rule, which may be stored and followed by the SDAP 1147. In embodiments, the SDAP 1147 may only be used in NR implementations and may not be used in LTE implementations.

The RRC 1155 may configure, via one or more management service access points (M-SAP), aspects of one or more protocol layers, which may include one or more instances of PHY 1110, MAC 1120, RLC 1130, PDCP 1140 and SDAP 1147. In embodiments, an instance of RRC 1155 may process requests from and provide indications to one or more NAS entities 1157 via one or more RRC-SAPs 1156. The main services and functions of the RRC 1155 may include broadcast of system information (e.g., included in MIBs or SIBs related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

According to various embodiments, RRC 1155 is used to configure the UE 101 with specific parameters, such as specific PUCCH parameters, CSI-RS parameters, SRS parameters, and/or other like parameters. For example, the RRC 1155 of a RAN node 111 may transmit a suitable RRC message (e.g., an RRC connection establishment message, RRC connection reconfiguration message, or the like) to the UE 101, where the RRC message includes one or more IEs, which is a structural element containing one or more fields where each field includes parameters, content, and/or data. The parameters, content, and/or data included in the one or more fields of the IEs are used to configure the UE 101 to operate in a particular manner. In some embodiments, one or more PUCCH configuration (PUCCH-Config) IEs are included in such an RRC message, which are used to configure UE specific PUCCH parameters applicable to a respective BWP. An example PUCCH-Config IE is shown by table 2 and table 3 shows field descriptions for the fields of the PUCCH-Config IE.

TABLE 2

PUCCH-Config information element

```
-- ASN1START
-- TAG-PUCCH-CONFIG-START
PUCCH-Config ::=                              SEQUENCE {
    resourceSetToAddModList                       SEQUENCE (SIZE (1..maxNrofPUCCH-
ResourceSets)) OF PUCCH-ResourceSet                   OPTIONAL, -- Need N
    resourceSetToReleaseList                      SEQUENCE (SIZE (1..maxNrofPUCCH-
ResourceSets)) OF PUCCH-ResourceSetId                 OPTIONAL, -- Need N
    resourceToAddModList                          SEQUENCE (SIZE (1..maxNrofPUCCH-
Resources)) OF PUCCH-Resource                         OPTIONAL, -- Need N
    resourceToReleaseList                         SEQUENCE (SIZE (1..maxNrofPUCCH-
Resources)) OF PUCCH-ResourceId                       OPTIONAL, -- Need N
    format1                                       SetupRelease { PUCCH-FormatConfig }
OPTIONAL, -- Need M
    format2                                       SetupRelease { PUCCH-FormatConfig }
OPTIONAL, -- Need M
    format3                                       SetupRelease { PUCCH-FormatConfig }
OPTIONAL, -- Need M
    format4                                       SetupRelease { PUCCH-FormatConfig }
OPTIONAL, -- Need M
    schedulingRequestResourceToAddModList         SEQUENCE (SIZE (1..maxNrofSR-Resources))
OF SchedulingRequestResourceConfig            OPTIONAL, -- Need N
    schedulingRequestResourceToReleaseList        SEQUENCE (SIZE (1..maxNrofSR-Resources))
OF SchedulingRequestResourceId                OPTIONAL, -- Need N
    multi-CSI-PUCCH-ResourceList                  SEQUENCE (SIZE (1..2)) OF PUCCH-
ResourceId                                        OPTIONAL, -- Need M
    dl-DataToUL-ACK                               SEQUENCE (SIZE (1..8)) OF INTEGER
(0..15)                                           OPTIONAL, -- Need M
```

TABLE 2-continued

| PUCCH-Config information element |  |
| --- | --- |
| spatialRelationInfoToAddModList | SEQUENCE (SIZE (1..maxNrofSpatialRelationInfos)) OF PUCCH-SpatialRelationInfo OPTIONAL, -- Need N |
| spatialRelationInfoToReleaseList | SEQUENCE (SIZE (1..maxNrofSpatialRelationInfos)) OF PUCCH-SpatialRelationInfoId OPTIONAL, -- Need N |
| pucch-PowerControl | PUCCH-PowerControl OPTIONAL, -- Need M |
| ... |  |
| }  |  |
| PUCCH-FormatConfig ::= | SEQUENCE { |
| interslotFrequencyHopping | ENUMERATED {enabled} OPTIONAL, -- Need R |
| additionalDMRS | ENUMERATED {true} OPTIONAL, -- Need R |
| maxCodeRate | PUCCH-MaxCodeRate OPTIONAL, -- Need R |
| nrofSlots | ENUMERATED {n2,n4,n8} OPTIONAL, -- Need S |
| pi2BPSK | ENUMERATED {enabled} OPTIONAL, -- Need R |
| simultaneousHARQ-ACK-CSI | ENUMERATED {true} OPTIONAL -- Need R |
| } |  |
| PUCCH-MaxCodeRate ::= | ENUMERATED {zeroDot08, zeroDot15, zeroDot25, zeroDot35, zeroDot45, zeroDot60, zeroDot80} |
| -- A set with one or more PUCCH resources |  |
| PUCCH-ResourceSet ::= | SEQUENCE { |
| pucch-ResourceSetId | PUCCH-ResourceSetId, |
| resourceList | SEQUENCE (SIZE (1..maxNrofPUCCH-ResourcesPerSet)) OF PUCCH-ResourceId, |
| maxPayloadMinus1 | INTEGER (4..256) OPTIONAL -- Need R |
| } |  |
| PUCCH-ResourceSetId ::= | INTEGER (0..maxNrofPUCCH-ResourceSets-1) |
| PUCCH-Resource ::= | SEQUENCE { |
| pucch-ResourceId | PUCCH-ResourceId, |
| startingPRB | PRB-Id, |
| intraSlotFrequencyHopping | ENUMERATED { enabled } OPTIONAL, -- Need R |
| secondHopPRB | PRB-Id OPTIONAL, -- Need R |
| format | CHOICE { |
| format0 | PUCCH-format0, |
| format1 | PUCCH-format1, |
| format2 | PUCCH-format2, |
| format3 | PUCCH-format3, |
| format4 | PUCCH-format4 |
| } |  |
| } |  |
| PUCCH-ResourceId ::= | INTEGER (0..maxNrofPUCCH-Resources-1) |
| PUCCH-format0 ::= | SEQUENCE { |
| initialCyclicShift | INTEGER(0..11), |
| nrofSymbols | INTEGER (1..2), |
| startingSymbolIndex | INTEGER(0..13) |
| } |  |
| PUCCH-format1 ::= | SEQUENCE { |
| initialCyclicShift | INTEGER(0..11), |
| nrofSymbols | INTEGER (4..14), |
| startingSymbolIndex | INTEGER(0..10), |
| timeDomainOCC | INTEGER(0..6) |
| } |  |
| PUCCH-format2 ::= | SEQUENCE { |
| nrofPRBs | INTEGER (1..16), |
| nrofSymbols | INTEGER (1..2), |
| startingSymbolIndex | INTEGER(0..13) |
| } |  |
| PUCCH-format3 ::= | SEQUENCE { |
| nrofPRBs | INTEGER (1..16), |
| nrofSymbols | INTEGER (4..14), |
| startingSymbolIndex | INTEGER(0..10) |
| } |  |
| PUCCH-format4 ::= | SEQUENCE { |
| nrofSymbols | INTEGER (4..14), |
| occ-Length | ENUMERATED {n2,n4}, |
| occ-Index | ENUMERATED {n0,n1,n2,n3}, |
| startingSymbolIndex | INTEGER(0..10) |
| } |  |

TABLE 2-continued

PUCCH-Config information element

-- TAG-PUCCH-CONFIG-STOP
-- ASN1STOP

TABLE 3

PUCCH-Config field descriptions dl-DataToUL-ACK
List of timing for given PDSCH to the DL ACK.
format1
Parameters that are common for all PUCCH resources of format 1.
format2
Parameters that are common for all PUCCH resources of format 2.
format3
Parameters that are common for all PUCCH resources of format 3.
format4.
Parameters that are common for all PUCCH resources of format 4
resourceSetToAddModList
Lists for adding and releasing PUCCH resource sets
resourceToAddModList, resourceToReleaseList
Lists for adding and releasing PUCCH resources applicable for the UL BWP and serving cell in which
the PUCCH-Config is defined. The resources defined herein are referred to from other parts of the
configuration to determine which resource the UE shall use for which report.
spatialRelationInfoToAddModList
Configuration of the spatial relation between a reference RS and PUCCH. Reference RS can be
SSB/CSI-RS/SRS. If the list has more than one element, MAC-CE selects a single element.
dl-DataToUL-ACK
List of timing for given PDSCH to the DL ACK
PUCCH-format3 field descriptions nrofPRBs
The supported values are 1, 2, 3, 4, 5, 6, 8, 9, 10, 12, 15 and 16.
PUCCH-FormatConfig field descriptions additionalDMRS
If the field is present, the UE enables 2 DMRS symbols per hop of a PUCCH Format 3 or 4 if both hops
are more than X symbols when FH is enabled (X = 4). And it enables 4 DMRS symbols for a PUCCH
Format 3 or 4 with more than 2X + 1 symbols when FH is disabled (X = 4). The field is not applicable for
format 1 and 2.
interslotFrequencyHopping
If the field is present, the UE enables inter-slot frequency hopping when PUCCH Format 1, 3 or 4 is
repeated over multiple slots. For long PUCCH over multiple slots, the intra and inter slot frequency
hopping cannot be enabled at the same time for a UE. The field is not applicable for format 2.
maxCodeRate
Max coding rate to determine how to feedback UCI on PUCCH for format 2, 3 or 4. The field is not
applicable for format 1.
nrofSlots
Number of slots with the same PUCCH F1, F3 or F4. When the field is absent the UE applies the value
n1. The field is not applicable for format 2.
pi2BPSK
If the field is present, the UE uses pi/2 BPSK for UCI symbols instead of QPSK for PUCCH. The field is
not applicable for format 1 and 2.
simultaneousHARQ-ACK-CSI
If the field is present, the UE uses simultaneous transmission of CSI and HARQ-ACK feedback with or
without SR with PUCCH Format 2, 3 or 4. When the field is absent the UE applies the value OFF The
field is not applicable for format 1.
PUCCH-Resource field descriptions format
Selection of the PUCCH format (format 0-4) and format-specific parameters. format0 and format1 are
only allowed for a resource in a first PUCCH resource set. format2, format3 and format4 are only
allowed for a resource in non-first PUCCH resource set.
intraSlotFrequencyHopping
Enabling intra-slot frequency hopping, applicable for all types of PUCCH formats. For long PUCCH
over multiple slots, the intra and inter slot frequency hopping cannot be enabled at the same time for a
UE.
pucch-ResourceId
Identifier of the PUCCH resource.
secondHopPRB
Index of first PRB after frequency hopping (for second hop) of PUCCH. This value is applicable for
intra-slot frequency hopping.

TABLE 3-continued

| PUCCH-Config field descriptions |
|---|
| PUCCH-ResourceSet field descriptions |
| maxPayloadMinus1<br>Maximum number of payload bits minus 1 that the UE may transmit using this PUCCH resource set. In a PUCCH occurrence, the UE chooses the first of its PUCCH-ResourceSet which supports the number of bits that the UE wants to transmit. The field is not present in the first set (Set0) since the maximum Size of Set0 is specified to be 3 bits. The field is not present in the last configured set since the UE derives its maximum payload size as specified in TS 38.213 [13]. This field can take integer values that are multiples of 4 (see TS 38.213 [13], clause 9.2).<br>resourceList<br>PUCCH resources of format0 and format1 are only allowed in the first PUCCH resource set, i.e., in a PUCCH-ResourceSet with pucch-ResourceSetId = 0. This set may contain between 1 and 32 resources. PUCCH resources of format2, format3 and format4 are only allowed in a PUCCH-ResourceSet with pucch-ResourceSetId > 0. If present, these sets contain between 1 and 8 resources each. The UE chooses a PUCCH-Resource from this list as specified in TS 38.213 [13], clause 9.2.3. Note that this list contains only a list of resource IDs. The actual resources are configured in PUCCH-Config. |

In the examples of tables 2-3, the PUCCH-Config IE includes a PUCCH-SpatialRelationInfo IE, which is used to configure the spatial setting for PUCCH transmission and the parameters for PUCCH power control. An example PUCCH-SpatialRelationInfo IE is shown by table 4, and PUCCH-SpatialRelationInfo field descriptions are shown by table 5.

TABLE 4

| PUCCH-SpatialRelationInfo information element |
|---|
| -- ASN1START<br>-- TAG-PUCCH-SPATIALRELATIONINFO-START<br>PUCCH-SpatialRelationInfo ::=         SEQUENCE {<br>    pucch-SpatialRelationInfoId         PUCCH-SpatialRelationInfoId,<br>    servingCellId                       ServCellIndex<br>OPTIONAL, -- Need S<br>    referenceSignal                     CHOICE {<br>        ssb-Index                           SSB-Index,<br>        csi-RS-Index                        NZP-CSI-RS-ResourceId,<br>        srs                                 SEQUENCE {<br>            resource              SRS-ResourceId,<br>            uplinkBWP           BWP-Id<br>        }<br>    },<br>    pucch-PathlossReferenceRS-Id        PUCCH-PathlossReferenceRS-Id,<br>    p0-PUCCH-Id                         P0-PUCCH-Id,<br>    closedLoopIndex                     ENUMERATED { i0, i1 }<br>}<br>PUCCH-SpatialRelationInfoId ::=         INTEGER (1..maxNrofSpatialRelationInfos)<br>-- TAG-PUCCH-SPATIALRELATIONINFO-STOP<br>-- ASN1STOP |

TABLE 5

| PUCCH-SpatialRelationInfo field descriptions |
|---|
| servingCellId<br>If the field is absent, the UE applies the ServCellId of the serving cell in which this PUCCH-SpatialRelationInfo is configured |

In some embodiments, a CSI measurement configuration (CSI-MeasConfig) IE is used to configure CSI-RS (reference signals) belonging to a serving cell in which CSI-MeasConfig is included, channel state information (CSI) reports to be transmitted on PUCCH on the serving cell in which CSI-MeasConfig is included, and/or CSI reports on PUSCH triggered by DCI received on the serving cell in which CSI-MeasConfig is included. An example CSI-MeasConfig IE is shown by table 6 and CSI-MeasConfig field descriptions are given by table 7.

TABLE 6

CSI-MeasConfig information element

```
-- ASN1START
-- TAG-CSI-MEAS-CONFIG-START
CSI-MeasConfig ::=                                  SEQUENCE {
    nzp-CSI-RS-ResourceToAddModList                     SEQUENCE (SIZE (1..maxNrofNZP-CSI-RS-
Resources)) OF NZP-CSI-RS-Resource                          OPTIONAL, -- Need N
    nzp-CSI-RS-ResourceToReleaseList                    SEQUENCE (SIZE (1..maxNrofNZP-CSI-RS-
Resources)) OF NZP-CSI-RS-ResourceId                        OPTIONAL, -- Need N
    nzp-CSI-RS-ResourceSetToAddModList                  SEQUENCE (SIZE (1..maxNrofNZP-CSI-RS-
ResourceSets)) OF NZP-CSI-RS-ResourceSet                    OPTIONAL, -- Need N
    nzp-CSI-RS-ResourceSetToReleaseList                 SEQUENCE (SIZE (1..maxNrofNZP-CSI-RS-
ResourceSets)) OF NZP-CSI-RS-ResourceSetId                  OPTIONAL, -- Need N
    csi-IM-ResourceToAddModList                         SEQUENCE (SIZE (1..maxNrofCSI-IM-Resources))
OF CSI-IM-Resource                                      OPTIONAL, -- Need N
    csi-IM-ResourceToReleaseList                        SEQUENCE (SIZE (1..maxNrofCSI-IM-Resources))
OF CSI-IM-ResourceId                                    OPTIONAL, -- Need N
    csi-IM-ResourceSetToAddModList                      SEQUENCE (SIZE (1..maxNrofCSI-IM-
ResourceSets)) OF CSI-IM-ResourceSet                            OPTIONAL, -- Need N
    csi-IM-ResourceSetToReleaseList                     SEQUENCE (SIZE (1..maxNrofCSI-IM-
ResourceSets)) OF CSI-IM-ResourceSetId                          OPTIONAL, -- Need N
    csi-SSB-ResourceSetToAddModList                     SEQUENCE (SIZE (1..maxNrofCSI-SSB-
ResourceSets)) OF CSI-SSB-ResourceSet                           OPTIONAL, -- Need N
    csi-SSB-ResourceSetToAddReleaseList                 SEQUENCE (SIZE (1..maxNrofCSI-SSB-
ResourceSets)) OF CSI-SSB-ResourceSetId                         OPTIONAL, -- Need N
    csi-ResourceConfigToAddModList                      SEQUENCE (SIZE (1..maxNrofCSI-
ResourceConfigurations)) OF CSI-ResourceConfig                  OPTIONAL, -- Need N
    csi-ResourceConfigToReleaseList                     SEQUENCE (SIZE (1..maxNrofCSI-
ResourceConfigurations)) OF CSI-ResourceConfigId                OPTIONAL, -- Need N
    csi-ReportConfigToAddModList                        SEQUENCE (SIZE (1..maxNrofCSI-
ReportConfigurations)) OF CSI-ReportConfig                      OPTIONAL, -- Need N
    csi-ReportConfigToReleaseList                       SEQUENCE (SIZE (1..maxNrofCSI-
ReportConfigurations)) OF CSI-ReportConfigId                    OPTIONAL, -- Need N
    reportTriggerSize                                   INTEGER (0..6)
OPTIONAL, -- Need M
    aperiodicTriggerStateList                           SetupRelease { CSI-AperiodicTriggerStateList
}                                                       OPTIONAL, -- Need M
    semiPersistentOnPUSCH-TriggerStateList                  SetupRelease { CSI-
SemiPersistentOnPUSCH-TriggerStateList }                        OPTIONAL, -- Need M
    ...
}
-- TAG-CSI-MEAS-CONFIG-STOP
-- ASN1STOP
```

TABLE 7

CSI-MeasConfig field descriptions aperiodicTriggerStateList
Contains trigger states for dynamically selecting one or more aperiodic and semi-persistent
reporting configurations and/or triggering one or more aperiodic CSI-RS resource sets for channel
and/or interference measurement. FFS: How to address the MAC-CE configuration.
csi-IM-ResourceSetToAddModList
Pool of CSI-IM-ResourceSet which can be referred to from CSI-ResourceConfig or from MAC CEs.
csi-IM-ResourceToAddModList
Pool of CSI-IM-Resource which can be referred to from CSI-IM-ResourceSet.
csi-ReportConfigToAddModList
Configured CSI report settings.
csi-ResourceConfigToAddModList
Configured CSI resource settings.
csi-SSB-ResourceSetToAddModList
Pool of CSI-SSB-ResourceSet which can be referred to from CSI-ResourceConfig.
nzp-CSI-RS-ResourceSetToAddModList
Pool of NZP-CSI-RS-ResourceSet which can be referred to from CSI-ResourceConfig or from
MAC CEs.
nzp-CSI-RS-ResourceToAddModList
Pool of NZP-CSI-RS-Resource which can be referred to from NZP-CSI-RS-ResourceSet.
reportTriggerSize
Size of CSI request field in DCI (bits).

As shown by tables 6 and 7, the CSI-MeasConfig IE may include one or more csi-ResourceConfigToAddModList IEs, which indicates configured CSI resource settings via one or more CSI-ResourceConfig IEs. The CSI-ResourceConfig IE defines a group of one or more NZP-CSI-PS-ResourceSet, CSI-IM-ResourceSet, and/or CSI-SSB-ResourceSet. An example C CSI-ResourceConfig IE is shown by table 8 and CSI-ResourceConfig field descriptions are given by table 9.

TABLE 8

CSI-ResourceConfig information element

```
-- ASN1START
-- TAG-CSI-RESOURCECONFIG-START
CSI-ResourceConfig ::=                      SEQUENCE {
    csi-ResourceConfigId                    CSI-ResourceConfigId,
    csi-RS-ResourceSetList                  CHOICE {
        nzp-CSI-RS-SSB                      SEQUENCE {
            nzp-CSI-RS-ResourceSetList      SEQUENCE (SIZE (1..maxNrofNZP-CSI-RS-
ResourceSetsPerConfig)) OF NZP-CSI-RS-ResourceSetId
OPTIONAL, -- Need R
            csi-SSB-ResourceSetList         SEQUENCE (SIZE (1..maxNrofCSI-SSB-
ResourceSetsPerConfig)) OF CSI-SSB-ResourceSetId
OPTIONAL -- Need R
        },
        csi-IM-ResourceSetList              SEQUENCE (SIZE (1..maxNrofCSI-IM-
ResourceSetsPerConfig)) OF CSI-IM-ResourceSet Id
    },
    bwp-Id                                  BWP-Id,
    resourceType                            ENUMERATED { aperiodic, semiPersistent, periodic },
    ...
}
-- TAG-CSI-RESOURCECONFIG-STOP
-- ASN1STOP
```

TABLE 9

CSI-ResourceConfig field descriptions bwp-Id
The DL BWP which the CSI-RS associated with this CSI-ResourceConfig are located in.
csi-ResourceConfigId
Used in CSI-ReportConfig to refer to an instance of CSI-ResourceConfig
csi-RS-ResourceSetList
Contains up to maxNrofNZP-CSI-RS-ResourceSetsPerConfig resource sets if ResourceConfigType
is 'aperiodic' and 1 otherwise.
csi-SSB-ResourceSetList
List of SSB resources used for beam measurement and reporting in a resource set.
resourceType
Time domain behavior of resource configuration. It does not apply to resources provided in the csi-
SSB-ResourceSetList.
bwp-Id
The DL BWP which the CSI-RS associated with this CSI-ResourceConfig are located in.
csi-ResourceConfigId
Used in CSI-ReportConfig to refer to an instance of CSI-ResourceConfig
csi-RS-ResourceSetList
Contains up to maxNrofNZP-CSI-RS-ResourceSetsPerConfig resource sets if ResourceConfigType
is 'aperiodic' and 1 otherwise.
csi-SSB-ResourceSetList
List of SSB resources used for beam measurement and reporting in a resource set.

As shown by tables 8 and 9, the CSI-MeasConfig IE may include one or more nzp-CSI-RS-ResourceSetToAddMod-List IEs, which indicate one or more NZP CSI-RSs resource sets indicated by respective NZP-CSI-RS-ResourceSet IEs. Each of the NZP-CSI-RS-ResourceSet IEs may indicate one or more NZP-CSI-RS-Resources. Each NZP-CSI-RS-ResourceSet IE is a set of NZP CSI-RS resources, which may be indicated by their IDs, and set-specific parameters. An example NZP-CSI-RS-ResourceSet IE is shown by table 10, and field descriptions for the NZP-CSI-RS-ResourceSet are shown by table 11.

TABLE 10

NZP-CSI-RS-ResourceSet information element

```
-- ASN1START
-- TAG-NZP-CSI-RS-RESOURCESET-START
NZP-CSI-RS-ResourceSet ::=      SEQUENCE {
    nzp-CSI-ResourceSetId       NZP-CSI-RS-ResourceSetId,
    nzp-CSI-RS-Resources        SEQUENCE (SIZE (1..maxNrofNZP-CSI-RS-
ResourcesPerSet)) OF NZP-CSI-RS-ResourceId,
    repetition                  ENUMERATED { on, off }
OPTIONAL, -- Need S
```

TABLE 10-continued

NZP-CSI-RS-ResourceSet information element

```
        aperiodicTriggeringOffset      INTEGER(0..6)
OPTIONAL, -- Need S
        trs-Info                       ENUMERATED {true}
OPTIONAL, -- Need R
        ...
}
-- TAG-NZP-CSI-RS-RESOURCESET-STOP
-- ASN1STOP
```

TABLE 11

NZP-CSI-RS-ResourceSet field descriptions aperiodicTriggeringOffset
Offset X between the slot containing the DCI that triggers a set of aperiodic NZP CSI-RS resources and the slot in which the CSI-RS resource set is transmitted. The value 0 corresponds to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. When the field is absent the UE applies the value 0.
nzp-CSI-RS-Resources
NZP-CSI-RS-Resources associated with this NZP-CSI-RS resource set. For CSI, there are at most 8 NZP CSI RS resources per resource set
repetition
Indicates whether repetition is on/off. If the field is set to 'OFF' or if the field is absent, the UE may not assume that the NZP-CSI-RS resources within the resource set are transmitted with the same downlink spatial domain transmission filter and with same NrofPorts in every symbol (see TS 38.214 [19], clauses 5.2.2.3.1 and 5.1.6.1.2). Can only be configured for CSI-RS resource sets which are associated with CSI-ReportConfig with report of L1 RSRP or "no report"
trs-Info
Indicates that the antenna port for all NZP-CSI-RS resources in the CSI-RS resource set is same. If the field is absent or released the UE applies the value "false"

The NZP-CSI-RS-Resource IE is used to configure Non-Zero-Power (NZP) CSI-RS transmitted in the cell where the IE is included, which the UE may be configured to measure on. An example NZP-CSI-RS-Resource IE is shown by table 12, and field descriptions for the NZP-CSI-RS-Resource are shown by table 13.

TABLE 12

NZP-CSI-RS-Resource information element

```
-- ASN1START
-- TAG-NZP-CSI-RS-RESOURCE-START
NZP-CSI-RS-Resource ::=       SEQUENCE {
    nzp-CSI-RS-ResourceId         NZP-CSI-RS-ResourceId,
    resourceMapping               CSI-RS-ResourceMapping,
    powerControlOffset            INTEGER (-8..15),
```

TABLE 12-continued

NZP-CSI-RS-Resource information element

```
    powerControlOffsetSS          ENUMERATED{db-3, db0, db3, db6}
OPTIONAL, -- Need R
    scramblingID                  ScramblingId,
    periodicityAndOffset          CSI-ResourcePeriodicityAndOffset
OPTIONAL, -- Cond PeriodicOrSemiPersistent
    qcl-InfoPeriodicCSI-RS        TCI-StateId
OPTIONAL, -- Cond Periodic
    ...
}
-- TAG-NZP-CSI-RS-RESOURCE-STOP
-- ASN1STOP
```

TABLE 13

NZP-CSI-RS-Resource field descriptions periodicityAndOffset
Periodicity and slot offset sl1 corresponds to a periodicity of 1 slot, sl2 to a periodicity of two slots, and so on. The corresponding offset is also given in number of slots.
powerControlOffset
Power offset of PDSCH RE to NZP CSI-RS RE. Value in dB.
powerControlOffsetSS
Power offset of NZP CSI-RS RE to SS RE. Value in dB.
qcl-InfoPeriodicCSI-RS
For a target periodic CSI-RS, contains a reference to one TCI-State in TCI-States for providing the QCL source and QCL type. For periodic CSI-RS, the source can be SSB or another periodic-CSI-RS. Refers to the TCI-State which has this value for tci-StateId and is defined in tci-StatesToAddModList in the PDSCH-Config included in the BWP-Downlink corresponding to the serving cell and to the DL BWP to which the resource belongs to.

TABLE 13-continued

NZP-CSI-RS-Resource field descriptions resourceMapping
OFDM symbol location(s) in a slot and subcarrier occupancy in a PRB of the CSI-RS resource
scramblingID
Scrambling ID In the example of table 13, the periodic field is optionally present, need M, for periodic NZP CSI-RS resources (as indicated in CSI-ResourceConfig); otherwise, the field is absent. In the example of table 13, the PeriodicOrSemiPersistent field is mandatory present, need M, for periodic and semi-persistent NZP CSI-RS resources (as indicated in CSI-ResourceConfig); otherwise, the field is absent. Additionally, example NZP-CSI-RS-ResourceId IE and NZP-CSI-RS-ResourceSetId IE are shown by tables 14 and 15, respectively.

TABLE 14

NZP-CSI-RS-ResourceId information element

```
-- ASN1START
-- TAG-NZP-CSI-RS-RESOURCEID-START
NZP-CSI-RS-ResourceId ::=    INTEGER
                             (0..maxNrofNZP-CSI-RS-Resources-1)
-- TAG-NZP-CSI-RS-RESOURCEID-STOP
-- ASN1STOP
```

TABLE 15

NZP-CSI-RS-ResourceSetId information element

```
-- ASN1START
-- TAG-NZP-CSI-RS-RESOURCESETID-START
NZP-CSI-RS-ResourceSetId ::=    INTEGER (0..maxNrofNZP-CSI-RS-ResourceSets-1)
-- TAG-NZP-CSI-RS-RESOURCESETID-STOP
-- ASN1STOP
```

If a UE is configured with a NZP-CSI-RS-ResourceSet configured with the higher layer parameter repetition set to 'on', the UE may assume that the CSI-RS resources within the NZP-CSI-RS-ResourceSet are transmitted with the same downlink spatial domain transmission filter, where the CSI-RS resources in the NZP-CSI-RS-ResourceSet are transmitted in different OFDM symbols. If repetition is set to 'off', the UE shall not assume that the CSI-RS resources within the NZP-CSI-RS-ResourceSet are transmitted with the same downlink spatial domain transmission filter.

Furthermore, the NZP-CSI-RS-Resource IE includes a qcl-InfoPeriodicCSI-RS field, which contains a reference to a TCI-State in a TCI-State IE for providing a QCL source and QCL type for a target periodic CSI-RS. The TCI-State IE associates one or two DL reference signals with a corresponding QCL type. The TCI-State IE includes a TCI-StateId, which is used to identify one TCI-State configuration. An example TCI-State IE is shown by table 16a, an example TCI-StateId IE is shown by table 16b, and field descriptions for the TCI-State IE are shown by table 17.

TABLE 16a

TCI-State information element

```
-- ASN1START
-- TAG-TCI-STATE-START
TCI-State ::=           SEQUENCE {
    tci-StateId             TCI-StateId,
    qcl-Type1               QCL-Info,
    qcl-Type2               QCL-Info
OPTIONAL, -- Need R
    ...
}
QCL-Info ::=            SEQUENCE {
    cell                    ServCellIndex
OPTIONAL, -- Need R
    bwp-Id                  BWP-Id
OPTIONAL, -- Cond CSI-RS-Indicated
    referenceSignal         CHOICE {
        csi-rs                  NZP-CSI-RS-ResourceId,
        ssb                     SSB-Index
    },
```

TABLE 16a-continued

TCI-State information element

```
    qcl-Type                ENUMERATED {typeA, typeB, typeC,
                                         typeD},
    ...
}
-- TAG-TCI-STATE-STOP
-- ASN1STOP
```

TABLE 16b

TCI-StateId information element

```
-- ASN1START
-- TAG-TCI-STATEID-START
TCI-StateId ::=         INTEGER (0..maxNrofTCI-States-1)
-- TAG-TCI-STATEID-STOP
-- ASN1STOP
```

TABLE 17

TCI-State field descriptions
QCL-Info field descriptions bwp-Id
The DL BWP which the RS is located in.
cell
The UE's serving cell in which the referenceSignal is configured. If the field is absent, it applies to
the serving cell in which the TCI-State is configured. The RS can be located on a serving cell other
than the serving cell in which the TCI-State is configured only if the qcl-Type is configured as
typeC or typeD.
referenceSignal
Reference signal with which quasi-collocation information is discussed elsewhere
qcl-Type
QCL type.

In embodiments, the TCI-State IE may be included in a tci-StatesPDCCH-ToAddList IE of a ControlResourceSet IE or a PDSCH-Config IE. In these embodiments, the tci-StatesPDCCH-ToAddList IE includes a list of Transmission Configuration Indicator (TCI) states indicating a transmission configuration which includes QCL-relationships between the DL RSs in one RS set and the PDSCH DMRS ports. The PDSCH-Config IE is used to configure the UE specific PDSCH parameters. The ControlResourceSet IE is used to configure a time/frequency control resource set (CORESET) in which to search for downlink control information.

In some embodiments, the TCI-State IE may be included in a qcl-info IE of a CSI-AperiodicTriggerStateList IE. The CSI-AperiodicTriggerStateList IE is used to configure the UE 101 with a list of aperiodic trigger states. Each codepoint of the DCI field "CSI request" is associated with one trigger state. Upon reception of the value associated with a trigger state, the UE will perform measurement of CSI-RS (reference signals) and aperiodic reporting on L1 according to all entries in the associatedReportConfigInfoList for that trigger state. The qcl-info IE in the CSI-AperiodicTriggerStateList IE includes a list of references to TCI-States for providing the QCL source and QCL type for each NZP-CSI-RS-Resource listed in nzp-CSI-RS-Resources of the NZP-CSI-RS-ResourceSet indicated by nzp-CSI-RS-ResourcesforChannel. Each TCI-StateId refers to the TCI-State which has this value for tci-StateId and is defined in tci-StatesToAddModList in the PDSCH-Config included in the BWP Downlink corresponding to the serving cell and to the DL BWP to which the resourcesForChannelMeasurement (in the CSI-ReportConfig indicated by reportConfigId) belong. A first entry in qcl-info-forChannel corresponds to a first entry in nzp-CSI-RS-Resources of that NZP-CSI-RS-ResourceSet IE, a second entry in qcl-info-forChannel corresponds to a second entry in the nzp-CSI-RS-Resources, and so forth.

In addition to the aforementioned examples, the RRC message may also include an SRS configuration (SRS-Config) IE, which is used to configure sounding reference signal transmissions. The SRS-Config defines a list of SRS resources (SRS-Resources) and a list of SRS resource sets (SRS-ResourceSets). Each resource set defines a set of SRS-Resources. In embodiments, the network (e.g., a RAN node 111) triggers the transmission of the set of SRS-Resources using a configured aperiodicSRS-ResourceTrigger (L1 DCI). An example SRS-Config IE is shown by table 18, and field descriptions for the SRS-Config are shown by table 19.

TABLE 18

SRS-Config information element

```
-- ASN1START
-- TAG-SRS-CONFIG-START
SRS-Config ::=                                      SEQUENCE {
    srs-ResourceSetToReleaseList                        SEQUENCE (SIZE(1..maxNrofSRS-
ResourceSets)) OF SRS-ResourceSetId                 OPTIONAL, -- Need N
    srs-ResourceSetToAddModList                         SEQUENCE (SIZE(1..maxNrofSRS-
ResourceSets)) OF SRS-ResourceSet                   OPTIONAL, -- Need N
    srs-ResourceToReleaseList                           SEQUENCE (SIZE(1..maxNrofSRS-Resources))
OF SRS-ResourceId            OPTIONAL,              -- Need N
    srs-ResourceToAddModList                            SEQUENCE (SIZE(1. .maxNrofSRS-Resources))
OF SRS-Resource              OPTIONAL,              -- Need N
    tpc-Accumulation                                    ENUMERATED (disabled)
OPTIONAL,                    -- Need S
    ...
}
SRS-ResourceSet ::=                                 SEQUENCE {
    srs-ResourceSetId                                   SRS-ResourceSetId,
    srs-ResourceIdList                                  SEQUENCE (SIZE(1..maxNrofSRS-
ResourcesPerSet)) OF SRS-ResourceId                 OPTIONAL, -- Cond Setup
    resourceType                                        CHOICE {
        aperiodic                                           SEQUENCE {
            aperiodicSRS-ResourceTrigger                        INTEGER (1..maxNrofSRS-
TriggerStates-1),
            csi-RS                                              NZP-CSI-RS-ResourceId
OPTIONAL, -- Cond NonCodebook
```

TABLE 18-continued

| SRS-Config information element |
|---|

```
            slotOffset                              INTEGER (1..32)
OPTIONAL, -- Need S
                ...,
                [[
            aperiodicSRS-ResourceTriggerList-v1530      SEQUENCE
(SIZE(1..maxNrofSRS-TriggerStates-2))
                                                        OF INTEGER
(1..maxNrofSRS-TriggerStates-1)                 OPTIONAL -- Need M
                ]]
        },
        semi-persistent                             SEQUENCE {
            associatedCSI-RS                            NZP-CSI-RS-ResourceId
OPTIONAL, -- Cond NonCodebook
                ...
        },
        periodic                                    SEQUENCE {
            associatedCSI-RS                            NZP-CSI-RS-ResourceId
OPTIONAL, -- Cond NonCodebook
                ...
        }
    },
    usage                                       ENUMERATED (beamManagement, codebook,
nonCodebook, antennaSwitching),
    alpha                                       Alpha
OPTIONAL, -- Need S
    p0                                          INTEGER (-202..24)
OPTIONAL, -- Cond Setup
    pathlossReferenceRS                         CHOICE {
        ssb-Index                                   SSB-Index,
        csi-RS-Index                                NZP-CSI-RS-ResourceId
    }
OPTIONAL, -- Need M
    srs-PowerControlAdjustmentStates            ENUMERATED { sameAsFci2,
separateClosedLoop}                                 OPTIONAL, -- Need S
    ...
}
SRS-ResourceSetId ::=                           INTEGER (0..maxNrofSRS-ResourceSets-1)
SRS-Resource ::=                                SEQUENCE {
    srs-ResourceId                                  SRS-ResourceId,
    nrofSRS-Ports                                   ENUMERATED {port1, ports2, ports4},
    ptrs-PortIndex                                  ENUMERATED {n0, n1 }
OPTIONAL,              -- Need R
    transmissionComb                                CHOICE {
        n2                                              SEQUENCE {
            combOffset-n2                                   INTEGER (0..1),
            cyclicShift-n2                                  INTEGER (0..7)
        },
        n4                                              SEQUENCE {
            combOffset-n4                                   INTEGER (0..3),
            cyclicShift-n4                                  INTEGER (0..11)
        }
    },
    resourceMapping                                 SEQUENCE {
        startPosition                                   INTEGER (0..5),
        nrofSymbols                                     ENUMERATED {n1, n2, n4},
        repetitionFactor                                ENUMERATED {n1, n2, n4}
    },
    freqDomainPosition                              INTEGER (0..67),
    freqDomainShift                                 INTEGER (0..268),
    freqHopping                                     SEQUENCE {
        c-SRS                                           INTEGER (0..63),
        b-SRS                                           INTEGER (0..3),
        b-hop                                           INTEGER (0..3)
    },
    groupOrSequenceHopping                          ENUMERATED { neither, groupHopping,
sequenceHopping },
    resourceType                                    CHOICE {
        aperiodic                                       SEQUENCE {
            ...
        },
        semi-persistent                                 SEQUENCE {
            periodicityAndOffset-sp                         SRS-PeriodicityAndOffset,
            ...
        },
```

TABLE 18-continued

| SRS-Config information element | | |
|---|---|---|
| periodic | | SEQUENCE { |
| | periodicityAndOffset-p | SRS-PeriodicityAndOffset, |
| | ... | |
| } | | |
| }, | | |
| sequenceId | | INTEGER (0..1023), |
| spatialRelationInfo | | SRS-SpatialRelationInfo |
| OPTIONAL, | -- Need R | |
| ... | | |
| } | | |
| SRS-SpatialRelationInfo ::= | SEQUENCE { | |
| servingCellId | | ServCellIndex |
| OPTIONAL, | -- Need S | |
| referenceSignal | | CHOICE { |
| ssb-Index | | SSB-Index, |
| csi-RS-Index | | NZP-CSI-RS-ResourceId, |
| srs | | SEQUENCE { |
| | resourceId | SRS-ResourceId, |
| | uplinkBWP | BWP-Id |
| } | | |
| } | | |
| } | | |
| SRS-ResourceId ::= | | INTEGER (0..maxNrofSRS-Resources−1) |
| SRS-PeriodicityAndOffset ::= | | CHOICE { |
| sl1 | | NULL, |
| sl2 | | INTEGER(0..1), |
| sl4 | | INTEGER(0..3), |
| sl5 | | INTEGER(0..4), |
| sl8 | | INTEGER(0..7), |
| sl10 | | INTEGER(0..9), |
| sl16 | | INTEGER(0..15), |
| sl20 | | INTEGER(0..19), |
| sl32 | | INTEGER(0..31), |
| sl40 | | INTEGER(0..39), |
| sl64 | | INTEGER(0..63), |
| sl80 | | INTEGER(0..79), |
| sl160 | | INTEGER(0..159), |
| sl320 | | INTEGER(0..319), |
| sl640 | | INTEGER(0..639), |
| sl1280 | | INTEGER(0..1279), |
| sl2560 | | INTEGER(0..2559) |
| } | | |
| -- TAG-SRS-CONFIG-STOP | | |
| -- ASN1STOP | | |

TABLE 19

SRS-Config field descriptions

SRS-Resource field descriptions tpc-Accumulation
If the field is absent, UE applies TPC commands via accumulation. If disabled, UE applies the TPC command without accumulation (this applies to SRS when a separate closed loop is configured for SRS).
SRS-Resource field descriptions cyclicShift-n2
Cyclic shift configuration
cyclicShift-n4
Cyclic shift configuration
freqHopping
Includes parameters capturing SRS frequency hopping
groupOrSequenceHopping
Parameter(s) for configuring group or sequence hopping
periodicityAndOffset-p
Periodicity and slot offset for this SRS resource. All values in "number of slots" sl1 corresponds to a periodicity of 1 slot, value sl2 corresponds to a periodicity of 2 slots, and so on. For each periodicity the corresponding offset is given in number of slots. For periodicity sl1 the offset is 0 slots
periodicityAndOffset-sp
Periodicity and slot offset for this SRS resource. All values in "number of slots". sl1 corresponds to a periodicity of 1 slot, value sl2 corresponds to a periodicity of 2 slots, and so on. For each periodicity the corresponding offset is given in number of slots. For periodicity sl1 the offset is 0 slots
ptrs-PortIndex TABLE 19-continued SRS-Config field descriptions The PTRS port index for this SRS resource for non-codebook based UL MIMO. This is only applicable
when the corresponding PTRS-UplinkConfig is set to CP-OFDM. The ptrs-PortIndex configured here
must be smaller than or equal to the maxNnrofPorts configured in the PTRS-UplinkConfig
resourceMapping
OFDM symbol location of the SRS resource within a slot including number of OFDM symbols (N = 1,
2 or 4 per SRS resource), startPosition (SRSSymbolStartPosition = 0 . . . 5; "0" refers to the last symbol,
"1" refers to the second last symbol) and RepetitionFactor (r = 1, 2 or 4). The configured SRS
resource does not exceed the slot boundary.
resource Type
Periodicity and offset for semi-persistent and periodic SRS resource
sequenceId
Sequence ID used to initialize pseudo random group and sequence hopping
spatialRelationInfo
Configuration of the spatial relation between a reference RS and the target SRS. Reference RS can
be SSB/CSI-RS/SRS
transmissionComb
Comb value (2 or 4) and comb offset (0 . . . combValue − 1)
SRS-ResourceSet field descriptions alpha
alpha value for SRS power control. When the field is absent the UE applies the value 1.
aperiodicSRS-ResourceTriggerList
An additional list of DCI "code points" upon which the UE shall transmit SRS according to this SRS
resource set configuration.
aperiodicSRS-ResourceTrigger
The DCI "code point" upon which the UE shall transmit SRS according to this SRS resource set
configuration.
associatedCSI-RS
ID of CSI-RS resource associated with this SRS resource set in non-codebook based operation.
csi-RS
ID of CSI-RS resource associated with this SRS resource set.
p0
P0 value for SRS power control. The value is in dBm. Only even values (step size 2) are allowed.
pathlossReferenceRS
A reference signal (e.g. a CSI-RS config or a SS block) to be used for SRS path loss estimation.
resourceType
Time domain behavior of SRS resource configuration. Corresponds to L1 parameter 'SRS-
ResourceConfigType'. The network configures SRS resources in the same resource set with the same
time domain behavior on periodic, aperiodic and semi-persistent SRS.
slotOffset
An offset in number of slots between the triggering DCI and the actual transmission of this SRS-
ResourceSet. If the field is absent the UE applies no offset (value 0).
srs-PowerControlAdjustmentStates
Indicates whether hsrs, c(i) = fc(i, 1) or hsrs, c(i) = fc(i, 2) (if twoPUSCH-PC-AdjustmentStates are
configured) or serarate close loop is configured for SRS. This parameter is applicable only for UIs on
which UE also transmits PUSCH. If absent or release, the UE applies the value sameAs-Fci1.
srs-ResourceIdList
The IDs of the SRS-Resources used in this SRS-ResourceSet. If this SRS-ResourceSet is configured
with usage set to codebook, the srs-ResourceIdList contains at most 2 entries. If this SRS-
ResourceSet is configured with usage set to nonCodebook, the srs-ResourceIdList contains at most 4
entries.
srs-ResourceSetId
The ID of this resource set. It is unique in the context of the BWP in which the parent SRS-Config is
defined.
usage
Indicates if the SRS resource set is used for beam management, codebook based or non-codebook
based transmission or antenna switching.

As shown by the examples of tables 18 and 19, the SRS-Config IE includes one or more SRS-ResourceSet IE, which may include one or more SRS-Resource IEs. Each SRS-Resource IE may include a resource Type parameter and a spatialRelationInfo parameter with an SRS-Spatial-RelationInfo value, which indicates or is a configuration of the spatial relation between a reference RS and a target SRS. The UE 101 can be configured with one or more SRS resource sets via the SRS-ResourceSet IE. For codebook based transmission, the UE 101 may be configured with a single SRS-ResourceSet set to 'codebook' and only one SRS resource can be indicated based on the SRI from within the SRS resource set. The SRS-ResourceSet IE is also used to configure AperiodicSRS-ResourceTrigger (indicating the association between aperiodic SRS triggering state and SRS resource sets), triggered SRS resource(s) srs-ResourceSetId, csi-RS (indicating the associated NZP-CSI-RS-ResourceId) for an SRS-Resource IE with a resourceType parameter configured with a value of "aperiodic." The UE 101 receives a configuration of SRS resource sets when the UE 101 is configured with one or more SRS resource configuration(s), and when the higher layer parameter resourceType in the SRS-Resource IE is set to 'aperiodic'.

In various embodiments, for uplink codebook based transmissions, if the SRS-Resource IE has a resourceType parameter configured with a value "semi-persistent," the UE 101 expects the SRS resource(s) indicated by the SRS-Resource IE to be activated (e.g., by a suitable DCI) and uses a same spatial domain filter to transmit a PUSCH as an activated SRS resource for codebook based transmission. If such SRS resource(s) are not activated (e.g., by a suitable DCI), the UE 101 applies the same spatial domain filter to transmit the PUSCH as the parameter SRS-SpatialRelationInfo configured for the indicated SRS. Additionally or alternatively, the PUSCH beam may be the same as the beam used for a particular PUCCH resource or a particular SRS resource for beam management.

The NAS 1157 may form the highest stratum of the control plane between the UE 101 and the AMF 621. The NAS 1157 may support the mobility of the UEs 101 and the session management procedures to establish and maintain IP connectivity between the UE 101 and a P-GW in LTE systems.

According to various embodiments, one or more protocol entities of arrangement 1100 may be implemented in UEs 101, RAN nodes 111, AMF 621 in NR implementations or 1\.1 MME 521 in LTE implementations, UPF 602 in NR implementations or S-GW 522 and P-GW 523 in LTE implementations, or the like to be used for control plane or user plane communications protocol stack between the aforementioned devices. In such embodiments, one or more protocol entities that may be implemented in one or more of UE 101, gNB 111, A1\.1F 621, etc. may communicate with a respective peer protocol entity that may be implemented in or on another device using the services of respective lower layer protocol entities to perform such communication. In some embodiments, a gNB-CU of the gNB 111 may host the RRC 1155, SDAP 1147, and PDCP 1140 of the gNB that controls the operation of one or more gNB-DUs, and the gNB-DUs of the gNB 111 may each host the RLC 1130, MAC 1120, and PHY 1110 of the gNB 111.

In a first example, a control plane protocol stack may comprise, in order from highest layer to lowest layer, NAS 1157, RRC 1155, PDCP 1140, RLC 1130, MAC 1120, and PHY 1110. In this example, upper layers 1160 may be built on top of the NAS 857, which includes an IP layer 1161, an SCTP 1162, and an application layer signaling protocol (AP) 1163.

In NR implementations, the AP 1163 may be an NG application protocol layer (NGAP or NG-AP) 1163 for the NG interface 113 defined between the NG-RAN node 111 and the AMF 621, or the AP 1163 may be an Xn application protocol layer (XnAP or Xn-AP) 1163 for the Xn interface 112 that is defined between two or more RAN nodes 111.

The NG-AP 1163 may support the functions of the NG interface 113 and may comprise Elementary Procedures (EPs). An NG-AP EP may be a unit of interaction between the NG-RAN node 111 and the AMF 621. The NG-AP 1163 services may comprise two groups: UE-associated services (e.g., services related to a UE 101) and non-UE-associated services (e.g., services related to the whole NG interface instance between the NG-RAN node 111 and AMF 621). These services may include functions including, but not limited to: a paging function for the sending of paging requests to NG-RAN nodes 111 involved in a particular paging area; a UE context management function for allowing the AMF 621 to establish, modify, and/or release a UE context in the AMF 621 and the NG-RAN node 111; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF 621; a NAS node selection function for determining an association between the AMF 621 and the UE 101; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 111 via CN 120; and/or other like functions.

The XnAP 1163 may support the functions of the Xn interface 112 and may comprise XnAP basic mobility procedures and XnAP global procedures. The XnAP basic mobility procedures may comprise procedures used to handle UE mobility within the NG RAN 111 (or E-UTRAN 510), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 101, such as Xn interface setup and reset procedures, NG-RAN update procedures, cell activation procedures, and the like.

In LTE implementations, the AP 1163 may be an S1 Application Protocol layer (S1-AP) 1163 for the S1 interface 113 defined between an E-UTRAN node 111 and an MME, or the AP 1163 may be an X2 application protocol layer (X2AP or X2-AP) 1163 for the X2 interface 112 that is defined between two or more E-UTRAN nodes 111.

The S1 Application Protocol layer (S1-AP) 1163 may support the functions of the S1 interface, and similar to the NG-AP discussed previously, the S1-AP may comprise S1-AP EPs. An S1-AP EP may be a unit of interaction between the E-UTRAN node 111 and an MME 521 within an LTE CN 120. The S1-AP 1163 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 1163 may support the functions of the X2 interface 112 and may comprise X2AP basic mobility procedures and X2AP global procedures. The X2AP basic mobility procedures may comprise procedures used to handle UE mobility within the E-UTRAN 120, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 101, such as X2 interface setup and reset procedures, load indication procedures, error indication procedures, cell activation procedures, and the like.

The SCTP layer (alternatively referred to as the SCTP/IP layer) 1162 may provide guaranteed delivery of application layer messages (e.g., NGAP or XnAP messages in NR implementations, or S1-AP or X2AP messages in LTE implementations). The SCTP 1162 may ensure reliable delivery of signaling messages between the RAN node 111 and the AMF 621/MME 521 based, in part, on the IP protocol, supported by the IP 1161. The Internet Protocol layer (IP) 1161 may be used to perform packet addressing and routing functionality. In some implementations the IP layer 1161 may use point-to-point transmission to deliver and convey PDUs. In this regard, the RAN node 111 may comprise L2 and L1 layer communication links (e.g., wired or wireless) with the MME/AMF to exchange information.

In a second example, a user plane protocol stack may comprise, in order from highest layer to lowest layer, SDAP 1147, PDCP 1140, RLC 1130, MAC 820, and PHY 810. The user plane protocol stack may be used for communication between the UE 101, the RAN node 111, and UPF 602 in NR implementations or an S-GW 522 and P-GW 523 in LTE implementations. In this example, upper layers 1151 may be built on top of the SDAP 1147, and may include a user datagram protocol (UDP) and IP security layer (UDP/IP) 1152, a General Packet Radio Service (GPRS) Tunneling Protocol for the user plane layer (GTP-U) 1153, and a User Plane PDU layer (UP PDU) 1163.

The transport network layer 1154 (also referred to as a "transport layer") may be built on IP transport, and the GTP-U 1153 may be used on top of the UDP/IP layer 1152 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 1153 may be used for carrying user data within the GPRS core network and between the radio access network and the core network. The user data transported can be packets in any of IPv4, IPv6, or PPP formats, for example. The UDP/IP 1152 may provide checksums for data integrity, port numbers for addressing different functions at the source and destination, and encryption and authentication on the selected data flows. The RAN node 111 and the S-GW 522 may utilize an S1-U interface to exchange user plane data via a protocol stack comprising an L1 layer (e.g., PHY 1110), an L2 layer (e.g., MAC 1120, RLC 1130, PDCP 1140, and/or SDAP 1147), the UDP/IP layer 1152, and the GTP-U 1153. The S-GW 522 and the P-GW 523 may utilize an S5/S8a interface to exchange user plane data via a protocol stack comprising an L1 layer, an L2 layer, the UDP/IP layer 1152, and the GTP-U 1153. As discussed previously, NAS protocols may support the mobility of the UE 101 and the session management procedures to establish and maintain IP connectivity between the UE 101 and the P-GW 523.

Moreover, although not shown by FIG. 11, an application layer may be present above the AP 1163 and/or the transport network layer 1154. The application layer may be a layer in which a user of the UE 101, RAN node 111, or other network element interacts with software applications being executed, for example, by application circuitry 705 or application circuitry 805, respectively. The application layer may also provide one or more interfaces for software applications to interact with communications systems of the UE 101 or RAN node 111, such as the baseband circuitry 1010. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

FIGS. 12-14 show example procedures 1200-1400, respectively, in accordance with various embodiments. For illustrative purposes, the various operations of processes 900-1100 is described as being performed by UEs 101 of FIG. 1 or elements thereof (e.g., components discussed with regard to platform 800 of FIG. 8), or a RAN node 111 of FIG. 1 or elements thereof (e.g., components discussed with regard to infrastructure equipment 700 of FIG. 7). Additionally, the various messages/signaling communicated between the UE 101 and RAN node 111 may be sent/received over the various interfaces discussed herein with respect to FIGS. 1-11, and using the various mechanisms discussed herein including those discussed herein with respect to FIGS. 1-11. While particular examples and orders of operations are illustrated FIGS. 12-14, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

FIG. 12 depicts an example UL MIMO procedure 1200 according to various embodiments. Process 1200 may be performed by the UE 101. Process 1200 begins at operation 1205 where the UE 101 determines whether an SRS (or SRS resource) is configured for a current transmission scheme. The transmission scheme may be a codebook based transmission scheme or a non-codebook based transmission scheme. The UE 101 may determine whether an SRS (or SRS resource) is configured by searching for or otherwise identifying an SRS-Resource IE in an SRS-ResourceSet IE of an SRS configuration (SRS-Config) in an RRC message, such as those discussed previously.

If at operation 1205 the UE 101 determines that the configuration does include a configured SRS, then the UE 101 proceeds to operation 1210 to follow the transmission scheme and indicated SRI for a PUSCH transmission. In an example for uplink codebook based transmissions, if the SRS-Resource IE has a resource Type parameter configured with a value "semi-persistent," the UE 101 expects the SRS resource(s) indicated by the SRS-Resource IE to be activated (e.g., by a suitable DCI) and uses a same spatial domain filter to transmit a PUSCH as an activated SRS resource for codebook based transmission. The process 1200 ends after performance of operation 1210.

If at operation 1205 the UE 101 determines that the configuration does not include a configured SRS, then the UE 101 proceeds to operation 1215 to perform the a fallback procedure, which is triggered by a fallback DCI such as a DCI format 0_0. The UE 101 then proceeds to operation 1225 transmit the PUSCH. In an example for uplink codebook based transmissions, if the SRS-Resource IE has a resource Type parameter configured with a value "semi-persistent," and the SRS resource(s) indicated by the SRS-Resource IE are not activated (e.g., by a suitable DCI), then the UE 101 at operation 1225 applies the same spatial domain filter to transmit the PUSCH as the parameter SRS-SpatialRelationInfo configured for the indicated SRS. Additionally or alternatively, the PUSCH beam may be the same as the beam used for a particular PUCCH resource or a particular SRS resource for beam management. The process 1200 ends after performance of operation 1225.

FIG. 13 shows an example configuration process 1300 according to various embodiments. Process 1300 begins at operation 1305 where the UE 101 determines an SRS and/or CSI-RS configurations, such as by searching or otherwise identifying an SRS-Config and/or an NZP-CSI-RS-ResourceSet IEs as discussed previously. At operation 1310 to identify one of a trs-Info parameter or a Repetition parameter set to "ON." In embodiments, only one of the trs-Info or the repetition parameter can be set to 'ON' in the NZP-CSI-RS-ResourceSet, or only one of the trs-Info parameter or the repetition parameter can be configured in the NZP-CSI-RS-ResourceSet. After operation 1310, process 1300 ends or repeats as necessary.

FIG. 14 depicts an example process 1400 according to various embodiments. Process 1400 may be performed by the UE 101. Process 1400 begins at operation 1405 where the UE 101 receives an RRC message, which may include an SRS configuration as discussed previously. Sometime later at operation 1410, the UE 101 receives a DCI, for example, in a PDCCH. At operation 1415, the UE 101 determines whether the DCI indicates an SRS resource indicated by an SRS configuration in the RRC message.

If at operation 1410 the UE 101 determines that at least one SRS resource is configured for a configured transmission scheme (e.g., codebook or non-codebook based transmission scheme) via the RRC message received at operation 1405 and the at least one configured SRS resource is indicated by the DCI received at operation 1410, the UE 101 proceeds to operation 1420 to transmit an SRS in the at least one configured SRS resource. Process 1400 ends after performance of operation 1420.

If at operation 1410 the UE 101 determines that the at least one configured SRS resource is not indicated by the DCI received at operation 1410, regardless of whether that at least one SRS resource is configured for a configured transmission scheme (e.g., codebook or non-codebook based transmission scheme) via the RRC message received at operation 1405, the UE 101 proceeds to operation 1425 to transmit a PUSCH scheduled by the DCI in a corresponding PUCCH resource with a lowest resource ID within an active UL BWP. Process 1400 ends after performance of operation 1425.

Some non-limiting examples are as follows. The following examples pertain to further embodiments, and specifics in the examples may be used anywhere in one or more embodiments discussed previously. Any of the following examples may be combined with any other example or any embodiment discussed herein.

Examples 1 includes one or more computer-readable storage media (CRSM) comprising instructions, wherein execution of the instructions by one or more processors of a user equipment (UE) is to cause the UE to: when the UE is configured with at least one sounding reference signal (SRS) resource for a configured transmission scheme via a higher layer parameter and the at least one configured SRS resource is indicated by a received downlink control information (DCI) or Radio Resource Control (RRC) message, control transmission of an SRS in the at least one configured SRS resource; and when the UE is not configured with at least one SRS resource, control transmission of a physical uplink shared channel (PUSCH) scheduled by a DCI in a corresponding physical uplink control channel (PUCCH) resource with a lowest resource identifier (ID) within an active uplink (UL) bandwidth part (BWP).

Examples 2 includes the one or more CRSM of example 1 and/or some other examples herein, wherein the PUSCH is a codebook based transmission or a non-codebook based transmission.

Examples 3 includes the one or more CRSM of examples 1-2 and/or some other examples herein, wherein a DCI format of the received DCI is DCI format 0_0 when the UE is not configured with at least one SRS resource, and the DCI format of the received DCI is DCI format 0_1 or DCI format 1_1 when the UE is configured with at least one SRS resource.

Examples 4 includes the one or more CRSM of example 3 and/or some other examples herein, when the DCI is the DCI format 0_0, execution of the instructions is to cause the UE to: control transmission of the PUSCH in the corresponding PUCCH resource with the lowest resource ID within the active UL BWP.

Examples 5 includes the one or more CRSM of examples 1-4 and/or some other examples herein, wherein execution of the instructions is to cause the UE to: control receipt of a radio resource control (RRC) message, the RRC message to include an SRS configuration (SRS-Config), the SRS-Config to include one or more sounding reference signal resource sets (SRS-ResourceSets), each SRS-ResourceSet of the one or more SRS-ResourceSets to indicate one or more SRS resources, and the one or more SRS resources of each SRS-ResourceSet are configured to be used for one of periodic SRS transmissions, semi-persistent SRS transmissions, or aperiodic SRS transmissions.

Examples 6 includes the one or more CRSM of example 5 and/or some other examples herein, wherein at least one SRS-ResourceSet of the one or more SRS-ResourceSets includes the at least one configured SRS resource.

Examples 7 includes the one or more CRSM of example 6 and/or some other examples herein, wherein the at least one configured SRS resource is configured to be used for aperiodic SRS transmissions, and the received DCI includes an SRS request field indicating the at least one configured SRS resource to trigger transmission of the aperiodic SRS, wherein only one SRS resource within the SRS-ResourceSet configuration can be triggered.

Examples 8 includes the one or more CRSM of examples 5-7 and/or some other examples herein, wherein at least one SRS-ResourceSet of the one or more SRS-ResourceSets includes one or more SRS resources configured to be used for semi-persistent SRS transmissions, and execution of the instructions is to cause the UE to: use a same spatial domain filter to transmit the PUSCH as the at least one configured SRS resource indicated by the received DCI when the at least one configured SRS resource indicated by the received DCI is among the one or more SRS resources configured to be used for semi-persistent SRS transmissions.

Examples 9 includes the one or more CRSM of examples 5-8 and/or some other examples herein, wherein the SRS-Config is to include a spatial relation (spatialRelationInfo) configuration to indicate a spatial relation between a reference RS and a target SRS, at least one SRS-ResourceSet of the one or more SRS-ResourceSets includes one or more SRS resources configured to be used for semi-persistent SRS transmissions, and execution of the instructions is to cause the UE to: use a same spatial domain filter to transmit the PUSCH as the at least one configured SRS resource indicated by the spatialRelationInfo configuration when the at least one configured SRS resource is among the one or more SRS resources configured to be used for semi-persistent SRS transmissions, and the at least one configured SRS resource is not indicated by the received DCI.

Examples 10 includes the one or more CRSM of examples 5-9 and/or some other examples herein, wherein the RRC message is to include a non-zero power channel state information reference signal resource set (NZP-CSI-RS-ResourceSet), and the NZP-CSI-RS-ResourceSet is to indicate one or more non-zero power channel state information reference signal (NZP CSI-RS) resources, and execution of the instructions is to cause the UE to: assume same antenna ports are to be used for the NZP CSI-RS resources in the NZP-CSI-RS-ResourceSet having a same port index when the NZP-CSI-RS-ResourceSet includes a trs-Info parameter set to 'on'; and assume that the NZP CSI-RS resources in the NZP-CSI-RS-ResourceSet are to be transmitted with a same downlink spatial domain transmission filter when the NZP-CSI-RS-ResourceSet includes a repetition parameter set to 'on', wherein only one of the trs-Info or the repetition can be configured by the NZP-CSI-RS-ResourceSet.

Examples 11 includes the one or more CRSM of example 10 and/or some other examples herein, wherein the NZP-CSI-RS-ResourceSet is to include a QCL-Info-PeriodicCSI- RS parameter to indicate a transmission beam for individual ones of the one or more NZP CSI-RS resources.

Examples 12 includes a System-on-Chip (SoC) to be implemented in a user equipment (UE), the SoC comprising: interface circuitry arranged to obtain a radio resource control (RRC) message that includes a non-zero power channel state information reference signal resource set (NZP-CSI-RS-ResourceSet), the NZP-CSI-RS-ResourceSet to indicate one or more non-zero power channel state information reference signal (NZP CSI-RS) resources; and baseband circuitry coupled with the interface circuitry, the baseband circuitry arranged to: assume same antenna ports are to be used for the NZP CSI-RS resources in the NZP-CSI-RS-ResourceSet having a same port index when the NZP-CSI-RS-ResourceSet includes a trs-Info parameter set to 'on'; and assume that the NZP CSI-RS resources in the NZP-CSI-RS-ResourceSet are to be transmitted with a same downlink spatial domain transmission filter when the NZP-CSI-RS-ResourceSet includes a repetition parameter set to 'on', wherein only one of the trs-Info or the repetition can be configured by the NZP-CSI-RS-ResourceSet.

Examples 13 includes the SoC of example 12 and/or some other examples herein, wherein the NZP-CSI-RS-ResourceSet is to include a QCL-Info-PeriodicCSI-RS parameter to indicate a transmission beam for individual ones of the one or more NZP CSI-RS resources.

Examples 14 includes the SoC of examples 12-13 and/or some other examples herein, wherein the baseband circuitry is arranged to: control transmission of a sounding reference signal (SRS) in at least one configured SRS resource when the at least one configured SRS resource is indicated by an SRS resource indicator field of a downlink control information (DCI) and the UE is configured with at least one SRS resource for a configured transmission scheme via a higher layer parameter in the RRC message; and control transmission of a physical uplink shared channel (PUSCH) scheduled by the DCI in a corresponding physical uplink control channel (PUCCH) resource with a lowest resource identifier (ID) within an active uplink (UL) bandwidth part (BWP) when the UE is not configured with the at least one SRS resource indicated by the SRS resource indicator field of the DCI.

Examples 15 includes the SoC of example 14 and/or some other examples herein, wherein the configured transmission scheme is a codebook based transmission scheme or a non-codebook based transmission scheme, and the PUSCH is a codebook based transmission or a non-codebook based transmission.

Examples 16 includes the SoC of examples 14-15 and/or some other examples herein, wherein a DCI format of the received DCI is DCI format 0_0, and the baseband circuitry is arranged to: control transmission of the PUSCH in the corresponding PUCCH resource with the lowest resource ID within the active UL BWP.

Examples 17 includes the SoC of examples 14-16 and/or some other examples herein, wherein a DCI format of the received DCI is DCI format 0_1 or DCI format 1_1 that includes an SRS request field, and the baseband circuitry is arranged to: control transmission of an SRS in a configured SRS resource based on measurement of an associated NZP CSI-RS to be transmitted in the NZP CSI-RS resources when the configured SRS resource is indicated by the SRS request field of the DCI, the UE is configured with the SRS resource for a non-codebook based transmission scheme, and the configured SRS resource is among an aperiodic SRS resource set.

Examples 18 includes the SoC of examples 14-16 and/or some other examples herein, wherein the RRC message is to include an SRS configuration (SRS-Config), the SRS-Config to include one or more sounding reference signal resource sets (SRS-ResourceSets), each SRS-ResourceSet of the one or more SRS-ResourceSets to indicate one or more SRS resources, and the one or more SRS resources of each SRS-ResourceSet are configured to be used for one of periodic SRS transmissions, semi-persistent SRS transmissions, or aperiodic SRS transmissions.

Examples 19 includes the SoC of example 18 and/or some other examples herein, wherein at least one SRS-ResourceSet of the one or more SRS-ResourceSets includes one or more SRS resources configured to be used for semi-persistent SRS transmissions, and the baseband circuitry is arranged to: use a same spatial domain filter to transmit the PUSCH as the at least one configured SRS resource indicated by the received DCI when the at least one configured SRS resource indicated by the received DCI is among the one or more SRS resources configured to be used for semi-persistent SRS transmissions.

Examples 20 includes the SoC of examples 18-19 and/or some other examples herein, wherein the SRS-Config is to include a spatial relation (spatialRelationInfo) configuration to indicate a spatial relation between a reference RS and a target SRS, at least one SRS-ResourceSet of the one or more SRS-ResourceSets includes one or more SRS resources configured to be used for semi-persistent SRS transmissions, and the baseband circuitry is arranged to: use a same spatial domain filter to transmit the PUSCH as the at least one configured SRS resource indicated by the spatialRelationInfo configuration when the at least one configured SRS resource is among the one or more SRS resources configured to be used for semi-persistent SRS transmissions, and the at least one configured SRS resource is not indicated by the received DCI.

Examples 21 includes an apparatus to operate as a Radio Access Network (RAN) node, the apparatus comprising: processor circuitry arranged to: generate a radio resource control (RRC) message to configure a user equipment (UE) with a sounding reference signal resource set (SRS-ResourceSet), generate a first downlink control information (DCI) to indicate an SRS resource (SRS-Resource) in the configured SRS-ResourceSet, the first DCI to trigger the UE to transmit an SRS in the indicated SRS-Resource, and generate a second DCI to not indicate an SRS resource in the configured SRS-ResourceSet, the second DCI to trigger the UE to transmit a physical uplink shared channel (PUSCH) scheduled by a DCI in a corresponding physical uplink control channel (PUCCH) resource with a lowest resource identifier (ID) within an active uplink (UL) bandwidth part (BWP); and communication circuitry communicatively coupled with the processor circuitry, the communication circuitry arranged to transmit the RRC message to the UE, and transmit the first DCI or the second DCI to the UE.

Examples 22 includes the apparatus of example 21 and/or some other examples herein, wherein the processor circuitry is arranged to set a usage of the SRS-ResourceSet to "Codebook", and generate the first DCI to indicate the SRS-Resource in an SRS request field iof the first DCI.

Examples 23 includes the apparatus of example 21 and/or some other examples herein, wherein the processor circuitry is arranged to set a usage of the SRS-ResourceSet to "nonCodebook", and generate the second DCI to indicate the SRS-Resource in an SRS resource indicator field of the second DCI.

Examples 24 includes the apparatus of example 21 and/or some other examples herein, wherein a DCI format of the second DCI is DCI format 0_0, and the DCI format of the first DCI is DCI format 0_1 or DCI format 1_1.

Examples 25 includes the apparatus of example 21 and/or some other examples herein, wherein the processor circuitry is arranged to: generate the RRC message to include an SRS configuration (SRS-Config) and an a non-zero power channel state information reference signal resource set (NZP-CSI-RS-ResourceSet), wherein the SRS-Config is to include the SRS-ResourceSet, and SRS-Resources of the SRS-ResourceSet are configured to be used for one of periodic SRS transmissions, semi-persistent SRS transmissions, or aperiodic SRS transmissions, wherein the NZP-CSI-RS-ResourceSet is to indicate one or more non-zero power channel state information reference signal (NZP CSI-RS) resources, wherein same antenna ports are to be used for the NZP CSI-RS resources in the NZP-CSI-RS-ResourceSet having a same port index when the NZP-CSI-RS-ResourceSet includes a trs-Info parameter set to 'on', wherein the NZP CSI-RS resources in the NZP-CSI-RS-ResourceSet are to be transmitted with a same downlink spatial domain transmission filter when the NZP-CSI-RS-ResourceSet includes a repetition parameter set to 'on', and wherein only one of the trs-Info or the repetition can be configured by the NZP-CSI-RS-ResourceSet.

Examples 26 includes a method to be performed by a user equipment (UE), the method comprising: receiving a radio resource control (RRC) message, the RRC message to include a non-zero power channel state information reference signal resource set (NZP-CSI-RS-ResourceSet), and the NZP-CSI-RS-ResourceSet to indicate one or more non-zero power channel state information reference signal (NZP CSI-RS) resources; assuming or causing to assume same antenna ports are to be used for the NZP CSI-RS resources in the NZP-CSI-RS-ResourceSet having a same port index when the NZP-CSI-RS-ResourceSet includes a trs-Info parameter set to 'on'; and assuming or causing that the NZP CSI-RS resources in the NZP-CSI-RS-ResourceSet are to be transmitted with a same downlink spatial domain transmission filter when the NZP-CSI-RS-ResourceSet includes a repetition parameter set to 'on', wherein only one of the trs-Info or the repetition can be configured by the NZP-CSI-RS-ResourceSet.

Examples 27 includes the method of example 26 and/or some other examples herein, wherein the NZP-CSI-RS-ResourceSet is to include a QCL-Info-PeriodicCSI-RS parameter to indicate a transmission beam for individual ones of the one or more NZP CSI-RS resources.

Examples 28 includes the method of examples 26-27 and/or some other examples herein, wherein the method comprises: receiving a downlink control information (DCI), the DCI to include an SRS resource indicator field; transmitting a sounding reference signal (SRS) in at least one configured SRS resource when the at least one configured SRS resource is indicated by the SRS resource indicator field of the DCI and the UE is configured with at least one SRS resource for a configured transmission scheme via a higher layer parameter in the RRC message; and transmitting a physical uplink shared channel (PUSCH) scheduled by the DCI in a corresponding physical uplink control channel (PUCCH) resource with a lowest resource identifier (ID) within an active uplink (UL) bandwidth part (BWP) when the UE is not configured with the at least one SRS resource indicated by the SRS resource indicator field of the DCI.

Examples 29 includes the method of example 28 and/or some other examples herein, wherein the configured transmission scheme is a codebook based transmission scheme or a non-codebook based transmission scheme, and the PUSCH is a codebook based transmission or a non-codebook based transmission.

Examples 30 includes the method of examples 28-29 and/or some other examples herein, wherein a DCI format of the received DCI is DCI format 0_0, and wherein the method comprises: transmitting the PUSCH in the corresponding PUCCH resource with the lowest resource ID within the active UL BWP.

Examples 31 includes the method of examples 28-30 and/or some other examples herein, wherein a DCI format of the received DCI is DCI format 0_1 or DCI format 1_1 that includes an SRS request field, and wherein the method comprises: transmitting an SRS in a configured SRS resource based on measurement of an associated NZP CSI-RS to be transmitted in the NZP CSI-RS resources when the configured SRS resource is indicated by the SRS request field of the DCI, the UE is configured with the SRS resource for a non-codebook based transmission scheme, and the configured SRS resource is among an aperiodic SRS resource set.

Examples 32 includes the method of examples 28-31 and/or some other examples herein, wherein the RRC message is to include an SRS configuration (SRS-Config), the SRS-Config to include one or more sounding reference signal resource sets (SRS-ResourceSets), each SRS-ResourceSet of the one or more SRS-ResourceSets to indicate one or more SRS resources, and the one or more SRS resources of each SRS-ResourceSet are configured to be used for one of periodic SRS transmissions, semi-persistent SRS transmissions, or aperiodic SRS transmissions.

Examples 33 includes the method of example 32 and/or some other examples herein, wherein at least one SRS-ResourceSet of the one or more SRS-ResourceSets includes one or more SRS resources configured to be used for semi-persistent SRS transmissions, and wherein the method comprises: using a same spatial domain filter to transmit the PUSCH as the at least one configured SRS resource indicated by the received DCI when the at least one configured SRS resource indicated by the received DCI is among the one or more SRS resources configured to be used for semi-persistent SRS transmissions.

Examples 34 includes the method of examples 32-33 and/or some other examples herein, wherein the SRS-Config is to include a spatial relation (spatialRelationInfo) configuration to indicate a spatial relation between a reference RS and a target SRS, at least one SRS-ResourceSet of the one or more SRS-ResourceSets includes one or more SRS resources configured to be used for semi-persistent SRS transmissions, and wherein the method comprises: using a same spatial domain filter to transmit the PUSCH as the at least one configured SRS resource indicated by the spatial-RelationInfo configuration when the at least one configured SRS resource is among the one or more SRS resources configured to be used for semi-persistent SRS transmissions, and the at least one configured SRS resource is not indicated by the received DCI.

Examples 35 includes a method to be performed by a user equipment (UE), the method comprising: transmitting an SRS in the at least one configured SRS resource when the UE is configured with at least one sounding reference signal (SRS) resource for a configured transmission scheme via a higher layer parameter and the at least one configured SRS resource is indicated by a received downlink control information (DCI) or Radio Resource Control (RRC) message; and transmitting, when the UE is not configured with at least one SRS resource, a physical uplink shared channel (PUSCH) scheduled by a DCI in a corresponding physical uplink control channel (PUCCH) resource with a lowest resource identifier (ID) within an active uplink (UL) bandwidth part (BWP).

Examples 36 includes the method of example 35 and/or some other examples herein, wherein the PUSCH is a codebook based transmission or a non-codebook based transmission.

Examples 37 includes the method of examples 35-36 and/or some other examples herein, wherein a DCI format of the received DCI is DCI format 0_0 when the UE is not configured with at least one SRS resource, and the DCI format of the received DCI is DCI format 0_1 or DCI format 1_1 when the UE is configured with at least one SRS resource.

Examples 38 includes the method of example 37 and/or some other examples herein, when the DCI is the DCI format 0_0, the method comprises: transmitting the PUSCH in the corresponding PUCCH resource with the lowest resource ID within the active UL BWP.

Examples 39 includes the method of examples 35-38 and/or some other examples herein, wherein the method comprises: receiving a radio resource control (RRC) message, the RRC message to include an SRS configuration (SRS-Config), the SRS-Config to include one or more sounding reference signal resource sets (SRS-ResourceSets), each SRS-ResourceSet of the one or more SRS-ResourceSets to indicate one or more SRS resources, and the one or more SRS resources of each SRS-ResourceSet are configured to be used for one of periodic SRS transmissions, semi-persistent SRS transmissions, or aperiodic SRS transmissions.

Examples 40 includes the method of example 39 and/or some other examples herein, wherein at least one SRS-ResourceSet of the one or more SRS-ResourceSets includes the at least one configured SRS resource.

Examples 41 includes the method of example 40 and/or some other examples herein, wherein the at least one configured SRS resource is configured to be used for aperiodic SRS transmissions, and the received DCI includes an SRS request field indicating the at least one configured SRS resource to trigger transmission of the aperiodic SRS, wherein only one SRS resource within the SRS-ResourceSet configuration can be triggered.

Examples 42 includes the method of examples 39-41 and/or some other examples herein, wherein at least one SRS-ResourceSet of the one or more SRS-ResourceSets includes one or more SRS resources configured to be used for semi-persistent SRS transmissions, and wherein the method comprises: using a same spatial domain filter to transmit the PUSCH as the at least one configured SRS resource indicated by the received DCI when the at least one configured SRS resource indicated by the received DCI is among the one or more SRS resources configured to be used for semi-persistent SRS transmissions.

Examples 43 includes the method of examples 39-42 and/or some other examples herein, wherein the SRS-Config is to include a spatial relation (spatialRelationInfo) configuration to indicate a spatial relation between a reference RS and a target SRS, at least one SRS-ResourceSet of the one or more SRS-ResourceSets includes one or more SRS resources configured to be used for semi-persistent SRS transmissions, and wherein the method comprises: using a same spatial domain filter to transmit the PUSCH as the at least one configured SRS resource indicated by the spatialRelationInfo configuration when the at least one configured SRS resource is among the one or more SRS resources configured to be used for semi-persistent SRS transmissions, and the at least one configured SRS resource is not indicated by the received DCI.

Examples 44 includes the method of examples 39-43 and/or some other examples herein, wherein the RRC message is to include a non-zero power channel state information reference signal resource set (NZP-CSI-RS-ResourceSet), and the NZP-CSI-RS-ResourceSet is to indicate one or more non-zero power channel state information reference signal (NZP CSI-RS) resources, and wherein the method comprises: assuming same antenna ports are to be used for the NZP CSI-RS resources in the NZP-CSI-RS-ResourceSet having a same port index when the NZP-CSI-RS-ResourceSet includes a trs-Info parameter set to 'on'; and assuming that the NZP CSI-RS resources in the NZP-CSI-RS-ResourceSet are to be transmitted with a same downlink spatial domain transmission filter when the NZP-CSI-RS-ResourceSet includes a repetition parameter set to 'on', wherein only one of the trs-Info or the repetition can be configured by the NZP-CSI-RS-ResourceSet.

Examples 45 includes the method of example 44 and/or some other examples herein, wherein the NZP-CSI-RS-ResourceSet is to include a QCL-Info-PeriodicCSI-RS parameter to indicate a transmission beam for individual ones of the one or more NZP CSI-RS resources.

Examples 46 includes one or more computer-readable storage media (CRSM) comprising instructions, wherein execution of the instructions by one or more processors of a user equipment (UE) is to cause the UE to perform the method of any one or more of examples 26-45 and/or some other examples herein.

Examples 47 includes a method to be performed by a Radio Access Network (RAN) node, the method comprising: generating a radio resource control (RRC) message to configure a user equipment (UE) with a sounding reference signal resource set (SRS-ResourceSet); transmitting the RRC message to the UE; generating a first downlink control information (DCI) to indicate an SRS resource (SRS-Resource) in the configured SRS-ResourceSet, the first DCI to trigger the UE to transmit an SRS in the indicated SRS-Resource; generating a second DCI to not indicate an SRS resource in the configured SRS-ResourceSet, the second DCI to trigger the UE to transmit a physical uplink shared channel (PUSCH) scheduled by a DCI in a corresponding physical uplink control channel (PUCCH) resource with a lowest resource identifier (ID) within an active uplink (UL) bandwidth part (BWP); and transmitting the first DCI or the second DCI to the UE.

Examples 48 includes the method of example 47 and/or some other examples herein, wherein the method comprises setting a usage of the SRS-ResourceSet to "Codebook"; and generating the first DCI to indicate the SRS-Resource in an SRS request field iof the first DCI.

Examples 49 includes the method of examples 47-48 and/or some other examples herein, wherein the method comprises setting a usage of the SRS-ResourceSet to "non-Codebook"; and generating the second DCI to indicate the SRS-Resource in an SRS resource indicator field of the second DCI.

Examples 50 includes the method of examples 47-49 and/or some other examples herein, wherein a DCI format of the second DCI is DCI format 0_0, and the DCI format of the first DCI is DCI format 0-1 or DCI format 1_1.

Examples 51 includes the method of examples 47-50 and/or some other examples herein, wherein the method comprises: generating the RRC message to include an SRS configuration (SRS-Config) and an a non-zero power channel state information reference signal resource set (NZP-CSI-PS-ResourceSet), wherein the SRS-Config is to include the SRS-ResourceSet, and SRS-Resources of the SRS-ResourceSet are configured to be used for one of periodic SRS transmissions, semi-persistent SRS transmissions, or aperiodic SRS transmissions, wherein the NZP-CSI-RS-ResourceSet is to indicate one or more non-zero power channel state information reference signal (NZP CSI-RS) resources, wherein same antenna ports are to be used for the NZP CSI-RS resources in the NZP-CSI-RS-ResourceSet having a same port index when the NZP-CSI-RS-ResourceSet includes a trs-Info parameter set to 'on', wherein the NZP CSI-RS resources in the NZP-CSI-RS-ResourceSet are to be transmitted with a same downlink spatial domain transmission filter when the NZP-CSI-RS-ResourceSet includes a repetition parameter set to 'on', and wherein only one of the trs-Info or the repetition can be configured by the NZP-CSI-RS-ResourceSet.

Examples 52 includes one or more computer-readable storage media (CRSM) comprising instructions, wherein execution of the instructions by one or more processors of a Radio Access Network (RAN) node is to cause the RAN node to perform the method of any one or more of examples 47-51 and/or some other examples herein Example 53 may include an apparatus comprising means to perform one or more elements of a method described in or related to any of examples 1-52, or any other method or process described herein.

Example 54 may include one or more non-transitory computer-readable media comprising instructions to cause an electronic device, upon execution of the instructions by one or more processors of the electronic device, to perform one or more elements of a method described in or related to any of examples 1-52, or any other method or process described herein.

Example 55 may include an apparatus comprising logic, modules, or circuitry to perform one or more elements of a method described in or related to any of examples 1-52, or any other method or process described herein.

Example 56 may include a method, technique, or process as described in or related to any of examples 1-52, or portions or parts thereof.

Example 57 may include an apparatus comprising: one or more processors and one or more computer-readable media comprising instructions that, when executed by the one or more processors, cause the one or more processors to perform the method, techniques, or process as described in or related to any of examples 1-52, or portions thereof.

Example 58 may include a signal as described in or related to any of examples 1-52, or portions or parts thereof.

Example 59 includes a packet, frame, segment, protocol data unit (PDU), or message as described in or related to any of examples 1-52, or portions or parts thereof, or otherwise described in the present disclosure Example 60 may include a signal in a wireless network as shown and described herein.

Example 61 may include a method of communicating in a wireless network as shown and described herein.

Example 62 may include a system for providing wireless communication as shown and described herein.

Example 63 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The present disclosure has been described with reference to flowchart illustrations and/or block diagrams of methods, apparatus (systems), and/or computer program products according to embodiments of the present disclosure. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

As used herein, the term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), ASICs, FPDs (e.g., FPGAs, PLDs, CPLDs, HCPLDs, a structured ASICs, or a programmable SoCs, DSPs, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

As used herein, the term "processor circuitry" refers to, is part of, or includes circuitry capable of sequentially and automatically carrying out a sequence of arithmetic or logical operations, or recording, storing, and/or transferring digital data. and/or any other device capable of executing or otherwise operating computer-executable instructions, such as program code, software modules, and/or functional processes.

As used herein, the term "module" refers to one or more independent electronic circuits packaged onto a circuit board, SoC, SiP, etc., configured to provide a basic function within a computer system.

As used herein, the term "module" refers to, be part of, or include an FPD, ASIC, a processor (shared, dedicated, or group) and/or memory (shared, dedicated, or group), etc., that execute one or more software or firmware programs, a combinational logic circuit, and/or other suitable components that provide the described functionality.

As used herein, the term "interface circuitry" refers to, is part of, or includes circuitry providing for the exchange of information between two or more components or devices. The term "interface circuitry" refers to one or more hardware interfaces, for example, buses, input/output (I/O) interfaces, peripheral component interfaces, network interface cards, and/or the like.

As used herein, the term "device" refers to a physical entity embedded inside, or attached to, another physical entity in its vicinity, with capabilities to convey digital information from or to that physical entity. As used herein, the term "element" refers to a unit that is indivisible at a given level of abstraction and has a clearly defined boundary, wherein an element may be any type of entity. As used herein, the term "controller" refers to an element or entity that has the capability to affect a physical entity, such as by changing its state or causing the physical entity to move. As used herein, the term "entity" refers to (1) a distinct component of an architecture or device, or (2) information transferred as a payload. The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

As used herein, the term "computer system" refers to any type interconnected electronic devices, computer devices, or components thereof. Additionally, the term "computer system" and/or "system" refers to various components of a computer that are communicatively coupled with one another, or otherwise organized to accomplish one or more functions. Furthermore, the term "computer system" and/or "system" refers to multiple computer devices and/or multiple computing systems that are communicatively coupled with one another and configured to share computing and/or networking resources.

As used herein, the term "architecture" refers to a fundamental organization of a system embodied in its components, their relationships to one another, and to an environment, as well as to the principles guiding its design and evolution.

As used herein, the term "appliance," "computer appliance," or the like, refers to a discrete hardware device with integrated program code (e.g., software or firmware) that is specifically or specially designed to provide a specific computing resource. A "virtual appliance" is a virtual machine image to be implemented by a hypervisor-equipped device that virtualizes or emulates a computer appliance or otherwise is dedicated to provide a specific computing resource.

As used herein, the term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

As used herein, the term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the terms "instantiate," "instantiation," and the like refers to the creation of an instance, and an "instance" refers to a concrete occurrence of an object, which may occur, for example, during execution of program code.

As used herein, a "database object", "data object", or the like refers to any representation of information in a database that is in the form of an object, attribute-value pair (AVP), key-value pair (KVP), tuple, etc., and may include variables, data structures, functions, methods, classes, database records, database fields, database entities, associations between data and database entities (also referred to as a "relation"), and the like.

As used herein, the term "resource" refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. The term "network resource" refers to a resource hosted by a remote entity (e.g., a cloud computing service) and accessible over a network. The term "on-device resource" refers to a resource hosted inside a device and enabling access to the device, and thus, to the related physical entity. System resources may be considered as a set of coherent functions, network data objects or services, accessible through a server where such system resources reside on a single host or multiple hosts and are clearly identifiable. Additionally, a "virtualized resource" refers to compute, storage, and/or network resources provided by virtualization infrastructure to an application, such as a multi-access edge applications. The term "information element" refers to a structural element containing one or more fields. The term "field" refers to individual contents of an information element, or a data element that contains content.

For the purposes of the present document, the abbreviations listed in table ABBR may apply to the examples and embodiments discussed herein.

TABLE ABBR

| | |
|---|---|
| 3GPP | Third Generation Partnership Project |
| 4G | Fourth Generation |
| 5G | Fifth Generation |
| 5GC | 5G Core network |
| ACK | Acknowledgement |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbor Relation |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASN.1 | Abstract Syntax Notation One |
| AUSF | Authentication Server Function |
| AWGN | Additive White Gaussian Noise |
| BCH | Broadcast Channel |
| BER | Bit Error Ratio |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CFRA | Contention Free Random Access |
| CG | Cell Group |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |

TABLE ABBR-continued

| | |
|---|---|
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | enhanced Mobile Broadband |
| eMBMS | Evolved MBMS |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |

TABLE ABBR-continued

| | |
|---|---|
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GSM | Global System for Mobile Communications, Groupe Spécial Mobile |
| GTP | GPRS Tunneling Protocol |
| GTP-U | GPRS Tunnelling Protocol for User Plane |
| GUMMEI | Globally Unique MME Identifier |
| GUTI | Globally Unique Temporary UE Identity |
| HARQ | Hybrid ARQ, Hybrid Automatic Repeat Request |
| HANDO, HO | Handover |
| HFN | HyperFrame Number |
| HHO | Hard Handover |
| HLR | Home Location Register |
| HN | Home Network |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| ICIC | Inter-Cell Interference Coordination |
| ID | Identity, identifier |
| IDFT | Inverse Discrete Fourier Transform |
| IE | Information element |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN |
| K | Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |

TABLE ABBR-continued

| | |
|---|---|
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LBT | Listen Before Talk |
| LCM | LifeCycle Management |
| LCR | Low Chip Rate |
| LCS | Location Services |
| LI | Layer Indicator |
| LLC | Logical Link Control, Low Layer Compatibility |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |

TABLE ABBR-continued

| | |
|---|---|
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | 'Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit-type 2 |
| OFDM | Orthogonal Frequency Division Multiplexing |
| OFDMA | Orthogonal Frequency Division Multiple Access |
| OOB | Out-of-band |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |

TABLE ABBR-continued

| | |
|---|---|
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadmture Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Service Discovery Protocol (Bluetooth related) |
| SDSF | Structured Data Storage Function |
| SDU | Service Data Unit |
| SEAF | Security Anchor Function |
| SeNB | secondary eNB |

TABLE ABBR-continued

| | |
|---|---|
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block, SS/PBCH Block |
| SSBRI | SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |

TABLE ABBR-continued

| | |
|---|---|
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiments were chosen and described in order to best explain the principles of the disclosure and the practical application, and to enable others of ordinary skill in the art to understand the disclosure for embodiments with various modifications as are suited to the particular use contemplated.

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

What is claimed is:

1. A base station (BS), comprising:
processor circuitry configured to generate a radio resource control (RRC) message to configure a user equipment (UE), the RRC message including a non-zero power channel state information reference signal resource set (NZP-CSI-RS-ResourceSet) that indicates one or more non-zero power channel state information reference signal (NZP-CSI-RS) resources; and
communication circuitry communicatively coupled with the processor circuitry, the communication circuitry being configured to transmit the RRC message to the UE,
wherein the communication circuitry is further configured to use same antenna ports for the NZP-CSI-RS resources in the NZP-CSI-RS-ResourceSet having a same port index based on the NZP-CSI-RS-ResourceSet including a TRS-Info parameter set to 'on', and
wherein the communication circuitry is further configured to transmit the NZP-CSI-RS resources in the NZP-CSI-RS-ResourceSet with a same downlink spatial domain transmission filter based on the NZP-CSI-RS-ResourceSet including a repetition parameter set to 'on'.

2. The BS of claim 1, wherein the RRC message comprises a sounding reference signal (SRS) configuration (SRS-Config),
wherein the SRS-Config comprises one or more SRS resource sets (SRS-ResourceSets), and
wherein at least one SRS-ResourceSet of the one or more SRS-ResourceSets comprises one or more SRS resources.

3. The BS of claim 2, wherein the communication circuitry is further configured to generate the RRC message to configure the UE with at least one SRS resource for a configured transmission scheme via a higher layer parameter and the at least one SRS resource is indicated by a received downlink control information (DCI) or the RRC message.

4. The BS of claim 2, wherein the one or more SRS resources are configured to be used for one of periodic SRS transmissions, semi-persistent SRS transmissions, or aperiodic SRS transmissions.

5. The BS of claim 2, wherein the at least one SRS-ResourceSet includes at least one SRS resource to be used for aperiodic SRS transmissions, and wherein the communication circuitry is further configured to transmit downlink control information (DCI) including an SRS request field indicating the at least one SRS resource to trigger transmission of aperiodic SRS transmissions.

6. The BS of claim 1, wherein the NZP-CSI-RS-ResourceSet includes a QCL-Info-PeriodicCSl-RS parameter to indicate a transmission beam for individual ones of the one or more NZP-CSI-RS resources.

7. A user equipment (UE), comprising:
interface circuitry configured to receive a radio resource control (RRC) message, the RRC message including a non-zero power channel state information reference signal resource set (NZP-CSI-RS-ResourceSet) that indicates one or more non-zero power channel state information reference signal (NZP-CSI-RS) resources; and
baseband circuitry, coupled to the interface circuitry, configured to:
assume the NZP-CSI-RS resources in the NZP-CSI-RS-ResourceSet having a same port index are to be transmitted with same antenna ports based on the NZP-CSI-RS-ResourceSet including a TRS-Info parameter set to 'on', and
assume the NZP-CSI-RS resources in the NZP-CSI-RS-ResourceSet are to be transmitted with a same downlink spatial domain transmission filter based on the NZP-CSI-RS-ResourceSet including a repetition parameter set to 'on'.

8. The UE of claim 7, wherein only one of the TRS-Info parameter or the repetition parameter is configured by the NZP-CSI-RS ResourceSet.

9. The UE of claim 7, wherein the RRC message comprises a sounding reference signal (SRS) configuration (SRS-Config),
wherein the SRS-Config comprises one or more SRS resource sets (SRS-ResourceSets), and
wherein at least one SRS-ResourceSet of the one or more SRS-ResourceSets comprises one or more SRS resources.

10. The UE of claim 9, wherein the baseband circuitry is further configured to:
control transmission of an SRS in the at least one SRS resource based on the UE being configured with at least one SRS resource for a configured transmission scheme via a higher layer parameter and the at least one SRS resource is indicated by a received downlink control information (DCI) or the RRC message; and
control transmission of a physical uplink shared channel (PUSCH) scheduled by DCI in a corresponding physical uplink control channel (PUCCH) resource with a lowest resource identifier (ID) within an active uplink (UL) bandwidth part (BWP) based on the UE not being configured with at least one SRS resource.

11. The UE of claim 9, wherein the one or more SRS resources are configured to be used for one of periodic SRS transmissions, semi-persistent SRS transmissions, or aperiodic SRS transmissions.

12. The UE of claim 9, wherein the at least one SRS-ResourceSet includes at least one SRS resource to be used for aperiodic SRS transmissions, and
wherein the baseband circuitry is further configured to:
receive downlink control information (DCI) including an SRS request field indicating the at least one SRS resource to trigger transmission of aperiodic SRS transmissions.

13. The UE of claim 7, wherein the NZP-CSI-RS-ResourceSet includes a QCL-Info-PeriodicCSI-RS parameter to indicate a transmission beam for individual ones of the one or more NZP-CSI-RS resources.

14. A method to be performed by a user equipment (UE), the method comprising:
receiving a radio resource control (RRC) message, the RRC message including a non-zero power channel state information reference signal resource set (NZP-CSI-RS-ResourceSet) that indicates one or more non-zero power channel state information reference signal (NZP-CSI-RS) resources;
assuming the NZP-CSI-RS resources in the NZP-CSI-RS-ResourceSet having a same port index are to be transmitted with same antenna ports based on the NZP-CSI-RS-ResourceSet including a TRS-Info parameter set to 'on'; and
assuming the NZP-CSI-RS resources in the NZP-CSI-RS-ResourceSet are to be transmitted with a same downlink spatial domain transmission filter based on the NZP-CSI-RS-ResourceSet including a repetition parameter set to 'on'.

15. The method of claim 14, wherein only one of the TRS-Info parameter or the repetition parameter is configured by the NZP-CSI-RS ResourceSet.

16. The method of claim 14, wherein the RRC message comprises a sounding reference signal (SRS) configuration (SRS-Config),
wherein the SRS-Config comprises one or more SRS resource sets (SRS-ResourceSets), and
wherein at least one SRS-ResourceSet of the one or more SRS-ResourceSets comprises one or more SRS resources.

17. The method of claim 16, further comprising:
controlling transmission of an SRS in the at least one SRS resource based on the UE being configured with at least one SRS resource for a configured transmission scheme via a higher layer parameter and the at least one SRS resource is indicated by a received downlink control information (DCI) or the RRC message; and
controlling transmission of a physical uplink shared channel (PUSCH) scheduled by DCI in a corresponding physical uplink control channel (PUCCH) resource with a lowest resource identifier (ID) within an active uplink (UL) bandwidth part (BWP) based on the UE not being configured with at least one SRS resource.

18. The method of claim 16, wherein the one or more SRS resources are configured to be used for one of periodic SRS transmissions, semi-persistent SRS transmissions, or aperiodic SRS transmissions.

19. The method of claim 16, wherein the at least one SRS-ResourceSet includes at least one SRS resource to be used for aperiodic SRS transmissions, and wherein the method further comprises:
receiving downlink control information (DCI) including an SRS request field indicating the at least one SRS resource to trigger transmission of aperiodic SRS transmissions.

20. The method of claim 14, wherein the NZP-CSI-RS-ResourceSet includes a QCL-Info-PeriodicCSI-RS parameter to indicate a transmission beam for individual ones of the one or more NZP-CSI-RS resources.

* * * * *